US012017317B2

(12) United States Patent
Morton et al.

(10) Patent No.: US 12,017,317 B2
(45) Date of Patent: Jun. 25, 2024

(54) MAGNETIC COUPLING DEVICE

(71) Applicant: MAGSWITCH TECHNOLOGY, INC., Superior, CO (US)

(72) Inventors: David H. Morton, Boulder, CO (US); Thomas D. Squillace, Boulder, CO (US); Paul J. Karp, Thornton, CO (US)

(73) Assignee: Magswitch Technology, Inc., Superior, CO (US)

( * ) Notice: Subject to any disclaimer, the term of this patent is extended or adjusted under 35 U.S.C. 154(b) by 0 days.

(21) Appl. No.: 18/230,544

(22) Filed: Aug. 4, 2023

(65) Prior Publication Data
US 2023/0373043 A1 Nov. 23, 2023

Related U.S. Application Data

(63) Continuation of application No. 17/476,380, filed on Sep. 15, 2021, now Pat. No. 11,772,214, which is a
(Continued)

(51) Int. Cl.
*B23Q 3/154* (2006.01)
*B25B 11/00* (2006.01)

(52) U.S. Cl.
CPC ............ *B23Q 3/154* (2013.01); *B25B 11/002* (2013.01)

(58) Field of Classification Search
CPC ... B23Q 3/1546; H01F 7/0252; H01F 7/0257; H01F 7/04; B66C 1/04; B65H 3/16; B25B 11/002
See application file for complete search history.

(56) References Cited

U.S. PATENT DOCUMENTS 2,475,456 A 7/1949 Norlander
2,915,682 A 12/1959 Bower
(Continued)

FOREIGN PATENT DOCUMENTS

CN 202713101 U 1/2013
CN 203781619 U 8/2014
(Continued)

OTHER PUBLICATIONS

Screenshots from video—Magnetic Gripper SGM-HP and SGM-HT | Schmalz—Vacuum Technology—https://vimeo.com/187625174—Oct. 17, 2016 (15 pages).
(Continued)

*Primary Examiner* — Tyrone V Hall, Jr.
(74) *Attorney, Agent, or Firm* — Faegre Drinker Biddle & Reath LLP

(57) ABSTRACT

A magnetic device for magnetically coupling to a ferromagnetic body, comprises a housing having a central bore. A plurality of pole sectors arranged within an envelope of the central bore and forming a workpiece contact interface of the magnetic device, each of the plurality of pole sectors comprising a plurality of spaced-apart pole portions arranged at respective distances, wherein a recess of a plurality of recesses separates each pole portion of the plurality of pole portions, wherein a first sector forms a first pole of the magnetic device and a second sector forms a second pole of the magnetic device. A first permanent magnet. A second permanent being moveable relative to the first permanent magnet. And, an actuator operatively coupled to the at least one second permanent magnet to move the at least one second permanent magnet relative to the at least one first permanent magnet.

35 Claims, 35 Drawing Sheets

Related U.S. Application Data continuation of application No. 16/964,005, filed as application No. PCT/US2019/015541 on Jan. 29, 2019, now Pat. No. 11,780,039.

(60) Provisional application No. 62/623,407, filed on Jan. 29, 2018.

(56) References Cited

U.S. PATENT DOCUMENTS

| | | | |
|---|---|---|---|
| 3,079,191 A | | 2/1963 | Engelsted et al. |
| 3,121,193 A | * | 2/1964 | Engelsted ............ B23Q 3/1546 335/295 |
| 3,477,050 A | * | 11/1969 | Hinger .................. H01F 7/0257 335/295 |
| 3,488,536 A | | 1/1970 | Baermann |
| 3,893,676 A | | 7/1975 | Gloshinski et al. |
| 4,117,793 A | | 10/1978 | Preece et al. |
| 4,166,261 A | | 8/1979 | Flachenecker et al. |
| 4,408,752 A | | 10/1983 | Uchikune et al. |
| 4,468,649 A | | 8/1984 | Matsuhashi |
| 4,837,540 A | | 6/1989 | Michele et al. |
| 5,270,678 A | | 12/1993 | Gambut et al. |
| 5,500,631 A | | 3/1996 | Negus |
| 5,993,365 A | | 11/1999 | Stagnitto et al. |
| 6,231,349 B1 | | 5/2001 | Bullinger et al. |
| 8,892,258 B2 | | 11/2014 | Jacobsen et al. |
| 8,917,154 B2 | | 12/2014 | Fullerton et al. |
| 9,324,487 B1 | | 4/2016 | Wei et al. |
| 9,601,955 B2 | | 3/2017 | Dutau |
| 10,532,791 B2 | * | 1/2020 | Ball ....................... B62M 3/086 |
| 11,772,214 B2 | | 10/2023 | Morton et al. |
| 11,780,039 B2 | | 10/2023 | Morton et al. |
| 2005/0012579 A1 | | 1/2005 | Underwood et al. |
| 2006/0232367 A1 | | 10/2006 | Shen |
| 2011/0248806 A1 | | 10/2011 | Michael |
| 2012/0277911 A1 | | 11/2012 | Jacobsen et al. |
| 2013/0154389 A1 | | 6/2013 | Kurs et al. |
| 2013/0234817 A1 | | 9/2013 | Kocijan |
| 2014/0049347 A1 | | 2/2014 | Barton et al. |
| 2014/0265690 A1 | | 9/2014 | Henderson |
| 2014/0314507 A1 | | 10/2014 | Timmons et al. |
| 2014/0340182 A1 | | 11/2014 | Dupraz et al. |
| 2015/0115848 A1 | | 4/2015 | McFadden |
| 2017/0011831 A1 | | 1/2017 | Nätti |
| 2021/0031317 A1 | | 2/2021 | Squillace et al. |
| 2022/0001501 A1 | | 1/2022 | Morton et al. |
| 2022/0045594 A1 | | 2/2022 | Morton et al. |

FOREIGN PATENT DOCUMENTS

| | | |
|---|---|---|
| CN | 104137212 A | 11/2014 |
| DE | 19852376 A1 | 5/2000 |
| EP | 3100289 A1 | 12/2016 |
| GB | 190828300 A | 12/1908 |
| GB | 0152821 A | 10/1920 |
| GB | 0206130 A | 3/1924 |
| GB | 0519466 A | 3/1940 |
| GB | 1333490 A | 10/1973 |
| GB | 1335741 A | 10/1973 |
| GB | 1471025 A | 4/1977 |
| GB | 2292838 A | 3/1996 |
| GB | 2312329 A | 10/1997 |
| JP | 51-093568 U | 7/1976 |
| JP | S58-037107 U | 3/1983 |
| JP | S61-027205 U | 2/1986 |
| JP | S61-065742 A | 4/1986 |
| JP | H03-019785 A | 1/1991 |
| JP | H07-171726 A | 7/1995 |
| JP | H09-045523 A | 2/1997 |
| JP | H11-002367 A | 1/1999 |
| JP | 2002-520829 A | 7/2002 |
| JP | 2013-219364 A | 10/2013 |
| JP | 2017-509144 A | 3/2017 |
| JP | 2018-503257 A | 2/2018 |
| JP | 2021-512489 A | 5/2021 |
| KR | 10-2008-0002782 U | 7/2008 |
| KR | 20-2008-0002782 U | 7/2008 |
| KR | 10-2016-0035739 A | 4/2016 |
| KR | 10-1643538 B1 | 7/2016 |
| WO | 96/07610 A1 | 3/1996 |
| WO | 2012/160262 A1 | 11/2012 |
| WO | 2015/114220 A1 | 8/2015 |
| WO | 2016/005024 A1 | 1/2016 |

OTHER PUBLICATIONS

Schmalz to present a new series of magnetic grippers at the Assembly trade show, MHI. The Industry that makes Supply Chains Work, Oct. 10, 2016 (2 pages).

Handling and clamping sheet metal gently and safely, Industrial Production, Oct. 26, 2016 (4 pages).

Assembly Instructions SCHUTZ-SGM, Dec. 2017 (1 page).

BMP; BMP 1800, BMP 3600; Walmag Magnetics; walmagmagnetics.com; Sep. 2017.

HSMAG; Pole Extension for Electro-Permanent Magnetic Chuck; from http://www.hsmagnets.com/producl/pole-extension-for-electro-permanent-magnetic-chuck/; Aug. 1, 2016.

MAGSWITCH; Magswitch MLAY1000X6 Lifting Magnet Parl#8100482; from https://www.weldersupply.com/P/1496/MagswitchMLAY1000X6Lifli; Apr. 5, 2016.

Ohio Magnetics; Steel Mill and Metal Processing Magnets; from http://www.ohiomagnetics.com/our-products/magnets-steel-mill-type; Feb. 1, 2016.

* cited by examiner

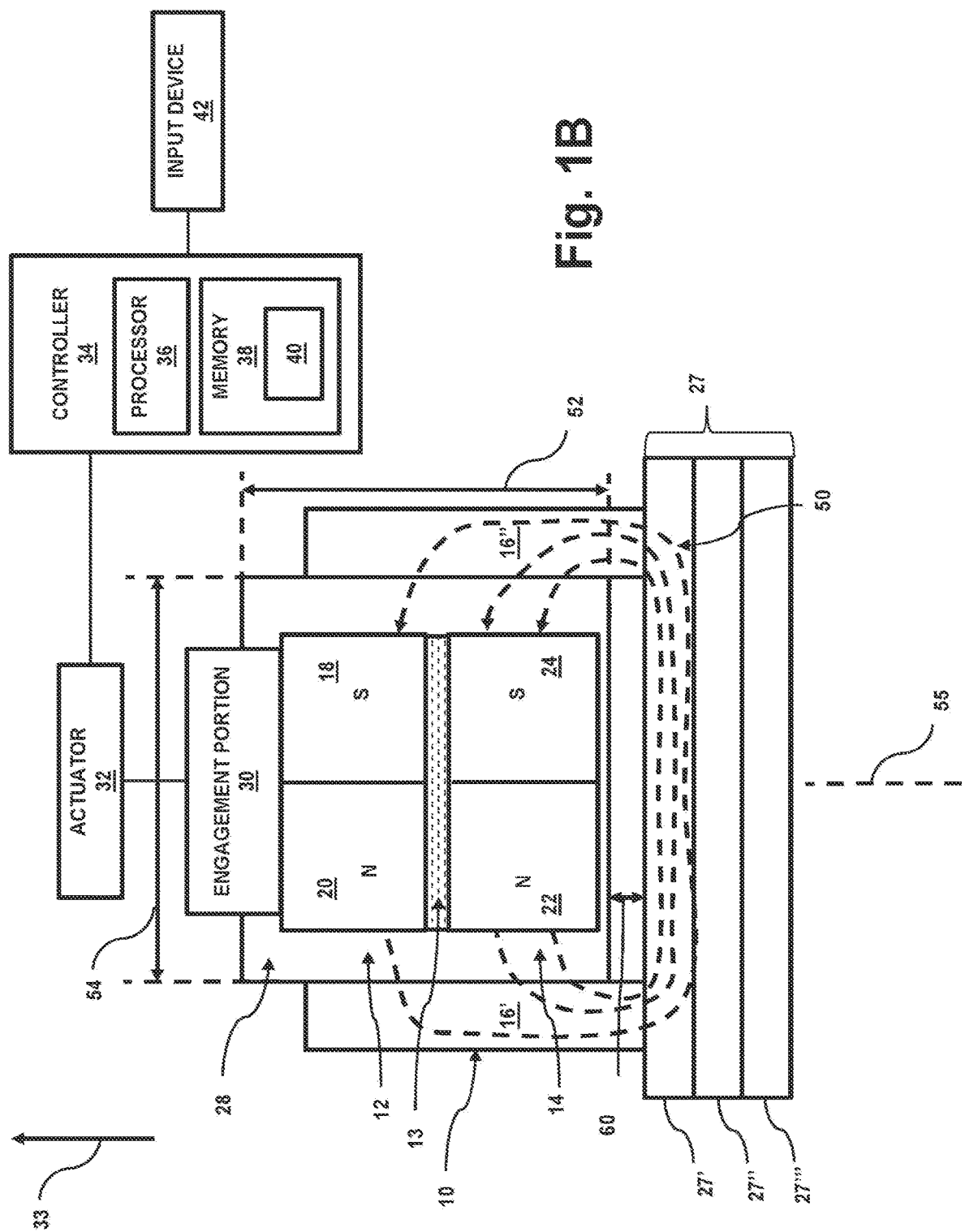

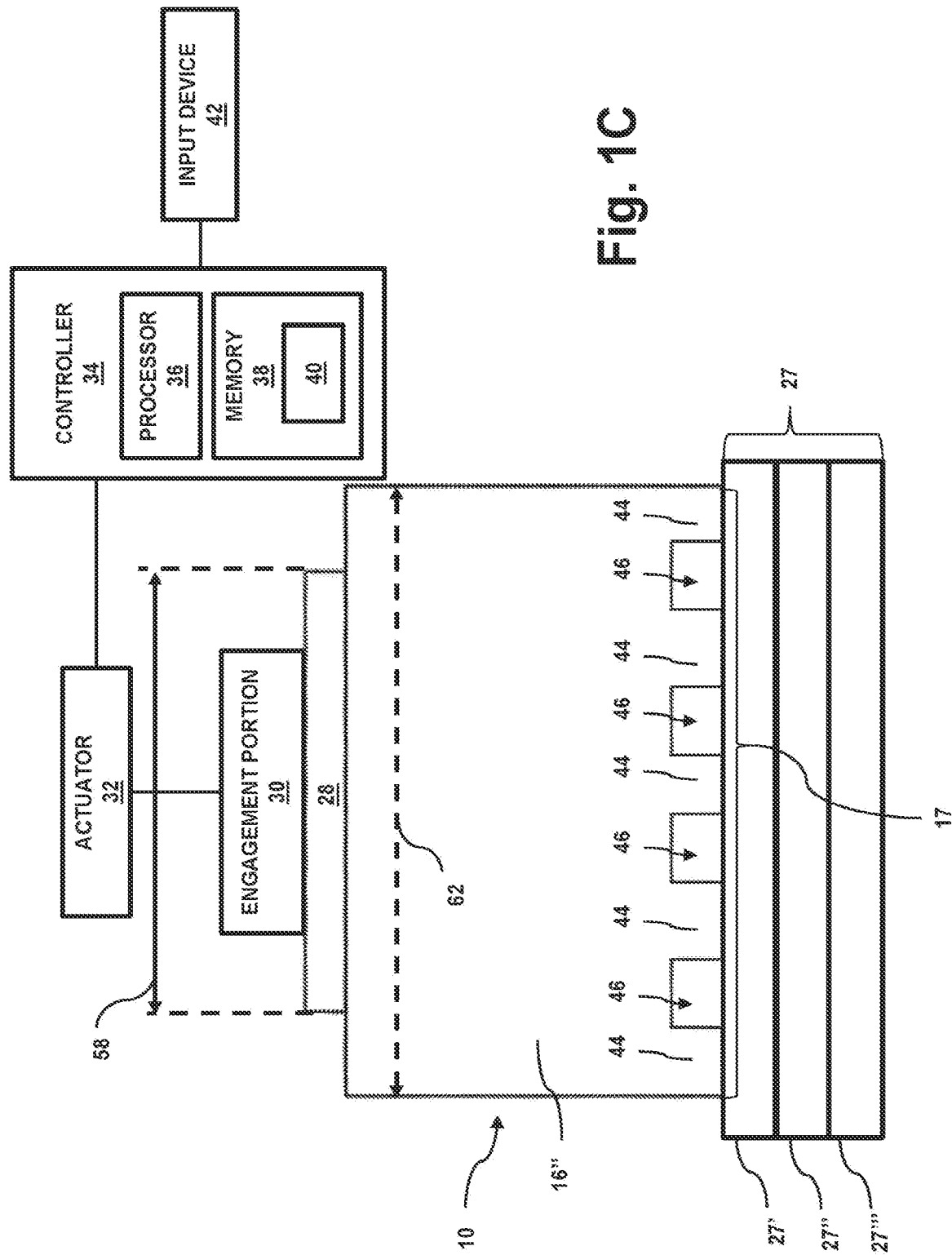

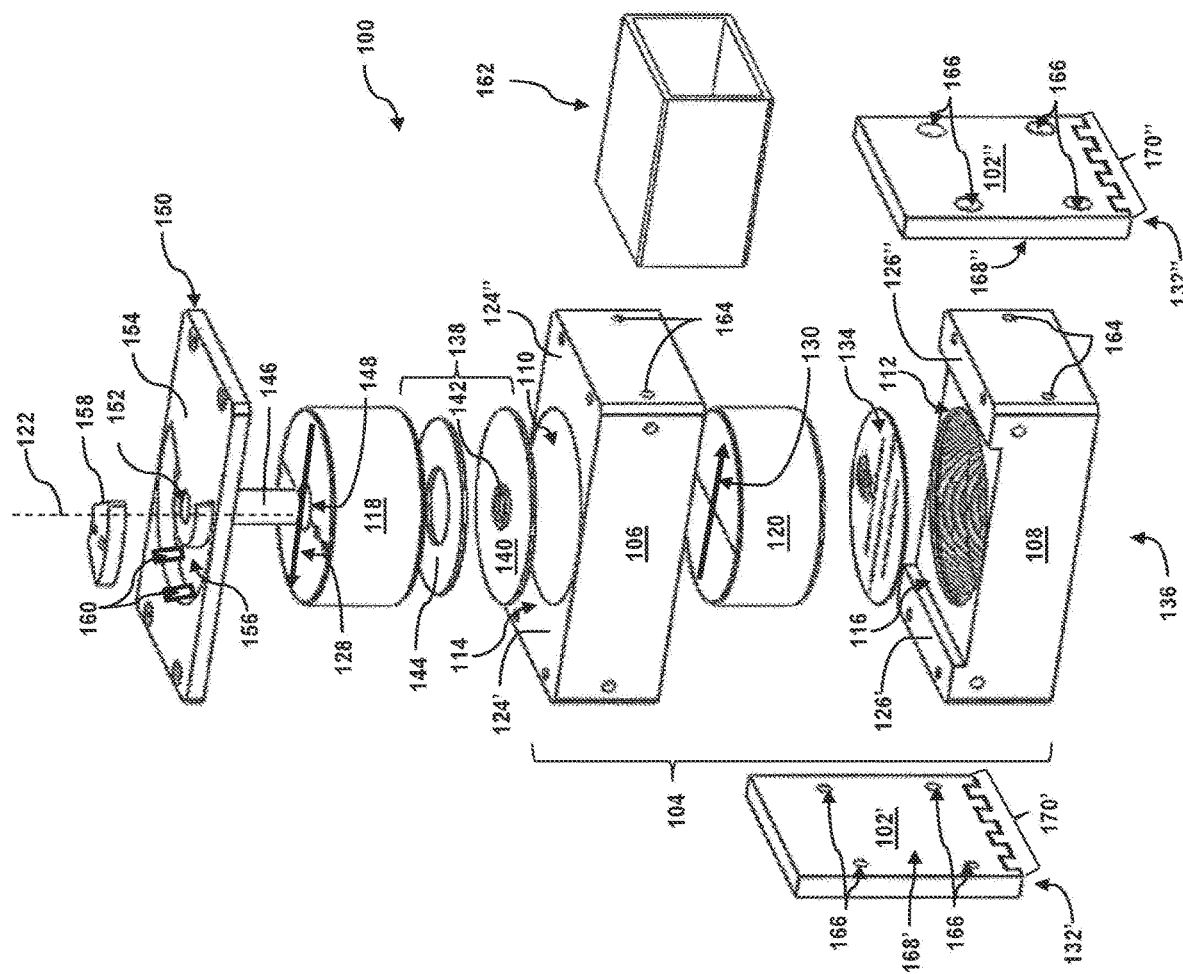

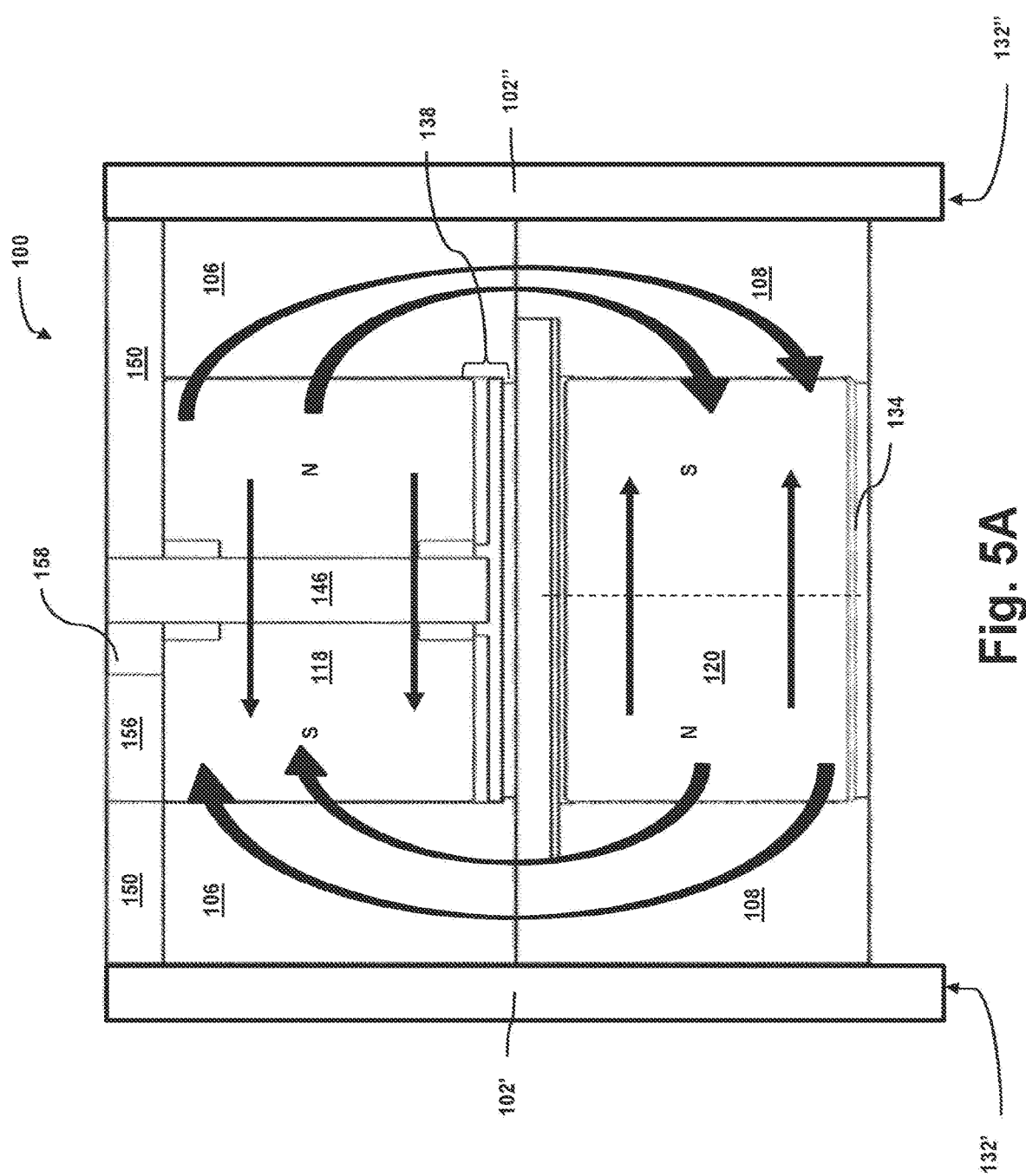

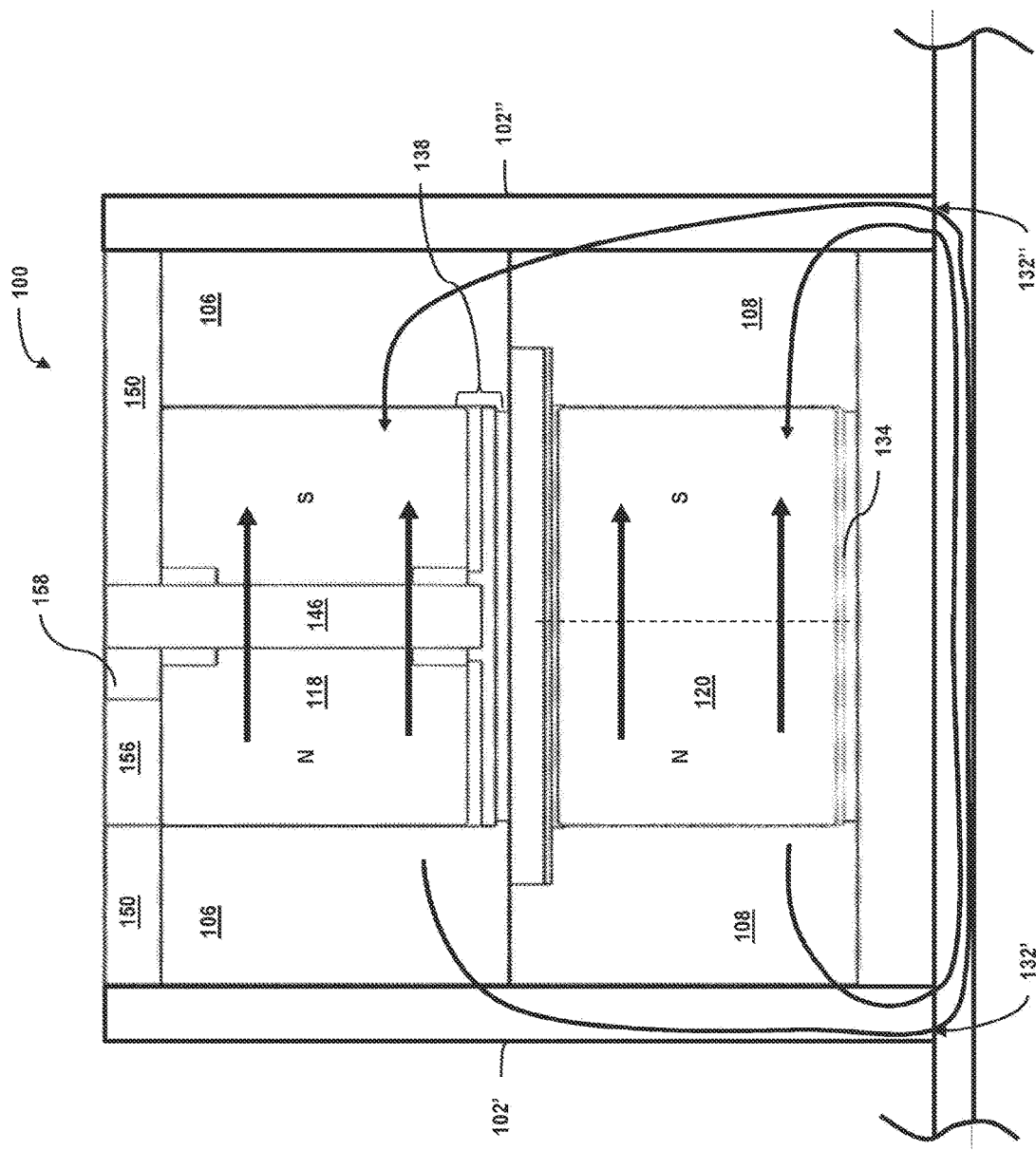

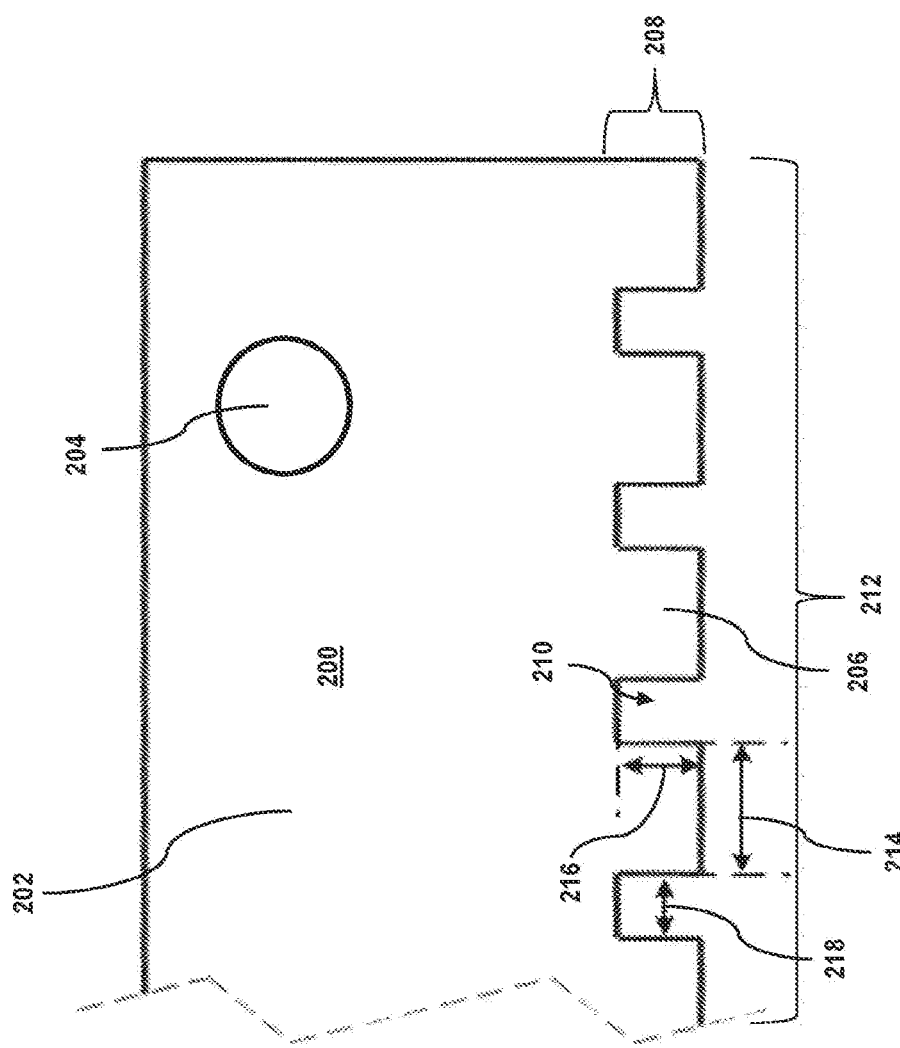

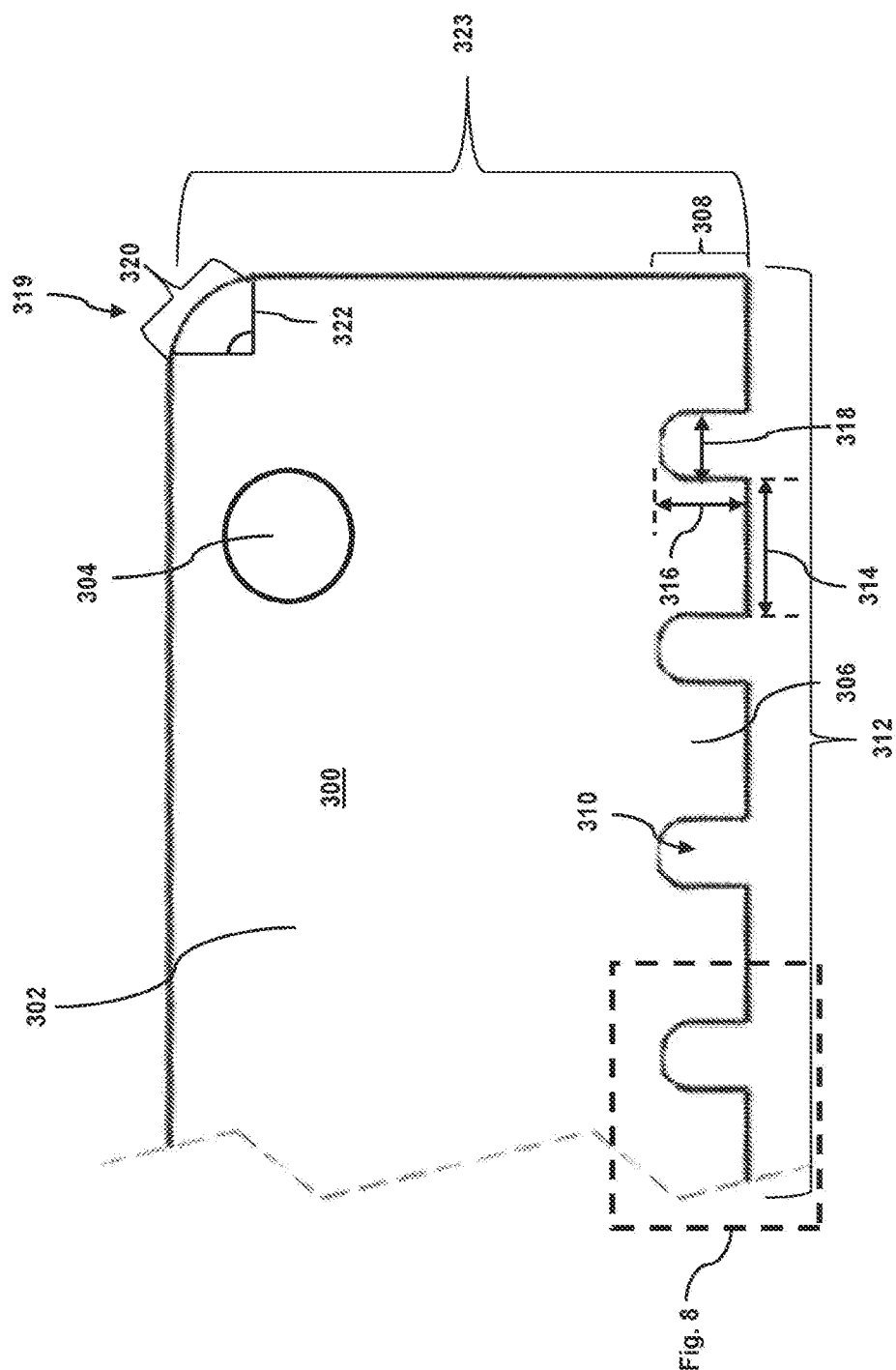

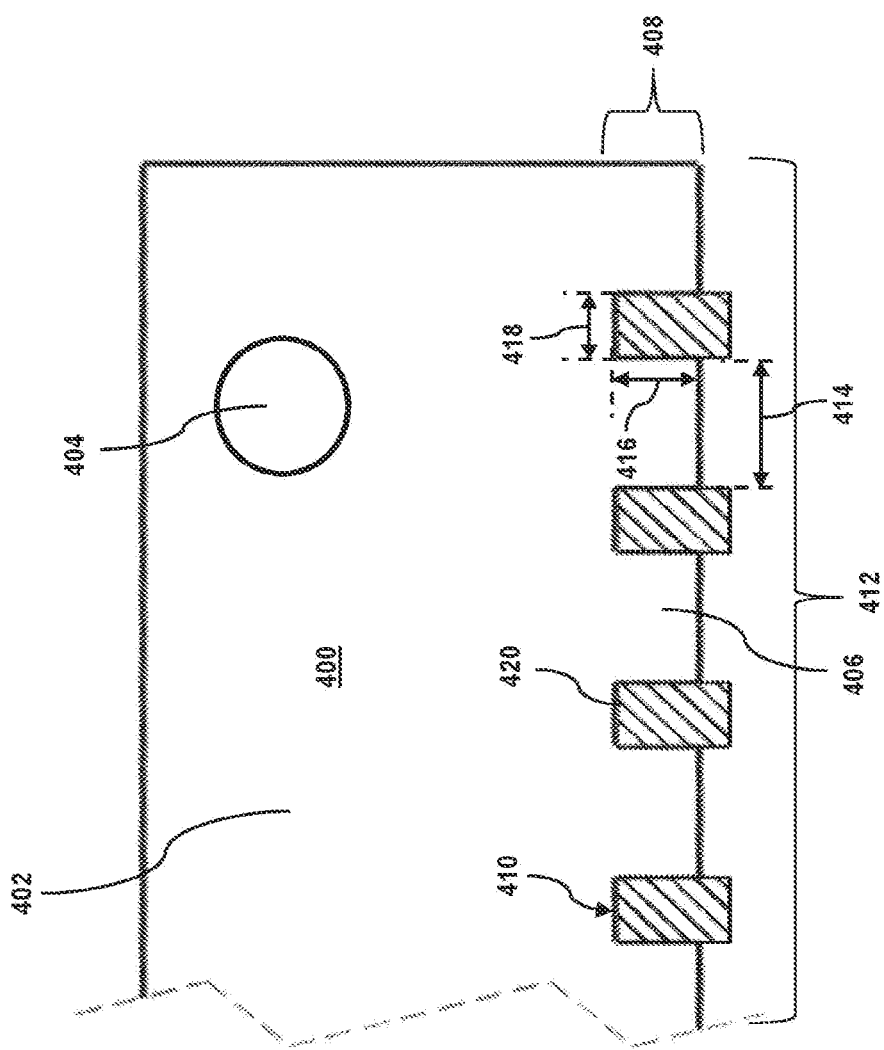

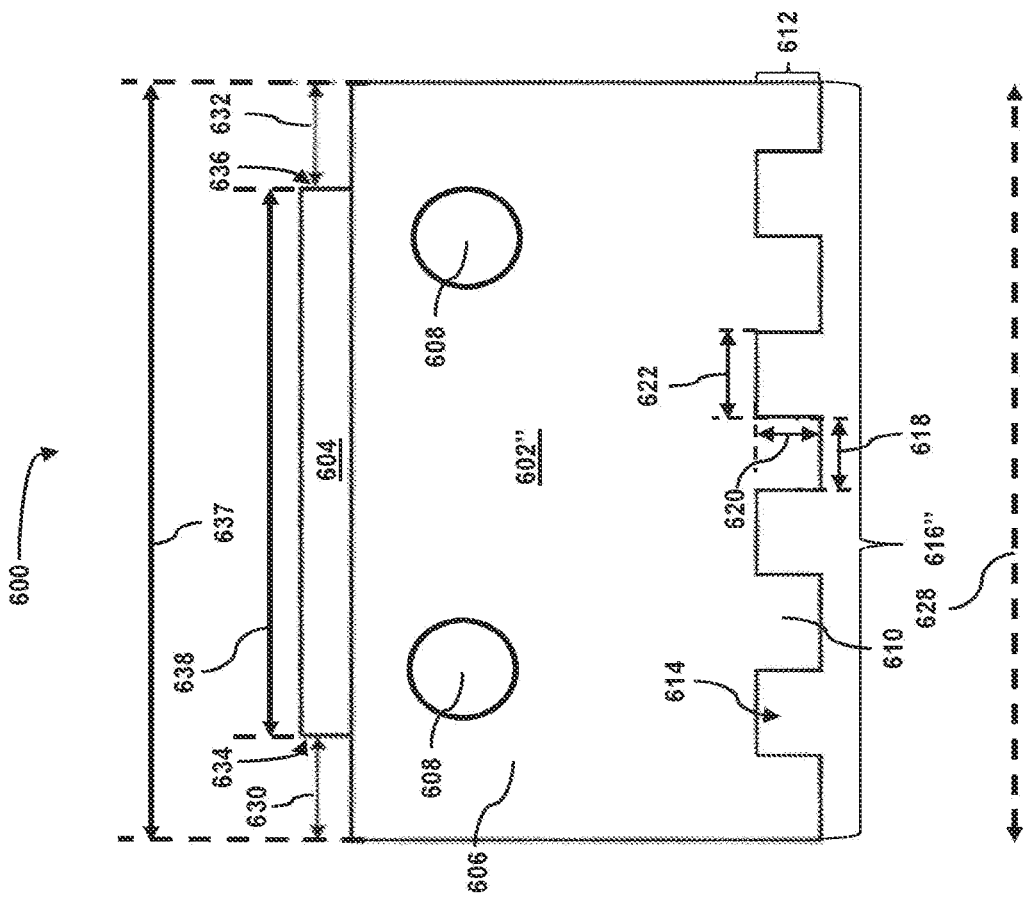
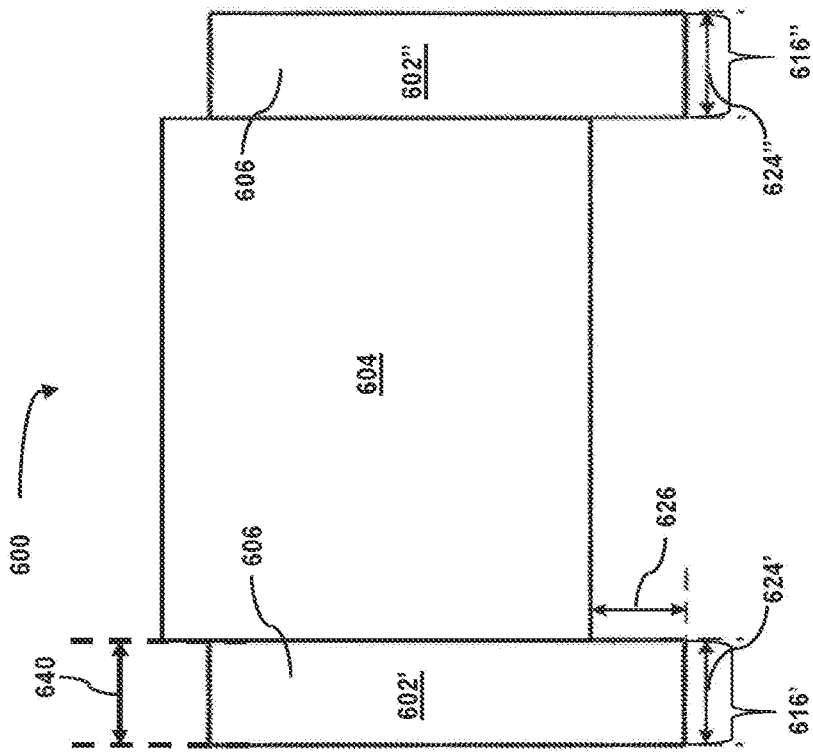
Fig. 11B
Fig. 11A

MAGNETIC COUPLING DEVICE

RELATED APPLICATIONS

This application is a continuation application of U.S. patent application Ser. No. 17/476,380 filed Sep. 15, 2021, which is a continuation application of U.S. patent application Ser. No. 16/964,005 filed Jul. 22, 2020 which is a national stage application of PCT Application No. PCT/US19/15541, filed Jan. 29, 2019, titled MAGNETIC LIFTING DEVICE HAVING POLE SHOES WITH SPACED APART PROJECTIONS, which claims the benefit of U.S. Provisional Application No. 62/623,407, filed Jan. 29, 2018, titled MAGNETIC LIFTING DEVICE HAVING POLE SHOES WITH SPACED APART PROJECTIONS, the entire disclosures of which are expressly incorporated by reference herein.

TECHNICAL FIELD

The present disclosure relates to magnetic devices. More specifically, the present disclosure relates to pole shoes for switchable magnetic devices.

BACKGROUND

A switchable magnetic device may be used to magnetically couple the magnetic device to one or more ferromagnetic bodies. A switchable magnetic device may include one or more magnet(s) that is (are) rotatable relative to one or more stationary magnet(s), to generate and shunt a magnetic field. The switchable magnet device may be attached in a removable manner, via switching the magnet device between an "on" state and an "off" state, to a ferromagnetic body (e.g., work piece), such as for object lifting operations, material handling, material holding, magnetically latching or coupling objects to one another, among other applications.

SUMMARY

Embodiments of the present disclosure relate to pole shoes for a switchable magnetic device. In embodiments, the pole shoes comprise a plurality of projections, which facilitate creating shallow magnetic fields in a ferromagnetic workpiece to be moved with the magnetic device, the shallow magnetic field having sufficient holding force to lift the coupled ferromagnetic workpiece and hold the ferromagnetic workpiece against shear forces during transport. As such, switchable magnetic devices including the pole shoes may be used to de-stack thin materials. Example embodiments include the following.

In an exemplary embodiment of the present disclosure, a magnetic device for magnetically coupling to a ferromagnetic body, comprises: a housing having a central bore; a plurality of pole sectors arranged within an envelope of the central bore and forming a workpiece contact interface of the magnetic device, each of the plurality of pole sectors comprising a plurality of spaced-apart pole portions arranged at respective distances, wherein a recess of a plurality of recesses separates each pole portion of the plurality of pole portions, wherein a first sector of the plurality of sectors form a first pole of the magnetic device and a second sector of the plurality of sectors form a second pole of the magnetic device; at least one first permanent magnet supported by the housing and having an active N-S pole pair; at least one second permanent magnet supported by the housing and having an active N-S pole pair, the at least one second permanent magnet being moveable relative to the first permanent magnet; and an actuator operatively coupled to the at least one second permanent magnet to move the at least one second permanent magnet relative to the at least one first permanent magnet, wherein the magnetic device establishes a first magnetic circuit with the at least one first permanent magnet and the at least one second permanent magnet through the plurality of pole sectors when the at least one second permanent magnet is positioned by the actuator in a first position relative to the at least one first permanent magnet and a second magnetic circuit with the first permanent magnet and the second permanent magnet when the second permanent magnet is positioned by the actuator in a second position relative to the at least one first permanent magnet.

In an example thereof, the at least one first permanent magnet comprises a first platter supported by the housing, the first platter comprising a first plurality of spaced-apart permanent magnet portions each having a north pole side and a south pole side and a first plurality of pole portions interposed between adjacent permanent magnet portions of the first plurality of permanent magnet portions, wherein the first platter comprises an equal number of permanent magnet portions and pole portions and the first plurality of permanent magnets are arranged so that each pole portion of the first plurality of pole portions is one of a north pole portion which is adjacent the north pole side of two permanent magnet portions of the first plurality of permanent magnet portions and a south pole portion which is adjacent the south pole side of two permanent magnet portions of the first plurality of permanent magnet portions; and wherein the at least one second permanent magnet comprises a second platter supported by the housing, the second platter comprising a second plurality of spaced-apart permanent magnet portions each having a north pole side and a south pole side and a second plurality of pole portions interposed between adjacent permanent magnet portions of the second plurality of permanent magnet portions, wherein the second platter comprises an equal number of permanent magnet portions and pole portions and the second plurality of permanent magnets are arranged so that each pole portion of the first plurality of pole portions is one of a north pole portion which is adjacent the north pole side of two permanent magnet portions of the second plurality of permanent magnet portions and a south pole portion which is adjacent the south pole side of two permanent magnet portions of the second plurality of permanent magnet portions, the second platter including a rotation engagement portion.

In another example thereof, the actuator rotates the at least one second permanent magnet relative to the at least one first permanent magnet.

In even another example thereof, the actuator is one of a rotary actuator and a linear actuator.

In even another example thereof, the actuator linearly translates the at least one second permanent magnet relative to the at least one first permanent magnet.

In even another example thereof, the at least one second permanent magnet is housed in a second housing received in the housing, the second housing being rotatable by the actuator to rotate the at least one second permanent magnet.

In another exemplary embodiment of the present disclosure, a magnetic device for magnetically coupling to a ferromagnetic body, comprises: a housing having a central bore; a plurality of pole sectors arranged within an envelope of the central bore and forming a workpiece contact interface of the magnetic device, each of the plurality of pole sectors comprising a plurality of spaced-apart pole portions arranged at respective distances, wherein a recess of a plurality of recesses separates each pole portion of the plurality of pole portions, wherein a first sector of the plurality of sectors form a first pole of the magnetic device and a second sector of the plurality of sectors form a second pole of the magnetic device; at least one first permanent magnet supported by the housing and having an active N-S pole pair; and an actuator operatively coupled to the at least one first permanent magnet to move the at least one first permanent magnet relative to a base of the housing, wherein the magnetic device establishes a first magnetic circuit through the plurality of pole sectors when the at least one first permanent magnet is positioned by the actuator in a first position relative to the base of the housing and a second magnetic circuit substantially within the housing when the at least one first permanent magnet is positioned by the actuator in a second position relative to the base of the housing.

In an example thereof, the first magnetic circuit passes through the first sector and the second sector to couple the ferromagnetic body to the magnetic device and the second magnetic circuit is substantially confined within at least a portion of the housing.

In another example thereof, each recess of the plurality of recesses is sized to prevent the ferromagnetic body from entering the respective recess.

In even another example thereof, each of the plurality of recesses has a respective profile extending between the adjacent pole portions, the respective profile having a continuous slope.

In even another example thereof, at least one of the plurality of recesses has a depth substantially equal to a thickness of the ferromagnetic body to be coupled to the magnetic device.

In even another example thereof, each of the recesses has a depth substantially equal to a thickness of the ferromagnetic body to be coupled to the magnetic device.

In even another example thereof, at least one of the recesses has a width substantially equal to a thickness of the ferromagnetic body to be coupled to the magnetic device.

In even another example thereof, each of the recesses has a width substantially equal to a thickness of the ferromagnetic body to be coupled to the magnetic device.

In even another example thereof, at least one of the recesses has a width substantially equal to a depth of the at least one recess.

In even another example thereof, each of the plurality of pole sectors is a single unitary pole sector.

In even another example thereof, each of the plurality of pole sectors extend below the housing such that the housing is spaced apart from the ferromagnetic body when the workpiece contact interfaces of the first sector and the second sector contact the ferromagnetic body.

In even another example thereof, further comprising a compressible member arranged between each of the plurality of pole portions.

In even another example thereof, the workpiece contact interface forms a non-linear workpiece contact interface.

In even another example thereof, the workpiece contact interface forms a linear workpiece contact interface.

In even another example thereof, the actuator is one of a hydraulic actuator, a pneumatic actuator, and an electrical actuator.

In even another example thereof, each of the plurality of pole sectors carries a compressible component positioned to be in contact with the ferromagnetic body when the ferromagnetic body is coupled to the magnetic device.

In even another example thereof, the magnetic coupling device is carried by at least one selected from the group of: mechanical gantry, crane hoist, stationary fixture, and a robotic fixture.

In another exemplary embodiment of the present disclosure, a method of attaching a magnetic device to a ferromagnetic body, the magnetic device configured to establish a first magnetic circuit and a second magnetic circuit and the magnetic device comprising a housing having a central bore, at least one first permanent magnet supported by the housing and having an active N-S pole pair, at least one second permanent magnet supported by the housing and having an active N-S pole pair, the at least one second permanent magnet being moveable relative to the first permanent magnet, and a plurality of pole sectors arranged within an envelope of the central bore and forming a workpiece contact interface of the magnetic device, the method comprising the steps of: contacting the ferromagnetic body with a first sector of the plurality of pole sectors, the first sector including a plurality of spaced-apart pole portions arranged at respective distances that collectively form the contact interface of the first sector; contacting the ferromagnetic body with a second sector of the plurality of sectors, the second sector including a plurality of spaced-apart pole portions that collectively form the contact interface of the second sector; and transitioning the magnetic device from an off-state to an on-state.

In an example thereof, the first magnetic circuit substantially passes through the first sector and the second sector to couple the ferromagnetic body to the magnetic device and the second magnetic circuit is substantially confined within at least a portion of the housing.

In another exemplary embodiment of the present disclosure, a magnetic coupling device for magnetic coupling to a ferromagnetic workpiece, comprises: a housing having a vertical axis extending between an upper portion of the housing and a lower portion of the housing; one or more ferromagnetic pieces arranged at or near an upper portion of the housing; a pole plate support by the housing, the pole plate comprising a plurality of projections that collectively form a workpiece contact interface for the ferromagnetic workpiece; a magnetic platter supported by the housing, the magnetic platter comprising more than one permanent magnet portions and a plurality of pole portions, wherein each permanent magnet portion of the one or more permanent magnet portions is arranged adjacent to two pole portions of the plurality of pole portions so that pole portions of the plurality of pole portions is one of: a north pole portion that is adjacent to a north pole side of at least one permanent magnet portion of the one or more permanent magnet portions and a south pole portion that is adjacent to a south pole side of at least one permanent magnet portion of the one or more permanent magnet portions; and wherein the magnetic platter is linearly translatable within the housing along the vertical axis to at least each of a first state and a second state, the magnetic platter being arranged adjacent to the one or more ferromagnetic pieces such that the magnetic coupling device establishes a first magnetic circuit through the one or more ferromagnetic pieces and provides a first magnetic field at the workpiece contact interface of the magnetic coupling device when the magnetic platter is in the first state and the magnetic platter being arranged spaced apart from the one or more ferromagnetic pieces such that the magnetic coupling device provides a second magnetic field at the workpiece contact interface when the magnetic platter is in the second state, the second magnetic field being a non-zero magnetic field strength.

Other aspects and optional and/or preferred embodiments will become apparent from the following description provided below with reference to the accompanying drawings.

BRIEF DESCRIPTION OF THE DRAWINGS

FIG. 1B illustrates a front representative view of the exemplary switchable magnetic device depicted in FIG. 1A in an on state.

FIG. 1C illustrates a side representative view the exemplary switchable magnetic device depicted in FIGS. 1A and 1B.

FIG. 3 illustrates a schematic exploded view of an exemplary switchable magnetic device with pole shoes.

FIG. 5A illustrates a front sectional view of the switchable magnetic device depicted in FIGS. 3 and 4 and the magnetic circuit created when the device is in an "off" state.

FIG. 5B illustrates a front sectional view of the switchable magnetic device depicted in FIGS. 3 and 4 and the magnetic circuit created when the device is in an "on" state.

FIG. 6 illustrates a side view of a portion of an exemplary pole shoe.

FIG. 7A illustrates a side view of a portion of another exemplary pole shoe and FIG. 7B illustrates a detail view of a portion of the exemplary pole shoe depicted in FIG. 7A.

FIG. 8 illustrates a side view of a portion of another exemplary pole shoe.

FIG. 11A illustrates a front view of another exemplary switchable magnetic device.

FIG. 11B illustrates a side view of the switchable magnetic device depicted in FIG. 11A.

Figure 1A:
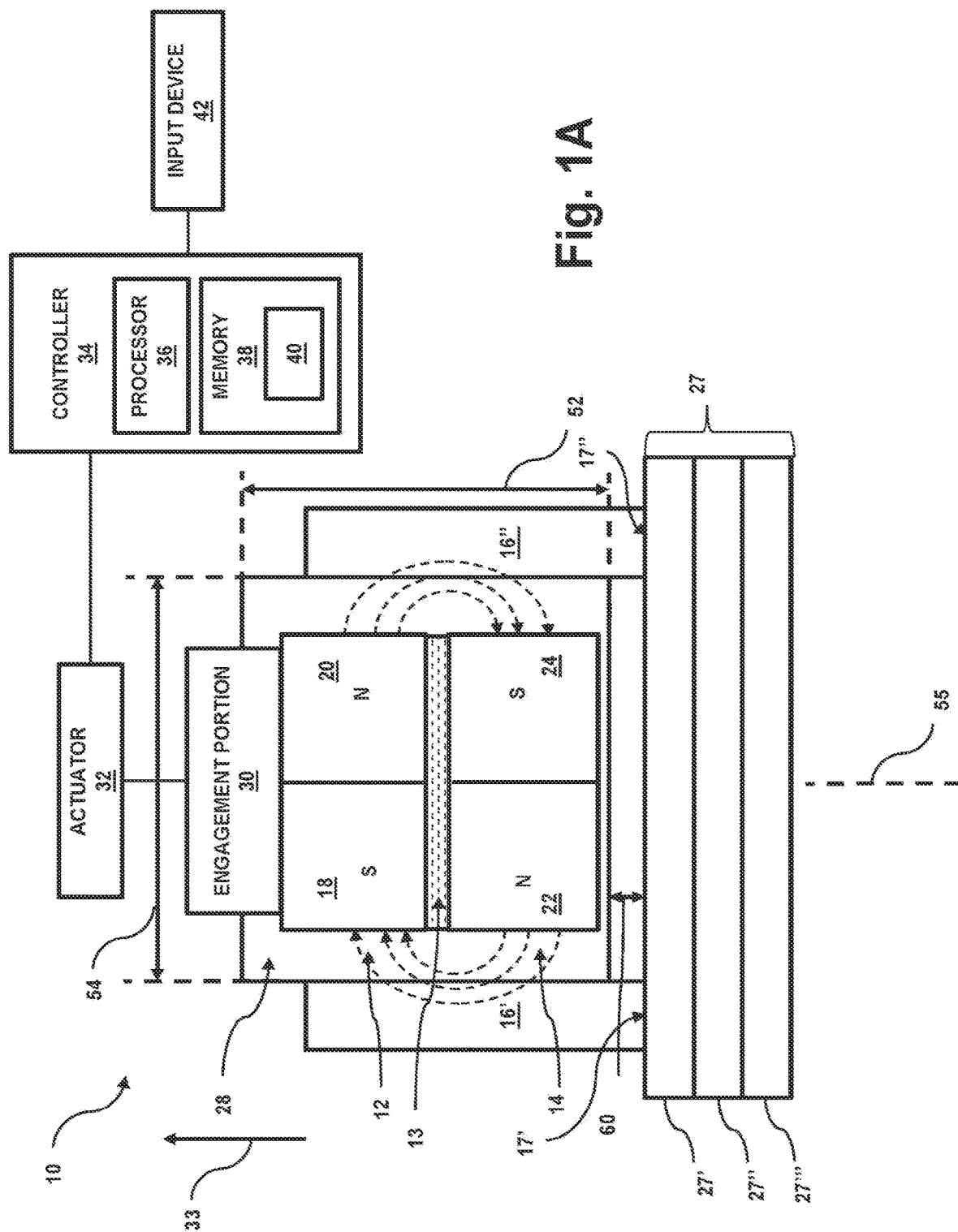
FIG. 1A illustrates a front representative view of an exemplary switchable magnetic device in an off state.

While the disclosed subject matter is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure.

DETAILED DESCRIPTION OF THE DRAWINGS

Embodiments provided herein relate to switchable magnetic devices. Exemplary switchable magnetic devices are disclosed in U.S. Pat. No. 7,012,495, titled SWITCHABLE PERMANENT MAGNETIC DEVICE; U.S. Pat. No. 7,161,451, titled MODULAR PERMANENT MAGNET CHUCK; U.S. Pat. No. 8,878,639, titled MAGNET ARRAYS, U.S. Provisional Patent Application No. 62/248,804, filed Oct. 30, 2015, titled MAGNETIC COUPLING DEVICE WITH A ROTARY ACTUATION SYSTEM, and U.S. Provisional Patent Application No. 62/252,435, filed Nov. 7, 2015, titled MAGNETIC COUPLING DEVICE WITH A LINEAR ACTUATION SYSTEM, the entire disclosures of which are expressly incorporated by reference herein.

The illustrated examples herein provide exemplary switchable magnetic devices having a first permanent magnet and a second permanent magnet movable relative to the first permanent magnet, similar to the exemplary switchable magnetic devices of the '495 Patent which is expressly incorporated by reference herein. The permanent magnets may each be cylindrical unitary di-pole body of a single type of rare earth magnet material, such as NdFeB or SmCo. Additional types of switchable magnetic devices may be implemented. Each type of switchable magnetic device includes at least a first permanent magnet that is movable relative to a second permanent magnet. Further, exemplary switchable magnetic devices may include a first plurality of permanent magnets movable relative to a second plurality of permanent magnets. Additionally, exemplary switchable magnetic devices may include at least a first permanent magnet positioned within a first housing which acts as a pole extension of the at least a first permanent magnet, the first housing being movable relative to a second housing having at least a second permanent magnet positioned within the second housing, the second housing acts as a pole extension of the at least a second permanent magnet.

Further, exemplary switchable magnetic devices may include a first plurality of permanent magnets movable relative to a second plurality of permanent magnets. Two examples are provided in FIGS. 15-18. Exemplary systems are disclosed in U.S. Provisional Patent Application No. 62/248,804, filed Oct. 30, 2015, titled MAGNETIC COUPLING DEVICE WITH A ROTARY ACTUATION SYSTEM, and U.S. Provisional Patent Application No. 62/252,435, filed Nov. 7, 2015, titled MAGNETIC COUPLING DEVICE WITH A LINEAR ACTUATION SYSTEM, and U.S. Pat. No. 7,161,451, the entire disclosures of which are expressly incorporated by reference herein.

Referring to FIGS. 1A-1C, an exemplary switchable magnetic device 10 is represented. Switchable magnetic device 10 includes an upper permanent magnet 12 and a lower permanent magnet 14 positioned in a stacked relationship in a housing 28. Permanent magnet 12 comprises a south-pole portion (S-pole portion) 18 and a north-pole portion (N-pole portion) 20. Similarly, permanent magnet 14 comprises a N-pole portion 22 and a S-pole portion 24. Housing 28 may include multiple components assembled together to form a housing. Further, housing 28 may include features to maintain permanent magnet 12 spaced apart from permanent magnet 14 or to incorporate spacers, such as spacer 13 in the illustrated embodiment, which maintains permanent magnet 12 is spaced apart relation relative to permanent magnet 14. Spacer 13 is made of a non-magnetic material to isolate permanent magnet 12 from permanent magnet 14.

Pole shoes 16', 16" are coupled housing 28. Pole shoes 16', 16" are made of a ferromagnetic material and are magnetically coupled to magnets 12, 14 through portions of housing 28. A lower portion of each of pole shoes 16', 16" include a workpiece contact interface 17', 17" which may be brought into contact with a workpiece 27, illustratively a top sheet 27' of ferromagnetic material of a stack of sheets 27', 27", and 27"' of the ferromagnetic material. Workpiece contact interfaces 17', 17" of pole shoes 16', 16" cooperate with magnets 12, 14 through pole shoes 16', 16" and housing 28 to form first and second poles of the magnets 12, 14. In one example, a single unitary pole shoes forms each of the pole shoes 16', 16". In another example, a plurality of pole shoes form each of the unitary pole shoes 16', 16".

In embodiments, permanent magnet 14 is fixed relative to housing 28 and permanent magnet 12 is movable within housing 28 relative to permanent magnet 14 in order to alter an alignment of the magnet portions 18, 20 of the permanent magnet 12 relative to the magnet portions 22, 24 of permanent magnet 14. In the illustrated embodiment, permanent magnet 12 is rotatable relative to permanent magnet 14.

Switchable magnetic device 10 based on the configuration of permanent magnets 12, 14 establishes two different magnetic circuits. In particular, switchable magnetic device 10 establishes a first magnetic circuit referred to as on-state of switchable magnetic device 10 when permanent magnet 12 is rotated such that the S-pole portion 18 of permanent magnet 12 is adjacent the S-pole portion 24 of permanent magnet 14 and the N-pole portion 20 of permanent magnet 12 is adjacent the N-pole portion 22 of permanent magnet 14 (shown in FIG. 1B). In the on-state, one or more workpieces 27 being made of a ferromagnetic material, such as iron or steel, are held by the switchable magnetic device 10 due to a completion of the magnetic circuit from the aligned N-pole portions 20, 22 of the upper and lower magnets 12, 14, respectively, through the housing 28 and pole shoe 16', through one or more workpiece sheets 27, through pole shoe 16" and housing 28, and to the aligned S-pole portions 18, 24 of the upper and lower magnets 12, 14, respectively. The workpiece contact interface 17' of pole shoe 16' functions as a North pole of switchable magnetic device 10. The workpiece contact interface 17" of pole shoe 16" functions as a South pole of switchable magnetic device 10.

As explained in more detail herein the size and shape of pole shoes 16', 16" result in the first magnetic circuit being substantially confined to workpiece sheet 27' of workpiece sheets 27 and of sufficient holding force to vertically lift workpiece sheet 27' in direction 33 relative to the remainder of workpiece sheets 27. Thus, switchable magnetic device 10 may function to de-stack workpiece sheets 27. Of course, in some embodiments, a portion of the magnetic flux provided to workpiece sheets 27 by switchable magnet device 10 may enter lower sheet 27" of workpiece sheets 27, but not to a level that results in lower sheet 27" being lifted by switchable magnetic device 10 along with workpiece sheet 27'. Thus, as used herein, the first magnetic circuit being substantially confined to workpiece sheet 27' of workpiece sheets 27 means that the amount, if any, of the magnetic flux from switchable magnetic lifting device 10 entering lower sheet 27" is below a level that would result in the lower sheet 27" being vertically lifted in direction 33 by switchable magnetic lifting device 10 along with workpiece sheet 27'.

Switchable magnetic device 10 establishes a second magnetic circuit referred to as off-state of switchable magnetic device 10 when permanent magnet 12 is rotated such that the S-pole portion 18 of permanent magnet 12 is adjacent the N-pole portion 22 of permanent magnet 14 and the N-pole portion 20 of permanent magnet 12 is adjacent the S-pole portion 24 of permanent magnet 14 (shown in FIG. 1A). In the off-state, one or more workpieces 27 being made from a ferromagnetic material, such as iron or steel, are not held by the switchable magnetic device 10 due to a completion of a magnetic circuit between switchable magnetic device 10 and the workpiece sheets 27 because the aligned S-pole portion 18 of magnet 12 and the N-pole portion 22 of magnet 14 and the aligned N-pole portion 20 of magnet 12 and the S-pole portion 24 of magnet 14. In other words, the alignment of the magnets 12, 14 results in a shunted magnetic circuit substantially within the switchable magnetic device 10 causing the external magnetic field to collapse. In one example, at least 96% percent of the magnetic flux produced by magnets 12, 14 is retained in switchable magnetic device 10 when switchable magnetic device 10 is in the off state. In another example, at least 99% of the magnetic flux produced by magnets 12, 14 is retained at the workpiece contact interfaces 17', 17".

Returning to FIG. 1A, switchable magnetic device 10 includes an engagement portion 30 and an actuator 32.

Engagement portion 30 couples actuator 32 to permanent magnet 12 such that actuator 32 may reorient permanent magnet 12 relative to permanent magnet 14. Exemplary engagement portions 30 include one or recesses in permanent magnet 12 and/or a housing supporting permanent magnet 12, one or more protrusions extending from permanent magnet 12 and/or a housing supporting permanent magnet 12, and/or one or more linkages or gear systems coupled to permanent magnet 12 and/or a housing supporting permanent magnet 12. Exemplary actuators include rotary actuators and linear actuators, each of which through engagement portion 30 can impart a rotation to permanent magnet 12.

Exemplary engagement portions and actuators are disclosed in U.S. Pat. No. 7,012,495, titled SWITCHABLE PERMANENT MAGNETIC DEVICE; U.S. Pat. No. 7,161,451, titled MODULAR PERMANENT MAGNET CHUCK; U.S. Pat. No. 8,878,639, titled MAGNET ARRAYS, U.S. Provisional Patent Application No. 62/248,804, filed Oct. 30, 2015, titled MAGNETIC COUPLING DEVICE WITH A ROTARY ACTUATION SYSTEM, and U.S. Provisional Patent Application No. 62/252,435, filed Nov. 7, 2015, titled MAGNETIC COUPLING DEVICE WITH A LINEAR ACTUATION SYSTEM, the entire disclosures of which are herein expressly incorporated by reference.

In embodiments, actuator 32 is coupled to an electronic, pneumatic, or hydraulic controller 34 which controls the operation of actuator 32 and hence the alignment of permanent magnet 12 relative to permanent magnet 14 through engagement portion 30. As illustrated in FIG. 1A, controller 34 includes a processor 36 with an associated computer readable medium, illustratively memory 38. Memory 38 includes a magnetic coupler state logic 40 which when executed by processor 36 causes electronic controller 34 to instruct rotary actuator 32 to move permanent magnet 12 so that switchable magnetic device 10 is placed in one of the on-state and the off-state. The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. This disclosure contemplates other embodiments in which the magnetic coupler state logic is not microprocessor-based, but rather is configured to control operation of switchable magnetic device 10 based on one or more sets of hardwired instructions and/or software instructions stored in memory 38. Further, controller 34 may be contained within a single device or be a plurality of devices networked together to provide the functionality described herein.

In embodiments, the electronic controller 34 changes the state of switchable magnetic device 10 in response to an input signal received from an input device 42. Exemplary input devices include switches, buttons, touch screens, microphones, detectors, controllers, and other devices whereby an operator may provide one of a tactile, audio, or visual input command. For example, in one embodiment, switchable magnetic device 10 is coupled to an end of arm of a robotic arm and input device 42 is a network interface over which controller 34 receives instructions from a robot controller on when to place switchable magnetic device in one of an on-state and an off-state. Exemplary network interfaces include a wired network connection and an antenna for a wireless network connection. While the embodiments discussed above relate to electronic, pneumatic, or hydraulic actuation, in alternative embodiments, the switchable magnetic device 10 may be actuated manually. Exemplary manual actuators include handles, knobs, and other devices actuatable by a human operator.

Referring to FIG. 1C, pole shoes 16', 16" (pole shoe 16" illustrated) includes a plurality of projections 44 and recesses 46 separating the projections 44. In embodiments, the pole shoes 16', 16" may include any number of recesses 46 and any number of projections 44 arranged on each side of the recesses 46. The plurality of recesses 46 are sized to prevent the workpieces 27 from entering the respective recesses 46. As such, an interface 17 for a workpiece 27 is formed collectively by the projections 44. In one example, each of pole shoes 16', 16" has a first number of projections 44 and a second number of recesses 46 interposed between the first number of projections, the second number being at least two. In a variation thereof, the second number is at least three. In a further variation thereof, the second number is at least five.

As a result of the projections 44 and recesses 46 the switchable magnetic device 10 produces an external magnetic field 50 (shown in FIG. 1B) that is more concentrated closer to interface 17 than an external magnetic field that would be produced by the same magnetic device 10 if the pole shoes 16', 16" didn't include the projections 44 and recesses 46. More specifically, as illustrated in FIG. 1B, the external magnetic field 50 substantially passes through the first workpiece 27' while substantially none of the magnetic field 50 passes through either the second workpiece 27" and/or the third workpiece 27'''. While the magnetic field 50 illustrates that substantially none of the magnetic field 50 passes through the second workpiece 27", some of the magnetic field 50 may leak into the second workpiece 27". Conversely, if the pole shoes 16', 16" didn't include the projections 44 and recesses 46, then the external magnetic field 50 would likely penetrate deeper into the stack of workpiece sheets 27 into second workpiece sheet 27" and/or the third workpiece sheet 27'''. This would lower the chance that the upper workpiece sheet 27' could be de-stacked from the second workpiece sheet 27".

Tables 1 and 2 illustrate the average breakaway force of switchable magnetic devices on workpieces having different thicknesses. Specifically, Table 1 illustrates switchable magnetic devices having a first type of magnet, wherein a first switchable magnetic device of the switchable magnetic devices having a first type of magnet has pole shoes that don't have projections 44 and a second switchable magnetic device 10 of the switchable magnetic devices having a first type of magnet has pole shoes 16', 16" that do have projections 44. Table 2 illustrates switchable magnetic devices having a second type of magnet, wherein a first switchable magnetic device of the switchable magnetic devices having a second type of magnet has pole shoes that don't have projections 44 and a second switchable magnetic device 10 of the switchable magnetic devices having a second type of magnet has pole shoes 16', 16" that do have projections 44.

TABLE 1

Average breakaway force of magnetic devices on workpieces having different thicknesses, wherein the magnetic devices have a first type of magnet

| Thickness of Workpiece (mm) | Magnetic device having pole shoes without projections (Kg) | Magnetic device having pole shoes with projections (Kg) |
|---|---|---|
| 0.5 | 9.37 | 11.47 |
| 1.0 | 26.30 | 27.80 |
| 2.0 | 47.80 | 40.87 |
| 3.0 | 62.73 | 44.77 |
| 4.0 | 63.87 | 45.57 |
| 5.0 | 64.77 | 46.73 |
| 6.0 | 65.73 | 47.63 |
| 10.0 | 66.23 | 48.47 |

TABLE 1

Average breakaway force for magnetic devices on workpieces having different thicknesses, wherein the magnetic devices have a second type of magnet

| Thickness of Workpiece (mm) | Magnetic device having pole shoes without projections (Kg) | Magnetic device having pole shoes with projections (Kg) |
|---|---|---|
| 0.5 | 7.87 | 9.33 |
| 1.0 | 22.67 | 24.50 |
| 2.0 | 43.63 | 37.10 |
| 3.0 | 56.83 | 40.77 |
| 4.0 | 57.37 | 41.37 |
| 5.0 | 57.97 | 41.77 |
| 6.0 | 58.40 | 42.13 |
| 10.0 | 58.77 | 42.40 |

As shown in the data, the switchable magnetic device 10 having pole shoes 16', 16" with projections 44 has a higher average breakaway force on thinner workpieces than the switchable magnetic device having pole shoes without projections. Moreover, as the thickness of the workpiece increases, the switchable magnetic device 10 having pole shoes 16', 16" with projections 44 has a lower overall average breakaway force.

As a result of the magnetic field 50 being concentrated near the interface 17 of the pole shoes 16', 16", a switchable magnetic device 10 including the pole shoes 16', 16" with projections 44 and recesses 46 provides better de-stacking capabilities compared to the same switchable magnetic device 10 that would include pole shoes without the projections and recesses. For example, the switchable magnetic device 10 including the pole shoes 16', 16" having the projections 44 and recesses 46 may be better able to de-stack thin sheet metal (e.g., 0.5 mm sheet metal, 1 mm sheet metal, 2 mm sheet metal, and/or the like) than the same switchable magnetic device 10 that had pole shoes that didn't include the projections 44 and recesses 46.

In addition, the dimensions of the projections 44 and recesses 46 may be further configured to produce varying strengths of magnetic fields near the interface 44. That is, additional concentration of the magnetic field 50 near the interface 17 of pole shoes 16', 16" may be achieved by lengthening pole shoes 16', 16" relative to housing 28 and hence relative to magnets 12, 14. In embodiments, the upper and lower magnets 12, 14 and housing 28, which serves as a pole extension piece for magnets 12, 14, may have an outer envelope that is defined by a height 52 (see FIG. 1B) of housing 28, a width 54 (see FIG. 1B) of housing 28, which extends on each side of a centerline 55 of switchable magnetic device 10, and a length 58 of (see FIG. 1C) of housing 28. As shown in FIG. 1B, pole shoe 16' is arranged on one side of the centerline 55 of switchable magnetic device 10 and the pole shoe 16" is arranged on an opposite side of the centerline 55 of switchable magnetic device 10. In one example, the pole shoes 16', 16" extend beyond at least one of the height 52, the width 54, and/or the length 58 of the envelope of housing 28. In the illustrated embodiment, the pole shoes 16', 16" extend beyond the height 52 (lower than housing 28, see FIG. 1B), width 54 (positioned outboard of housing 28, see FIG. 1B), and length 58 (both forward of and rearward of housing 28, see FIG. 1C) of the envelope of housing 28.

In some embodiments, the distance 60 (shown in FIG. 1A) between the bottom of housing 28 and interface 17 of pole shoes 16', 16" and/or length 62 of pole shoes 16', 16" (shown in FIG. 1C) may be varied to produce different magnetic field strengths near interface 17, as discussed below in relation to FIGS. 11A, 11B.

While the embodiments disclosed in relation to FIGS. 1A-1C included one upper magnet 12 and one lower magnet 14, in alternative embodiments, the switchable magnetic device 10 may comprise more than one upper magnet 12 and more than one lower magnet 14. One such example is shown in FIGS. 2A and 2B.

Figure 2B:
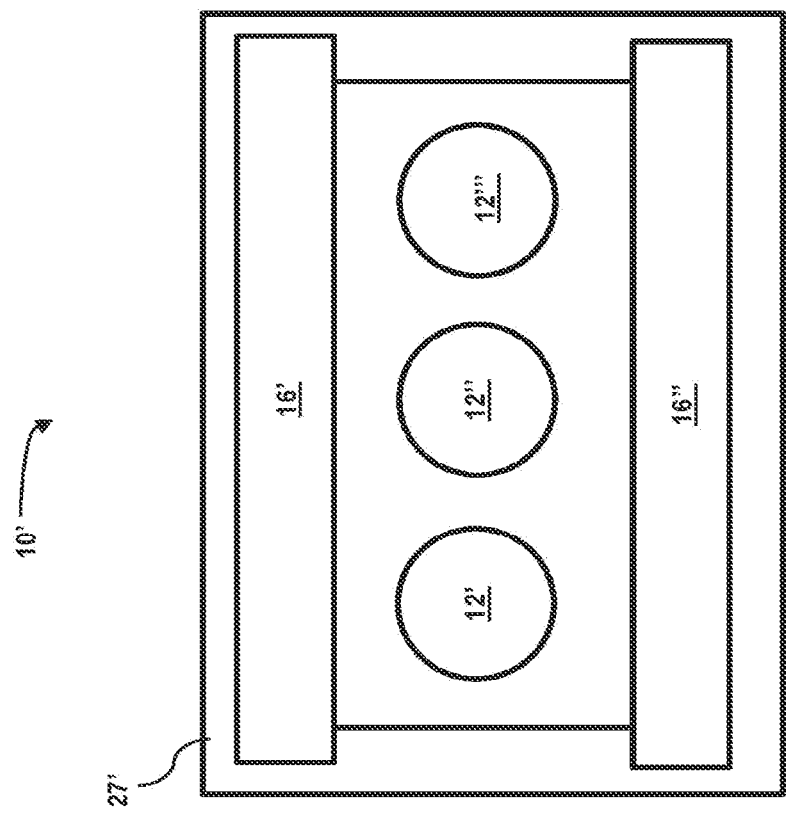
FIG. 2B illustrates a top representative view of the exemplary switchable magnet depicted in FIG. 2A.
Figure 2A:
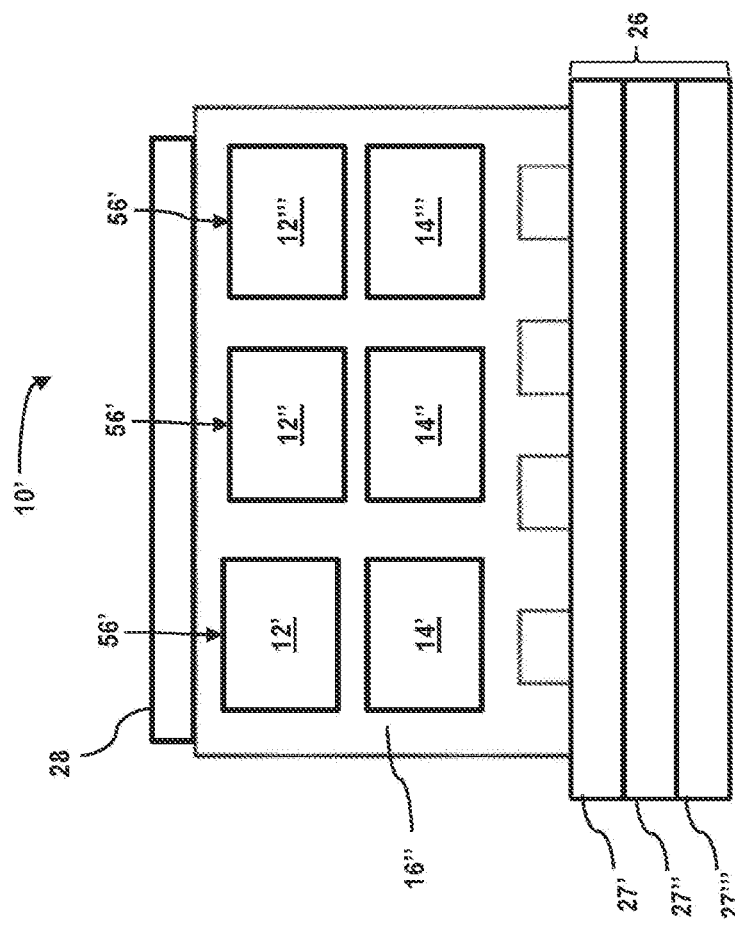
FIG. 2A illustrates a side representative view of another exemplary switchable magnetic device.

FIG. 2A is a side representative view of another exemplary switchable magnetic device 10' and FIG. 2B is a top representative view of switchable magnet 10'. As illustrated in FIGS. 2A and 2B, switchable magnetic device 10' includes a plurality of upper permanent magnets 12 and a plurality of lower permanent magnets 14, illustratively three upper magnets 12', 12", 12'" and three lower magnets 14', 14", 14'". Upper and lower magnets 12', 14' form a first set of magnets 56'. Upper and lower magnets 12", 14" form a second set of magnets 56". Upper and lower magnets 12'", 14'" form a third set of magnets 56'". The sets of magnets 56', 56", 56'" are separated from one another.

Each set of magnets 56', 56", 56'" produces a magnetic field that propagates from respective N-poles of the sets of magnets 56', 56", 56'" through the pole shoes 16', 16" to respective south poles of the sets of magnets 56', 56", 56'". In embodiments where magnetic device 10' is in an on-state, the magnetic field extends through workpiece 27' when workpiece 27' is in contact with interface 17 of pole shoes 16', 16". When magnetic device 10' is in an off-state, the magnetic field is substantially confined internally to magnetic device 10'. While pole shoes 16', 16" are illustrated as spanning the sets of magnets 56', 56", 56'" in alternative embodiments, the switchable magnetic device 10' may include multiple pole shoes 16', 16" that collectively span the sets of magnets 56', 56", 56'". Additionally or alternatively, the switchable magnetic device 10' may include 2, 4, 5, etc. sets of magnets 56', 56", 56'".

While the switchable magnetic device 10 is described as being in a stacked relationship, other switchable magnetic devices that don't have magnets in a stacked relationship may be used in conjunction with the pole shoes 16', 16". Exemplary non-stacked switchable magnetic devices are described in U.S. patent application Ser. No. 15/803,753, filed Nov. 4, 2017, titled MAGNET ARRAYS, the entire disclosure of which is expressly incorporated herein by reference.

Figure 4:
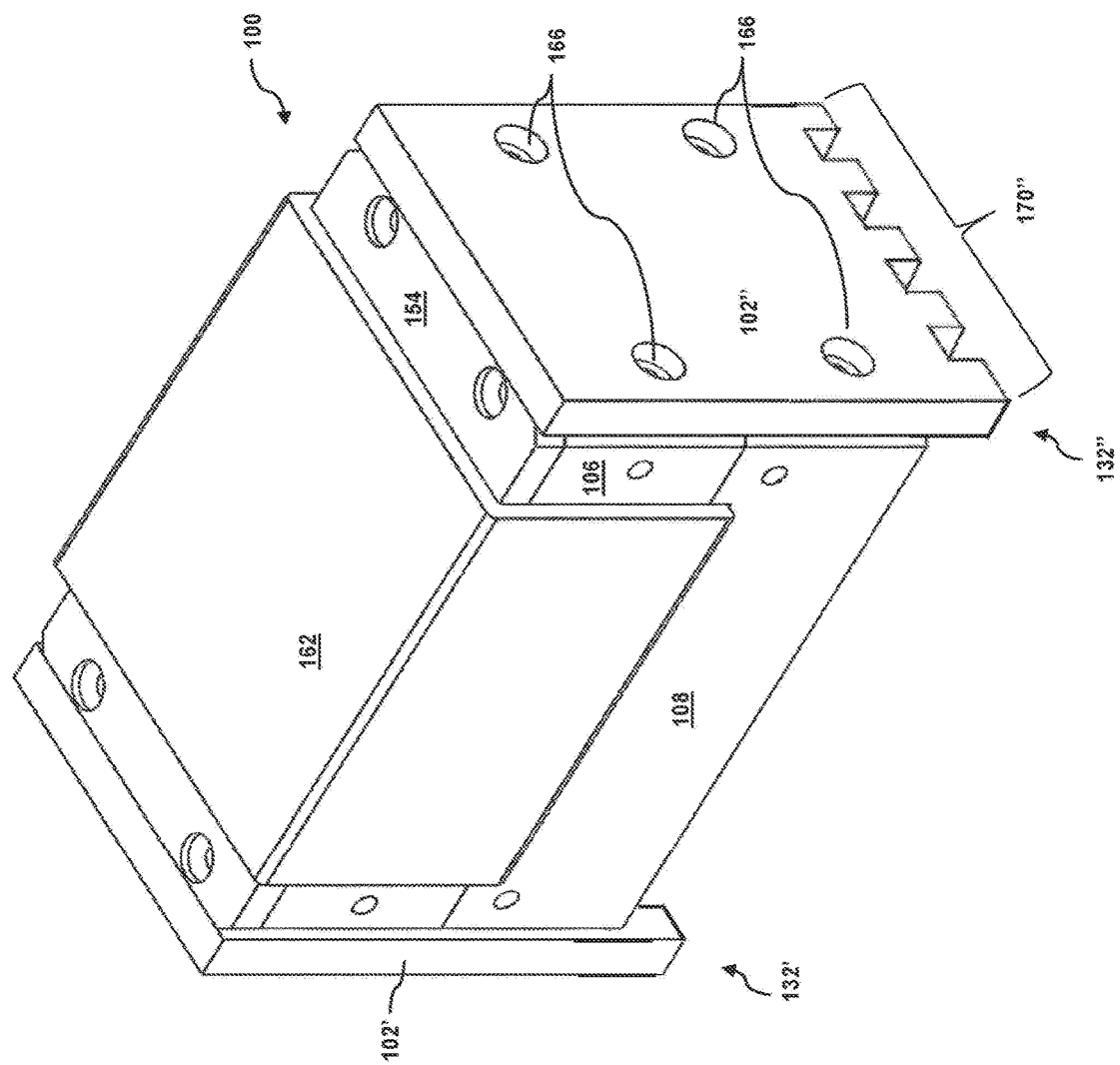
FIG. 4 illustrates an isometric view of the switchable magnetic device depicted in FIG. 3 in an assembled state.

Additional details of an exemplary switchable magnetic device 100 are discussed next in relation to FIGS. 3 and 4. In particular, FIG. 3 is a schematic exploded view of an exemplary switchable magnetic device 100 with ferromagnetic pole shoes 102', 102" and FIG. 4 is an isometric view of the switchable magnetic device 100 in an assembled state. Additional details regarding magnetic device 100 are provided in U.S. Provisional Application Ser. No. 62/517,057, filed Jun. 8, 2017, titled ELECTROMAGNET-SWITCHABLE PERMANENT MAGNET DEVICE, the entire disclosure of which is expressly incorporated by reference herein.

During the discussion of FIGS. 3 and 4, reference will also be made to FIG. 5A which is a front sectional view of switchable magnetic device 100 and the magnetic circuit created when the device is in a first configuration, i.e., the off-state. Additionally, reference also be made to FIG. 5B which is a front sectional view of the switchable magnetic device 100 when the magnetic device 100 is in a second configuration, i.e., the on-state.

Magnetic device 100 may have a plurality of configurations that result in establishing different magnetic circuits. For example, switching the magnetic device 100 from a second configuration (shown in FIG. 3 and FIG. 5A), wherein the magnetic device 100 establishes a second magnetic circuit, to a first configuration (shown in FIG. 5B), wherein the magnetic device 100 establishes a first magnet circuit, may couple a ferromagnetic body to the magnetic device 100 via the pole shoes 102', 102", as explained below.

Magnetic device 100 comprises a central housing 104. The central housing 104 includes two, ferromagnetic (e.g., steel) housing components 106, 108, which may be joined by fasteners (not shown). The housing components 106, 108 may additionally or alternatively be joined using other methods and materials (e.g., epoxies, locating features (projections, indentations, chamfers, molded keyways, and/or the like), etc.). Housing component 106 may be referred to herein as the upper housing component 106 and housing component 108 may be referred to herein as the lower housing component 108. Further, pole shoes 102', 102" may be coupled to housing 104 with fasteners (not shown).

In embodiments, housing components 106, 108 may be a rectangular parallelepiped block of low reluctance ferromagnetic material. A cylindrical cavity 110 may extend through upper housing component 106 and a cylindrical cavity 112 may extend through lower housing component 108. Cylindrical cavities 110, 112 may be perpendicular to top faces 114, 116 of the respective housing components 106, 108. Cylindrical cavity 110 may be referred to herein as the upper cylindrical cavity 110 and cylindrical cavity 112 may be referred to herein as the lower cylindrical cavity 112. In embodiments, cylindrical cavities 110, 112 may respectively receive magnets 118, 120. Magnet 118 may be referred to herein as the upper magnet 118 and magnet 120 may be referred to herein as the lower magnet 120.

Upper housing component 106 has two sidewalls 124', 124" and lower housing component 108 has two sidewalls 126', 126". In embodiments, sidewalls 124', 124" of upper housing component 106 and sidewalls 126', 126" of lower housing component 108 may have a thickness that contains the magnetic field generated by magnets 118, 120 within housing components 106, 108 when magnetic device 100 is in the first configuration (shown in FIG. 5A).

In embodiments, upper magnet 118 has a N-S axis 128 and lower magnet 120 has a N-S axis 130. Magnets 118, 120 may be NdFeB magnets and the active magnetic mass and magnetic properties of magnets 118, 120 may be equal and/or equal within achievable manufacturing tolerances and permanent magnet magnetization technologies.

In embodiments, lower magnet 120 is received and fixed against rotation in lower cylindrical cavity 112 in a manner that N-S axis 130 extends from the sidewall 126' to the sidewall 126". As a result, sidewalls 126', 126" are magnetized in accordance with the active magnetic pole next to it. That is, sidewall 126' is magnetized as a N-pole whereas sidewall 126" becomes a S-pole. In contrast, because upper magnet 118 is free to rotate about axis 122, in absence of pole shoes 102', 102", the polarity of sidewalls 124', 124" would be determined by the relative rotational position and orientation of upper magnet 118.

As stated above, upper magnet 118 is configured to be rotated from the orientation shown in FIG. 3. In embodiments, upper magnet 118 may be rotatable by 180-185 degrees to a rotational position in which its N-pole coincides with the N-pole of lower magnet 120 and conversely the S-poles overlie each other (see FIG. 5B). When the N-S axes 128, 130 are oriented parallel, both sidewalls 124', 126' will be magnetized with the same North magnetic polarity, as will the adjoining pole shoe 102'. Further, sidewalls 124", 126" will be magnetized with the same South magnetic polarity, as will be the adjoining pole shoe 102". This re-orientation of upper magnet 118 will create an 'active' working air gap at the lower axial workpiece contact interface 132', 132" of pole shoes 102', 102", thereby enabling the creation of a low reluctance, closed magnetic circuit to be formed. In particular, the low reluctance, closed magnetic circuit originates and finishes in the magnets 118, 120, through the sidewalls 124', 124", 126', 126", the pole shoes 102', 102" and a ferromagnetic body that is perhaps touching both the workpiece contact interfaces 132', 132" of pole shoes 102', 102". This state may be referred in to herein as the magnetic device 100 being in an on-state (see FIG. 5B). Conversely, the state where N-S axes 128, 130 are oriented anti-parallel, a closed magnetic circuit is formed within the magnetic device 100 and may be referred to as the magnetic device 100 being in an off-state (see FIG. 5A).

Upper cylindrical cavity 110 may have a smooth wall surface, and a diameter that allows upper magnet 118 to be received therein so it can rotate with minimal friction about the N-S axis 128 and preferably maintain a minimal airgap. In embodiments, a friction reducing coating may be applied to upper cylindrical cavity 110. Lower cylindrical cavity 112 may have a roughened wall surface and a diameter that provides an interference fit with lower magnet 120 such that when lower magnet 120 is mounted within lower cylindrical cavity 112, it maintains its rotational orientation and is prevented from axial and rotational displacement under operating conditions of magnetic device 100. Additionally or alternatively, other mechanisms can be used, such as gluing or additional cooperating form-fitting components (not shown) to secure lower magnet 120 within lower cylindrical cavity 112.

A circular disk 134 comprised of ferromagnetic material may be arranged at the bottom of lower cylindrical cavity 112. Circular disk 134 may support lower magnet 120. In embodiments, circular disk 134 may be press fitted or otherwise secured such as to close the lower end of lower cylindrical cavity 112 to seal lower cylindrical cavity 112 and lower magnet 120 against contamination at a working face 136 of magnetic device 100. The ferromagnetic nature of circular disk 134 may assist in completing the magnetic circuit by providing additional magnetisable material between the sidewalls 126', 126", so that the field of the lower magnet 120 couples exclusively with the magnetic material provided in the lower housing component 108 and pole shoes 102', 102" in order to form a magnetic circuit in either the on or off states. This also allows for magnetic device 100 to operate with greater holding force when turned on and cancels out any holding force when turned off.

In embodiments, a support structure 138 may be located between the magnets 118, 120. Support structure 138 may support the upper magnet 118 within upper cylindrical cavity 110. Additionally or alternatively, support structure 138 may facilitate maintaining a set axial distance between lower circular face of the upper magnet 118 and the upper circular face of lower magnet 120. In embodiments, support structure 138 may include a circular bottom plate 140 of non-magnetisable metallic material, a rotation bearing 142, and a circular non-magnetic upper plate 144. In embodiments, bottom plate 140 rests on the upper face of the lower magnet 120 and closes the upper open end of lower cylindrical cavity 112. In embodiments, bottom plate 140 may be transition-fitted into the open end of lower cylindrical cavity 112. Rotation bearing 142 may be seated in an appropriately sized cylindrical depression (or seat) in an upper surface of bottom plate 140. The diameter of upper plate 144 is such that it can rotate within the lower terminal axial end of the upper cylindrical cavity 110. That is, upper plate 144 may have a diameter similar to that of upper magnet 118 which sits with its lower axial end face on upper plate 144. In embodiments, an upper face of upper plate 144 may be coated with a slip promoting PTFE coating and a lower face of the upper plate 144 may include a boss or axle stump (not shown). In embodiments, the axle stump may sit within the inner ring bearing part of rotation bearing 142. Additionally or alternatively, a non-magnetisable (e.g., aluminium) circular cap (not shown) may be mounted to upper housing component 106 to cover upper cylindrical cavity 110.

In embodiments, support structure 138 may be replaced by a different type of arrangement, in which upper magnet 118 is secured against a shaft 146 while allowing free rotation thereof, by way of a retainer clip ring (not shown) secured in an annular groove (not shown) near a lower end of shaft 146.

In embodiments, shaft 146 penetrates through a hole 148 in upper magnet 118, so that upper magnet 118 may rotate coaxially around shaft 146. In embodiments, shaft 146 protrudes perpendicular from a central hub portion 152 of a cap component 150, so that positioning of shaft 146 by the installation of cap component 150 cooperates with upper magnet 118 to ensure its concentric rotation within the cylindrical cavity of upper housing component 106. In the illustrated embodiments, shaft 146 is a cylindrical pin welded or otherwise fixed to cap component 150.

In embodiments, cap component 150 may be non-magnetisable and comprise a rectangular plate 154 with an arcuate window 156. In embodiments, rectangular plate 154 may be machined to have a similar footprint to that of housing components 106, 108, i.e., rectangular. The terminal opposite ends of acuate window 156 provide "hard stops" for a rotation arresting block member 158 which is fixed to upper magnet 118 so that block member 158 may travel within the arcuate window 156 during rotation of upper magnet 118 when magnetic device 100 is switching between configurations. In embodiments, arcuate window 156 may include a latch mechanism 160 which operates to hold an intermediate rotational state of upper magnet 118 between the hard stops provided by the ends of the arcuate window 156. Thus, upper magnet 118 may be secured at intermediate rotational positions with respect to lower magnet 120. Additionally or alternatively, latch mechanism 160 may be included in upper housing component 106 or another portion of magnetic device 100.

In one embodiment, shaft 146 is coupled to an actuator 32 which moves upper magnet 118 to various positions relative to lower magnet 120. In the illustrated embodiment, one or more solenoid coil body 162 surround upper housing 106 and orient upper magnet 118 relative to lower magnet 120 through one or more currents passing through solenoid coil body 162. The solenoid coil body 162 may consist of enamel coated wire windings wrapped (or otherwise placed). In embodiments, the enamel coated wires may be comprised of one or more conductive materials (e.g., copper, silver, gold, and/or the like).

Cap component 150 may be further configured to support/house various electronic control and power components associated with and required to supply current to solenoid coil body 162 for rotating upper magnet 118 as will be described below. Alternatively, the cap component 150 may include contact leads for connecting to a power supply (not shown) that supplies current to the solenoid coil body 162. In embodiments, cap component 150 may be secured to upper housing component 106 using bolts or other types of fasteners.

In embodiments, a power supply (not shown) may be connected to the solenoid coil body 162 via suitable control circuitry to supply a current to the solenoid coil body 162. In response to current being supplied to the solenoid coil body 162, the solenoid coil body 162 produces a magnetic field. In embodiments, the magnetic field produced by solenoid coil body 162 is oriented in a manner to produce a torque on upper magnet 118. The torque rotates the N-S axis 128 of upper magnet 118 from a first configuration (shown in FIG. 5A) to the second configuration (shown in FIG. 5B). Additionally or alternatively, upper magnet 118 may be stopped at various intermediate configurations by the latch mechanisms 160.

In embodiments, magnets 118, 120 may have different magnetization and coercivity properties. For example, lower magnet 120 may be comprised of high coercivity permanent magnet, which cannot be easily demagnetized by an external magnetizing influence, and upper magnet 118 may be comprised of a medium or low coercivity magnetic element. Accordingly, the magnetic field produced by solenoid coil body 162 may affect upper magnet 118 to a greater degree than lower magnet 120.

In embodiments, solenoid coil body 162 may comprise multiple solenoid coil bodies. For example, solenoid coil body 162 may comprise two solenoid coil bodies that are electrically isolated from each other and extend from one corner of the upper housing component 106, diagonally across a top face of upper housing component 106 to the opposing corner of upper housing component 106 and underneath upper housing component 106 to complete a winding. The respective coils may be wrapped on opposing diagonals across upper housing component 106 and cap component 150, one coil being wrapped over the other, so that they form an 'X' of windings when viewed in top plan view of upper housing component 106. While the magnetic device 100 is described herein as being electrically actuated by solenoid coil body 162, the magnetic device 100 may be actuated with an electrical actuator through a mechanical connection, such as a motor, a pneumatic actuator, a hydraulic actuator, or a manual actuator, in embodiments.

As illustrated, threaded bores 164 may be cut into the sidewalls 124', 124", 126', 126". Threaded bores 164 may facilitate securing pole shoes 102', 102" to housing components 106, 108 via fastening screws or bolts (not shown). That is, fastening screws or bolts may be inserted through countersunk through bores 166 of pole shoes 102', 102", whose spacing equals that of threaded bores 164. Both housing components 106, 108 may thus be connected to pole shoes 102', 102" in a way that provides a substantially gap-free, low reluctance magnetic circuit path between magnets 118, 120, sidewalls 124', 124", 126', 126", and pole shoes 102', 102".

Pole shoes 102', 102" provide a ferromagnetic workpiece contact interface for the magnetic device 100. In embodiments, pole shoes 102', 102" may be comprised of a low magnetic reluctance ferromagnetic material. While pole shoes 102', 102" are depicted as having a parallelepiped, plate-like shape, pole shoes 102', 102" may have other shapes, which may be based on the shape of a workpiece to which the magnetic device 100 will attach. One example, is the cylindrical shape shown in FIGS. 9A-9B which matches a cylindrical shape of a workpiece, such as a pipe. Another example, is the v-shape shown in FIGS. 10A-10B, which matches edges or corners of a workpiece.

As illustrated, the pole shoes 102', 102" include portions 168', 168" positioned proximate to housing components 106, 108. As stated above, these portions 168', 168" are secured to housing components 106, 108 via one or more fastening devices (e.g., screws, etc.). Additionally, pole shoes 102', 102" comprise a plurality of protrusions 170', 170" also referred to herein as projections. The plurality of protrusions 170', 170" respectively collectively form workpiece contact interfaces of the pole shoes 102', 102". In embodiments, pole shoes 102', 102" that include the plurality of projections 170', 170" create a shallower magnetic field than pole shoes having a flat workpiece contact interface, as explained in the examples provided herein.

FIG. 6 is a side view of a portion of an exemplary pole shoe 200 which may serve as either pole shoe 132' or pole shoe 132" of magnetic device 100. Pole shoe 200 comprises a first portion 202 that can be positioned proximate the housing (e.g., the housing 104) of a magnetic device (e.g., the magnetic device 100). Pole shoe 200 may also include bores 204 extending through pole shoe 200 to releasably secure pole shoe 200 to a housing of a magnetic device via a fastening mechanism (e.g., fastening screws, etc.). Furthermore, pole shoe 200 includes a plurality of projections 206 arranged on a bottom portion 208 of pole shoe 200. Each of projections 206 are separated by recess portions 210. Additionally, the plurality of projections 206 collectively form a workpiece contact interface 212 of pole shoe 200.

As stated above, due to the plurality of projections 206 included in pole shoe 200, a magnetic device including pole shoe 200 produces a stronger magnetic field near workpiece contact interface 212 than a magnetic device including a pole shoe having a flush continuous lower profile. The magnetic field produced near workpiece contact interface 212 may be referred to herein as the shallow magnetic field. Furthermore, by including the plurality of projections 206 on pole shoe 200, a magnetic device including pole shoe 200 produces a weaker magnetic field farther away in depth from pole shoe 200 than a magnetic device including a pole shoe with a flush continuous lower profile. The magnetic field produced farther away from the pole shoe 200 may be referred to herein as a far-field or deep magnetic field produced by pole shoe 200. Stated another way, a magnetic device including pole shoe 200 having projections 206 has a stronger holding force near workpiece contact interface 212 than a magnetic device including a pole shoe with a flush continuous interface that doesn't include projections 206.

In embodiments, the shallow magnetic field and the far-field magnetic field of a pole shoe 200 may be dependent on the type of pole shoe 200. In particular, the shallow magnetic field may be the magnetic field produced from the workpiece contact interface 212 to a distance from the workpiece contact interface 212 that is approximately equal to the width 214 of the projections 206. For example, if the widths 214 of the projections 206 are 2 mm, then the shallow magnetic field is the magnetic field produced from the workpiece contact interface 212 to a 2 mm depth from the workpiece contact interface 212. Furthermore, the far-field magnetic field produced in this example is the magnetic field produced at a depth greater than 2 mm from the workpiece contact interface 212.

As a result of a magnetic device 100 producing a stronger shallow magnetic field and a weaker far-field magnetic field because of the projections 206 of pole shoe 200, the magnetic device 100 may be used to de-stack thin ferromagnetic bodies better than a magnetic device 100 having pole shoe without the projections 206. That is, a magnetic device 100 including a pole shoe that doesn't have the projections 206 may produce a stronger far-field magnetic field that will result in multiple thin ferromagnetic bodies being coupled to the magnetic device. When trying to obtain a single thin ferromagnetic body from a stacked array of thin ferromagnetic bodies, this is an undesirable result. As such, instead of using a magnetic device including pole shoe without the projections 206 to de-stack ferromagnetic bodies, a pole shoe 200 including the projections 206 may be used.

In embodiments, varying the widths 214 of the projections 206 result in different shallow magnetic fields produced by the same magnetic device. In embodiments, to produce a preferred shallow magnetic field for a specific ferromagnetic body, the widths 214 of the projections 206 may have a width within approximately +/−25% the thickness of the ferromagnetic body to be de-stacked. For example, when a magnetic device is de-stacking 2 mm thick ferromagnetic sheets, the widths 214 of the projections 206 could be approximately 2 mm (e.g., 2 mm+/−25%). In embodiments, this will produce a strong shallow magnetic field between 0 mm and 2 mm depth from contact interface 212. In at least one embodiment, however, there may be a limit for producing a preferred shallow magnetic field for some ferromagnetic bodies having thicknesses less than the limit. That is, for ferromagnetic bodies having a thickness less than X mm, a preferred shallow magnetic field may be produced by projections 206 having widths 214 that are at a lower limit of X mm but are not less than the lower limit. That is, to produce a preferred magnetic field for a ferromagnetic body having a thickness of ½*X mm, the widths 214 of the projections 206 may be at the lower limit of X mm instead of +/−25% of ½*X mm. If, however, the thickness of the ferromagnetic body is X mm or more, then the widths 214 may approximately equal (e.g., +/−25%) the thickness of the ferromagnetic body. Examples of a lower limit may be in the range of 0 mm to 2 mm. However, this is only an example and not meant to be limiting.

In at least one embodiment, when a magnetic device including a pole shoe 200 is coupling to ferromagnetic bodies having different thicknesses, a pole shoe 200 having widths 214 that is an average of the thickness of the ferromagnetic bodies may be used to reduce the need to change pole shoes. Similar to above, however, a lower limit (e.g., 2.0 mm) may be applied such that if the average thickness of the ferromagnetic bodies is below the lower limit (i.e., <2.0 mm), the widths 214 may be configured to be the lower limit (i.e., 2.0 mm).

In embodiments, varying the depths 216 and/or widths 218 of the recesses 210 result in different shallow magnetic fields produced by the same magnetic device 100. In embodiments, to produce an appropriate shallow magnetic field for a specific ferromagnetic body, the depths 216 and/or widths 218 of the recesses 210 could be approximately the same (e.g., +/−25%) as the widths 214 of the projections 206. For example, if the widths 214 of the projections 206 are 2 mm, then the depths 216 and/or widths 218 of the recesses 210 could be approximately 2 mm (e.g., 2 mm+/−25%). In embodiments, this will produce a strong shallow magnetic field between 0 mm and 2 mm depth from contact interface 212. Similar to above, however, there may be a limit for producing a preferred shallow magnetic field for some ferromagnetic bodies having thicknesses less than the limit. That is, for ferromagnetic bodies having a thickness less than X mm, a preferred shallow magnetic field may be produced by depths 216 and widths 218 that are at a lower limit of X mm but are not less than the lower limit. That is, to produce a preferred magnetic field for a ferromagnetic body having a thickness of ½*X mm, the depths 216 and widths 218 may be at the lower limit of X mm instead of +/−25% of ½*X mm. If, however, the thickness of the ferromagnetic body is X mm or more, then the depths 216 and widths 218 may approximately equal (e.g., +/−25%) the thickness of the ferromagnetic body.

Similar to above, when a magnetic device 100 including pole shoe 200 is coupling ferromagnetic bodies having different thicknesses, a pole shoe 200 having depths 216 and/or widths 218 of recesses 210 that is an average of the thickness of the ferromagnetic bodies may be used to reduce the need to change pole shoes. Moreover, a lower limit (e.g., 2.0 mm) may be applied such that if the average thickness of the ferromagnetic bodies is below the lower limit (i.e., <2.0 mm), the depths 216 and widths 218 may be configured to be the lower limit (i.e., 2.0 mm).

As set forth above, pole shoe 200 may be releasably coupled to a housing of a magnetic device. Therefore, when projections 206 of the pole shoe 200 do not have the appropriate widths 214, depths 216 and/or widths 218 for the ferromagnetic body to which magnetic device 100 is coupling, pole shoe 200 may be replaced by a more appropriate pole shoe 200.

Figure 7B:
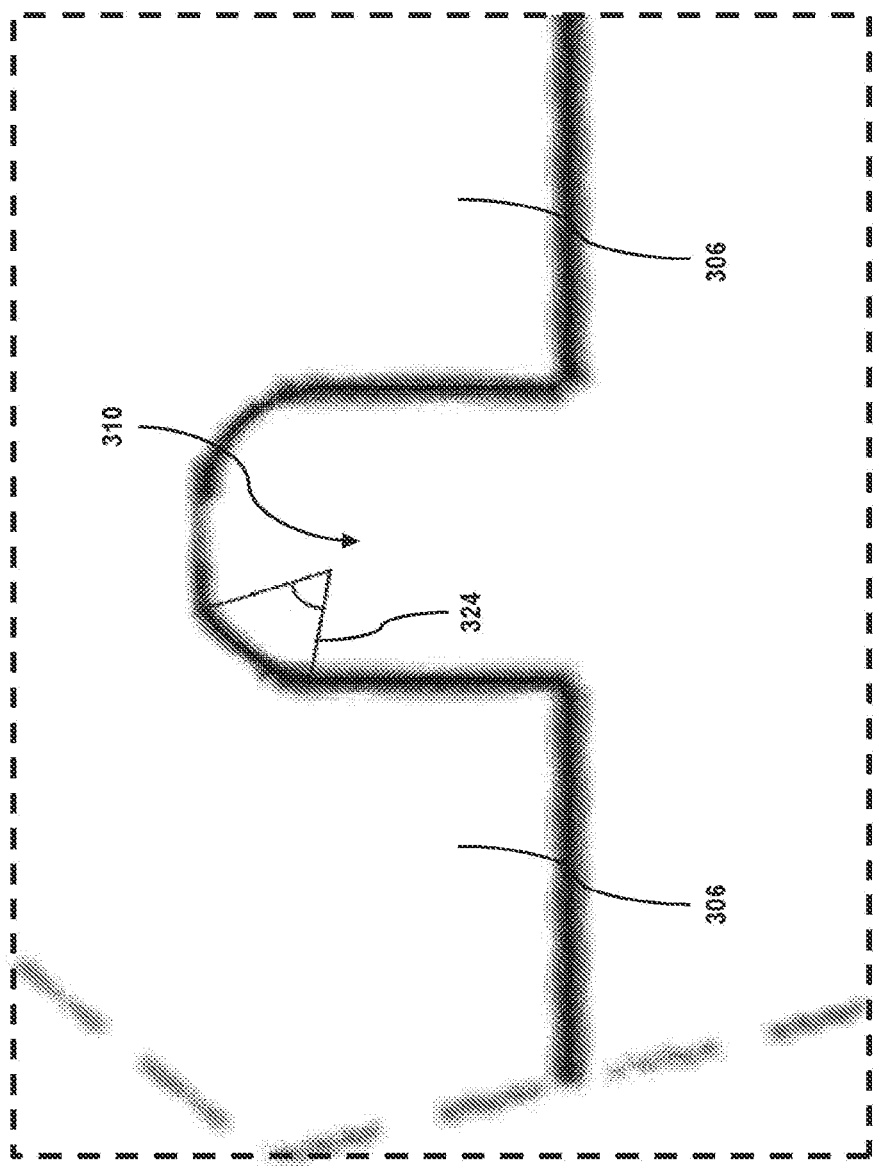

FIG. 7A is a side view of a portion of another exemplary pole shoe 300 which may serve as either pole shoe 132' or pole shoe 132" of magnetic device 100 and FIG. 7B illustrates a detail view of a portion of the exemplary pole shoe depicted in FIG. 7A. Similar to pole shoe 200 depicted in FIG. 6, pole shoe 300 comprises a first portion 302 that can be positioned proximate to a housing (e.g., the housing 104) of a magnetic device (e.g., the magnetic device 100). Pole shoe 300 may also include bores 304 extending through pole shoe 300 to releasably secure pole shoe 300 to housing 104 of magnetic device 100 via a fastening mechanism (e.g., fastening screws, etc.). Furthermore, pole shoe 300 includes a plurality of projections 306 arranged on a bottom portion 308 of the pole shoe 300. Each of projections 306 are separated by a recess portion 310. The plurality of projections 306 collectively form a workpiece contact interface 312 of pole shoe 300.

Similar to above, varying the widths 314 of the projections 306 and/or the depths 316, and/or widths 318 of the recesses 310 result in different shallow magnetic fields produced by the same magnetic device 100. In embodiments, to produce an appropriate shallow magnetic field for a specific ferromagnetic body, the widths 314 of the projections and/or the depths 316, and/or widths 318 of the recesses 310 could be approximately the same (e.g., +/−25%) as the thickness of the ferromagnetic body to be coupled to magnetic device 100. In at least one embodiment, however, there may be a limit for producing a preferred shallow magnetic field for some ferromagnetic bodies having thicknesses less than the limit. That is, for ferromagnetic bodies having a thickness less than X mm, a preferred shallow magnetic field may be produced by widths 314, depths 316, and/or widths 318 that are at a lower limit of X mm but are not less than the lower limit. That is, to produce a preferred magnetic field for a ferromagnetic body having a thickness of ½*X mm, the widths 314, depths 316, and/or widths 318 may be at the lower limit of X mm instead of +/−25% of ½*X mm. If, however, the thickness of the ferromagnetic body is X mm or more, then the widths 314, depths 316, and/or widths 318 may approximately equal (e.g., +/−25%) the thickness of the ferromagnetic body. Examples of a lower limit may be in the range of 0 mm to 2 mm. However, this is only an example and not meant to be limiting.

Alternatively, when a magnetic device including the pole shoe 300 is coupling to ferromagnetic bodies having different thicknesses, a pole shoe 300 having widths 314, depths 316, and/or widths 318 that is about an average of the thickness of the ferromagnetic bodies may be used to reduce the need to change pole shoes. Similar to above, however, a lower limit (e.g., 2.0 mm) may be applied such that if the average thickness of the ferromagnetic bodies is below the lower limit (i.e., <2.0 mm), the widths 314, depths 316, and/or widths 318 may be configured to be the lower limit (i.e., 2.0 mm).

In embodiments, upper portions 319 of pole shoe 300 have a continuous slope profile (the slope is defined at all points, no sharp corners). Illustratively, the upper corners 319 of pole shoe 300 may have a rounded shoulder portion 320. A magnetic device 100 including a pole shoe 300 having a rounded shoulder 320 has been shown to have a higher magnetic flux transfer to a ferromagnetic body than a magnetic device having a pole shoe with sharp corners. Accordingly, in at least one embodiment, the upper corners 319 of the pole shoe 300 include rounded shoulder portions 320. In one example, the radius of curvature 322 of the rounded shoulder portion 320 may preferably range from 1%-75% of the height 323 of the pole shoe 300. In another example, the radius of curvature 322 may preferably range from 25%-75% of the height 323 of the pole shoe 300. In a further example, the radius of curvature 322 may preferably be in the range of 40%-60% of the height 323 of the pole shoe 300.

Referring to FIG. 7B, additionally or alternatively, the recess portions 310 between the projections 306 may have a continuous slope profile (the slope is defined at all points, no sharp corners) at their upper extremes. Similar to having a rounded shoulder 320, magnetic device including a pole shoe 300 having a curved recess portions 310 may have a higher magnetic flux transfer to a ferromagnetic body than a magnetic device including a pole shoe that includes recessed portions with sharp corners. In embodiments, to provide a high magnetic flux transfer, the radius of curvature 324 of the curved recess portions 310 may be approximately ½ the width 318 of the recesses 310. Test data has indicated an improvement greater than 3% may be obtained by including a slope profile of the recess portions 310 that is ½ the width 318 of the recesses 324.

FIG. 8 is a side view of a portion of another exemplary pole shoe 400 which may serve as either pole shoe 132' or pole shoe 132" of magnetic device 100. Similar to pole shoes 200, 300 depicted in FIGS. 6 and 7A-7B, respectively, pole shoe 400 comprises a first portion 402 that can be positioned proximate a housing (e.g., the housing 104) of a magnetic device (e.g., the magnetic device 100). Pole shoe 400 may also include bores 404 extending through pole shoe 400 to releasably secure pole shoe 400 to a housing of a magnetic device via a fastening mechanism (e.g., fastening screws, etc.). Furthermore, pole shoe 400 includes a plurality of projections 406 arranged on a bottom portion 408 of pole shoe 400. Each of the projections 406 are separated by recess portions 410. The plurality of projections 406 collectively form a workpiece contact interface 412 of pole shoe 400.

Similar to above, varying the widths 414 of the projections 406 and/or the depths 416, and/or widths 418 of the recesses 410 result in different shallow magnetic fields produced by the same magnetic device 100. In embodiments, to produce an appropriate shallow magnetic field for a specific ferromagnetic body, the widths 414 of the projections 406 and/or the depths 416, and/or widths 418 of the recesses 410 could be approximately the same (e.g., +/−25%) as the thickness of the ferromagnetic body. In at least one embodiment, however, there may be a limit for producing a preferred shallow magnetic field for some ferromagnetic bodies having thicknesses less than the limit. That is, for ferromagnetic bodies having a thickness less than X mm, a preferred shallow magnetic field may be produced by widths 414, depths 416, and/or widths 418 that are at a lower limit of X mm but are not less than the lower limit. That is, to produce a preferred magnetic field for a ferromagnetic body having a thickness of ½*X mm, the widths 414, depths 416, and/or widths 418 may be at the lower limit of X mm instead of +/−25% of ½*X mm. If, however, the thickness of the ferromagnetic body is X mm or more, then the widths 414, depths 416, and/or widths 418 may approximately equal (e.g., +/−25%) the thickness of the ferromagnetic body. Examples of a lower limit may be in the range of 0 mm to 2 mm. However, this is only an example and not meant to be limiting.

Alternatively, when a magnetic device including pole shoe 400 is coupling to ferromagnetic bodies having different thicknesses, a pole shoe 400 having widths 414, depths 416, and/or widths 418 that is an average of the thickness of the ferromagnetic bodies may be used to reduce the need to change pole shoes. Similar to above, however, a lower limit (e.g., 2.0 mm) may be applied such that if the average thickness of the ferromagnetic bodies is below the lower limit (i.e., <2.0 mm), the widths 414, depths 416, and/or widths 418 may be configured to be the lower limit (i.e., 2.0 mm).

In embodiments, pole shoe 400 may also include compressible members 420 arranged between projections 406 in the recessed portions 410. In embodiments, the compressible members 420 compresses when magnetic device 100 including the pole shoe 400 couples to a ferromagnetic body. Due to the compression of compressible members 420, static friction between compressible members 420 and the ferromagnetic body is created that is potentially greater than the static friction between the projections 406 and the ferromagnetic body. As such, a ferromagnetic body coupled to a magnetic device 100 including the pole shoe 400 may be less like to rotate and translate than if the ferromagnetic body was coupled to a pole shoe that didn't include the compressible members 420. In embodiments, compressible members 420 may be comprised of an elastic material such as polymers of isoprene, polyurethane, nitrile rubber and/or the like.

Figure 9B:
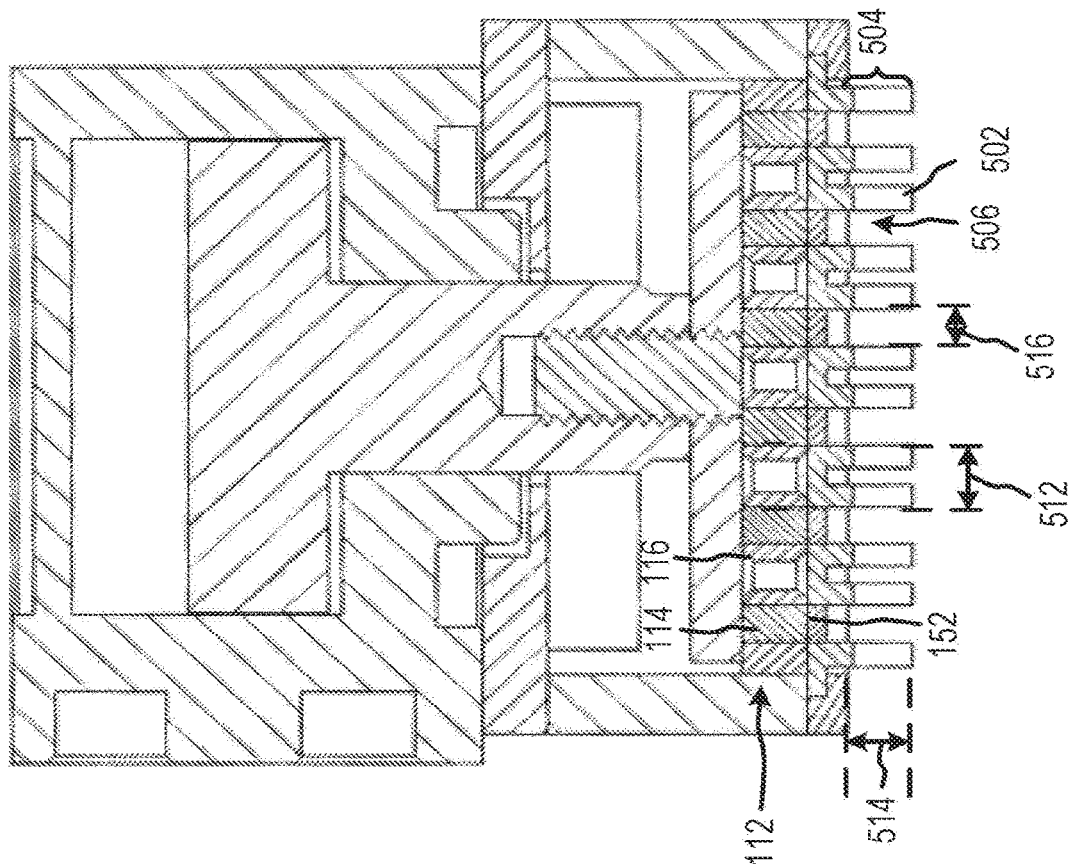
FIGS. 9A-9B illustrates another exemplary pole plate.
Figure 9A:
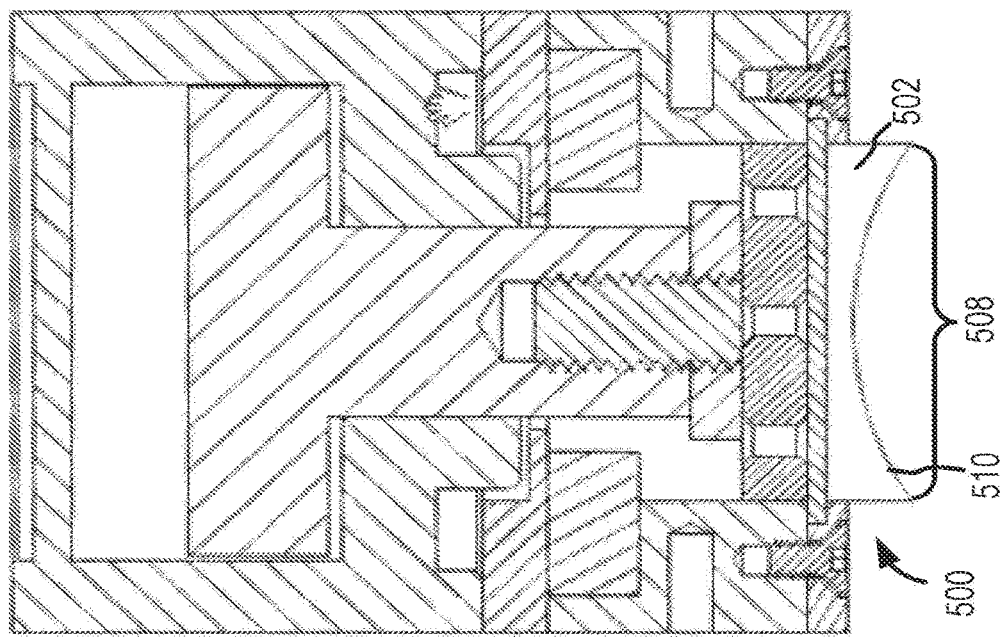

FIGS. 9A-9B depict another exemplary pole plate 500 which can be used as either pole shoe 132' or pole shoe 132" of magnetic device 100. Similar to the pole plates 200, 300, 400 depicted in FIGS. 6, 7A-7B, and 8, pole plate 500 includes a plurality of projections 502 arranged on a bottom portion 504 of pole plate 500. Each of projections 502 are separated by recess portions 506. The plurality of projections 502 collectively form a workpiece contact interface 508 of the pole plate 500.

As illustrated, the workpiece contact interface 508 is non-planar. In embodiments, the non-planar workpiece contact interface 508 may facilitate coupling a magnetic coupling device 100 to a ferromagnetic workpiece having a non-planar surface. For example, a magnetic coupling device 100 including pole plate 500 may be used for coupling magnetic coupling device 100 to one or more types of rods, shafts, etc. (e.g., a cam shaft). While the workpiece contact interface 508 includes a curved surface 510, the workpiece contact interface 508 may have any other type of non-planar surface. For example, the workpiece contact interface 508 may include a similar contour as a ferromagnetic piece to which the magnetic coupling device including the workpiece contact interfaces 508 is intended to couple.

Despite having a non-planar workpiece contact interface 508, varying the widths 512 of the projections 502 and/or the depths 514, and/or widths 516 of the recesses 506 result in different shallow magnetic fields produced by the same magnetic coupling device. In embodiments, to produce an appropriate shallow magnetic field for a specific ferromagnetic workpiece, the widths 512 of the projections 552 and/or the depths 514, and/or widths 516 of the recesses 506 could be approximately the same (e.g., +/−25%) as the thickness of the ferromagnetic workpiece. In at least one embodiment, however, there may be a limit for producing a preferred shallow magnetic field for some ferromagnetic workpieces having thicknesses less than the limit. That is, for ferromagnetic workpieces having a thickness less than X mm, a preferred shallow magnetic field may be produced by widths 512, depths 514, and/or widths 516 that are at a lower limit of X mm but are not less than the lower limit. That is, to produce a preferred magnetic field for a ferromagnetic workpiece 102 having a thickness of ½*X mm, the widths 512, depths 514, and/or widths 516 may be at the lower limit of X mm instead of +/−25% of ½*X mm. If, however, the thickness of the ferromagnetic workpiece is X mm or more, then the widths 512, depths 514, and/or widths 516 may approximately equal (e.g., +/−25%) the thickness of the ferromagnetic workpiece. Examples of a lower limit may be in the range of 0 mm to 2 mm. However, this is only an example and not meant to be limiting.

Alternatively, when a magnetic coupling device including pole plate 500 is coupling to ferromagnetic workpieces having different thicknesses, a pole plate 500 having widths 512, depths 514, and/or widths 516 that is an average of the thickness of the ferromagnetic workpieces may be used to reduce the need to change pole plates. Similar to above, however, a lower limit (e.g., 2.0 mm) may be applied such that if the average thickness of the ferromagnetic workpieces 102 is below the lower limit (i.e., <2.0 mm), the widths 512, depths 514, and/or widths 516 may be configured to be the lower limit (i.e., 2.0 mm).

Figure 10B:
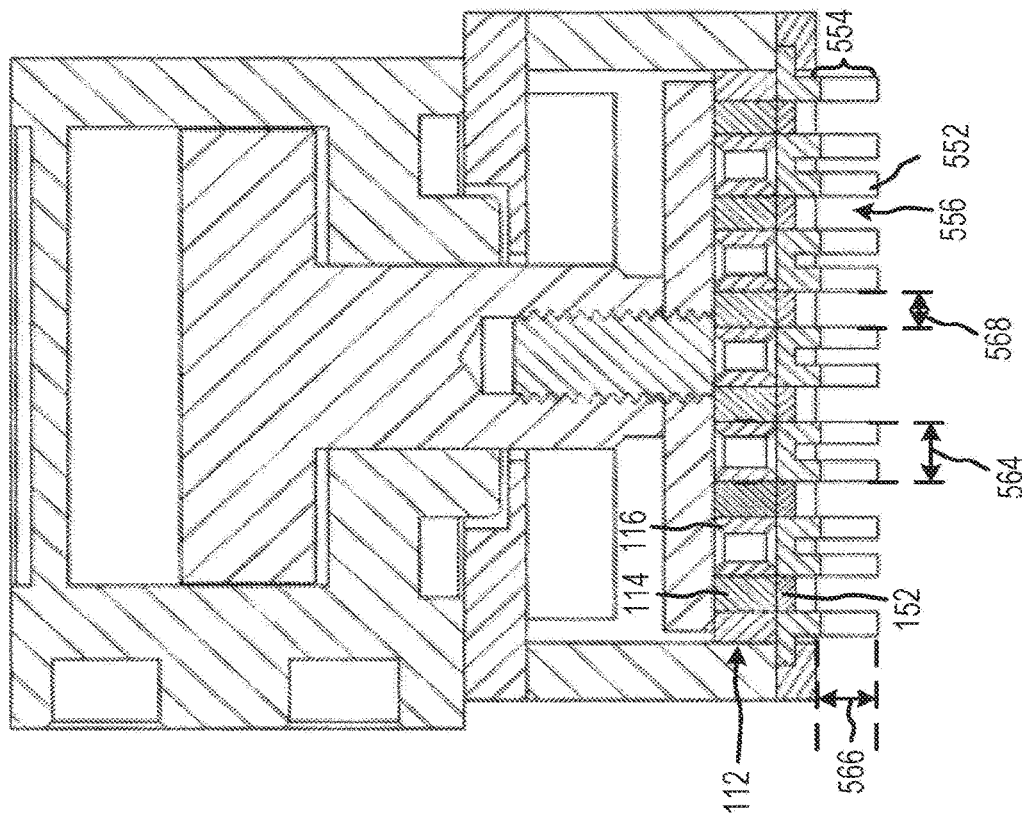
FIGS. 10A-10B illustrates another exemplary pole plate.
Figure 10A:
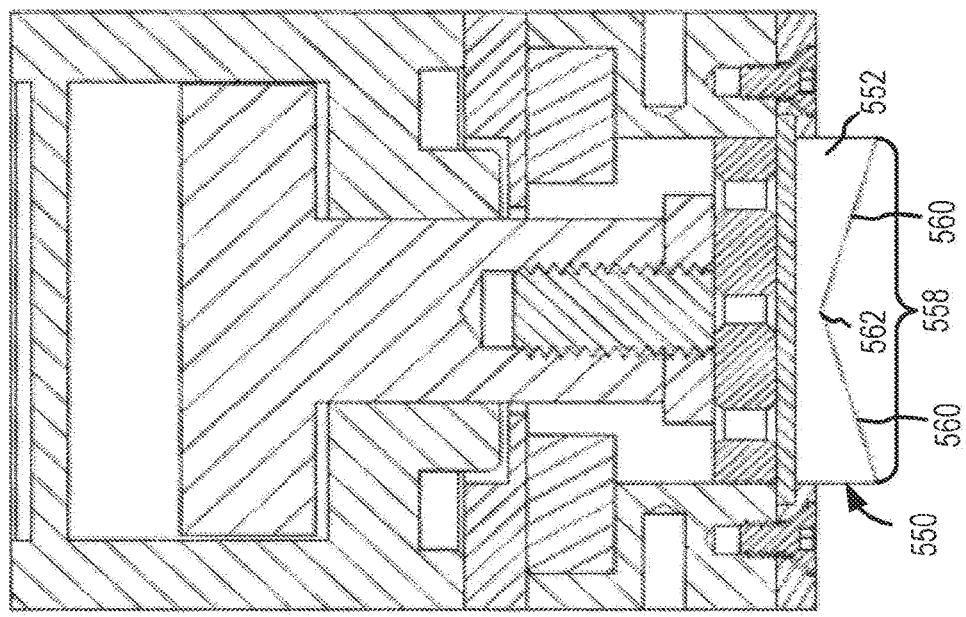

FIGS. 10A-10B depict another exemplary pole plate 550 which can be used as either pole shoe 132' or pole shoe 132" of magnetic device 100. Similar to the pole plates 200, 300, 400, 500 depicted in FIGS. 6, 7A-7B, 8, 9A-9B, pole plate 550 includes a plurality of projections 552 arranged on a bottom portion 554 of pole plate 550. Each of projections 552 are separated by recess portions 556. The plurality of projections 552 collectively form a workpiece contact interface 558 of the pole plate 550.

As illustrated, the workpiece contact interface 558 is non-planar. In embodiments, the non-planar workpiece contact interface 558 may facilitate coupling a magnetic coupling device 100 to a ferromagnetic workpiece having a non-planar surface. For example, a magnetic coupling device including pole plate 550 may be used for coupling magnetic coupling device 100 to one or more edges, corners, etc. of a ferromagnetic workpiece. While the workpiece contact interface 558 includes two downwardly sloping surfaces 560 extending from a center point 562, the workpiece contact interface 558 may have any other type of non-planar surface. For example, the workpiece contact interface 558 may include a similar contour as a ferromagnetic piece to which the magnetic coupling device including the workpiece contact interfaces 558 is intended to couple.

Despite having a non-planar workpiece contact interface 558, varying the widths 564 of the projections 552 and/or the depths 566, and/or widths 568 of the recesses 556 result in different shallow magnetic fields produced by the same magnetic coupling device. In embodiments, to produce an appropriate shallow magnetic field for a specific ferromagnetic workpiece, the widths 564 of the projections 552 and/or the depths 566, and/or widths 568 of the recesses 556 could be approximately the same (e.g., +/−25%) as the thickness of the ferromagnetic workpiece. In at least one embodiment, however, there may be a limit for producing a preferred shallow magnetic field for some ferromagnetic workpieces having thicknesses less than the limit. That is, for ferromagnetic workpieces having a thickness less than X mm, a preferred shallow magnetic field may be produced by widths 564, depths 566, and/or widths 568 that are at a lower limit of X mm but are not less than the lower limit. That is, to produce a preferred magnetic field for a ferromagnetic workpiece having a thickness of ½*X mm, the widths 564, depths 566, and/or widths 568 may be at the lower limit of X mm instead of +/−25% of ½*X mm. If, however, the thickness of the ferromagnetic workpiece is X mm or more, then the widths 564, depths 566, and/or widths 568 may approximately equal (e.g., +/−25%) the thickness of the ferromagnetic workpiece. Examples of a lower limit may be in the range of 0 mm to 2 mm. However, this is only an example and not meant to be limiting.

Alternatively, when a magnetic coupling device including pole plate 550 is coupling to ferromagnetic workpieces 102 having different thicknesses, a pole plate 550 having widths 564, depths 566, and/or widths 568 that is an average of the thickness of the ferromagnetic workpieces may be used to reduce the need to change pole plates. Similar to above, however, a lower limit (e.g., 2.0 mm) may be applied such that if the average thickness of the ferromagnetic workpieces is below the lower limit (i.e., <2.0 mm), the widths 564, depths 566, and/or widths 568 may be configured to be the lower limit (i.e., 2.0 mm).

FIG. 11A is a front view of an exemplary switchable magnetic device 600 and FIG. 11B is a side view of the switchable magnetic device 600. Magnetic device 600 includes pole shoes 602', 602" and a housing 604. In embodiments, magnetic device 600 may have some or all of the same features and/or functionality as the magnetic device 100 and pole shoes 602', 602" may have some or all of the same features and/or functionality as pole shoes 102', 102". Additionally or alternatively, pole shoes 602', 602" may have some or all the same features as pole shoes 200, 300, 400 depicted in FIGS. 6, 7, and 8, respectively. For example, pole shoes 602', 602" comprise a first portion 606 that can be positioned proximate housing 604. Pole shoes 602', 602" may also include bores 608 extending through pole shoes 602', 602" to releasably secure pole shoes 602', 602" to housing 604 via a fastening mechanism (e.g., fastening screws, etc.). Furthermore, pole shoes 602', 602" includes a plurality of projections 610 arranged on a bottom portion 612 of pole shoes 602', 602". Each of the projections 610 are separated by a recess portion 614. The plurality of projections 610 included in pole shoe 602' collectively form a workpiece contact interface 616' of pole shoe 602', and the plurality of projection included in pole shoe 602" collectively form a workpiece contact interface 616" of pole show 602".

Furthermore, varying the widths 618 of the projections 622 and/or depths 620, and/or widths 622 of the recesses 614 result in different shallow magnetic fields produced by the same magnetic device 600. In embodiments, to produce an appropriate shallow magnetic field for a specific ferromagnetic body, the widths 618 of the projections 622 and/or the depths 620, and/or widths 622 of the recesses 614 could be approximately the same (e.g., +/−25%) as the thickness of the ferromagnetic body. In at least one embodiment, however, there may be a limit for producing a preferred shallow magnetic field for some ferromagnetic bodies having thicknesses less than the limit. That is, for ferromagnetic bodies having a thickness less than X mm, a preferred shallow magnetic field may be produced by widths 618, depths 620, and/or widths 622 that are at a lower limit of X mm but are not less than the lower limit. That is, to produce a preferred magnetic field for a ferromagnetic body having a thickness of ½*X mm, the widths 618, depths 620, and/or widths 622 may be at the lower limit of X mm instead of +/−25% of ½*X mm. If, however, the thickness of the ferromagnetic body is X mm or more, then the widths 618, depths 620, and/or widths 622 may approximately equal (e.g., +/−25%) the thickness of the ferromagnetic body. Examples of a lower limit may be in the range of 0 mm to 2 mm. However, this is only an example and not meant to be limiting.

Alternatively, when magnetic device 600 to is used to couple to ferromagnetic bodies having different thicknesses, the widths 618 of the projections 622 and/or the depths 620, and/or widths 622 of recesses 614 that is an average of the thickness of the ferromagnetic bodies may be used to reduce the need to change pole shoes. Similar to above, however, a lower limit (e.g., 2.0 mm) may be applied such that if the average thickness of the ferromagnetic bodies is below the lower limit (i.e., <2.0 mm), the widths 618, depths 620, and/or widths 622 may be configured to be the lower limit (i.e., 2.0 mm).

While pole shoes 602', 602" depicted do not include rounded shoulders (e.g., the rounded shoulder 320) and/or a curved recess portions (e.g., the curved recess portion 310), in the alternative embodiments, pole shoes 602', 602" may include one or both of those features. Additionally or alternatively, while pole shoes 602', 602" depicted do not include compressible members (e.g., the compressible members 420), in alternative embodiments, pole shoes 602', 602" may include one or both of those features.

As illustrated, pole shoes 602', 602" have respective thicknesses 624', 624". In embodiments, different thicknesses 624', 624" may produce different shallow magnetic fields and far-field magnetic fields by magnetic device 600. That is, similar to the widths 618 of the projections 610, thicknesses 624', 624" approximately the same as the thickness of a ferromagnetic body to which magnetic device 600 couples to produces an appropriate shallow magnetic field for de-stacking the ferromagnetic body. For example, when magnetic device 600 is de-stacking 2 mm thick ferromagnetic sheets, the thicknesses 624', 624" could be approximately 2 mm (e.g., 2 mm+/−25%). In embodiments, this will produce a strong shallow magnetic field between 0 mm and 2 mm. In embodiments, pole shoes 602', 602" may be either comprised of 304 Stainless Steel and/or include aluminium surrounding at least a portion of pole shoes 602', 602" to add structural integrity to the pole shoes 602', 602". In embodiments, this may be particularly advantageous when pole shoes 602', 602" have thin thicknesses 624', 624" (e.g., less than or equal to 5 mm).

Additionally or alternatively, housing 604 may include an offset 626 from the workpiece contact interfaces 616', 616". In embodiments, offset 626 may be dependent on the magnetic field produced by magnetic device 600. That is, in embodiments, offset 626 may be a percentage of the shallow magnetic field depth produced by magnetic device 600. Additionally or alternatively, the offset 626 may be a percentage of the thickness of the workpiece. For example, if magnetic device 600 is configured to produce a shallow magnetic field within the workpiece having a depth of X mm and/or couple to a workpiece that is X mm thick, then offset 626 may be a percentage (greater or less than 100%) of the X. In one example, offset 626 may preferably be in the range of 100% to 700% of the depth of the shallow magnetic field. In another example, offset 626 may preferably be in the range of 200% to 600% of the depth of the shallow magnetic field. In a further example, the offset 626 may preferably be in the range of 300% to 500% of the depth of the shallow magnetic field. In yet another example, offset 626 may preferably be in the range of 350% to 400% of the depth of the shallow magnetic field.

Additionally or alternatively, pole shoes 602', 602" may extend along direction 628 by distances 630, 632 beyond a front face 634 and a rear face 636 of the housing 604, respectively. Stated another way, the width 637 of the pole shoes 602', 602" may be longer than the depth 638 of the housing 604. By extending beyond the front and rear faces 634, 636, the contact area between the workpiece contact interfaces 616', 616" and a ferromagnetic body. The increased contact area of the workpiece contact interfaces 616', 616" may increase the holding force and/or shear force of the magnetic device 600. In one example, the distance 630, the distance 632, and/or the width 637 may vary depending on the ferromagnetic body that the magnetic device 600 is coupling. That is, depending on a preferably holding force for a ferromagnetic body, the distance 630, the distance 632, and/or the width 637 may be varied to achieve the preferable holding force. As another example, the distance 630, the distance 632, and/or the width 637 may be a percentage (greater or less than 100%) of the depth 638 of the housing 604. In one example, the distance 630 and/or the distance 632 may preferably be in the range of 25% to 75% of the depth 638 of the housing 604. In another example, the distance 630 and/or the distance 632 may preferably be in the range of 35% to 65% of the depth 638 of the housing 604. In yet another example, the distance 630 and/or the distance 632 may preferably be in the range of 45% to 55% of the 632 of the depth 638 of the housing 604.

The thickness 640 of the pole shoes 602', 602" may also be varied. Similar to increasing the width 637 of the pole shoes 602', 602", increasing the thickness 640 of the pole shoes 602', 602" increases the contact area between the workpiece contact interfaces 616', 616" and a ferromagnetic body. The increased contact area of the workpiece contact interfaces 616', 616" may increase the holding force and/or shear force of the magnetic device 600. Accordingly, the thickness 640 may be varied depending on a desired holding force of the magnetic device 600. In one example, the thickness 640 may approximately match the thickness of a ferromagnetic body that the magnetic device 600 is coupling. In another example, the thickness 640 may vary in relation to the width 637. That is, depending on a ferromagnetic body that the magnetic device 600 is coupling, it may be preferable to maintain a surface area of the contact interface 616', 616" and, therefore, a holding force of the magnetic device 600. As such, as the width 637 is increased, the thickness 640 may decreased and vice-versa. Therefore, if a holding force and a wider pole shoe 616', 616" are preferable for a ferromagnetic body, the preferred holding force may be maintained by decreasing the thickness 640 and increasing the width 637.

In the embodiments provided above, any of the features of the pole shoes 16, 132, 200, 300, 400, 500, 550, and 602 may be used in conjunction with one another. Additionally or alternatively, any of the projections and recesses of the pole shoes 16, 132, 200, 300, 400, 500, 550, and 602 may be integrated into the housings of the magnetic devices 10, 100, 600 instead of being coupled thereto.

Furthermore, as described above, when the projection widths and recess depths/widths exceed a lower limit and the projection widths and recess depths/widths of the pole shoes approximately match the thickness of the ferromagnetic body, pole shoes having said characteristics produce the strongest holding force for a ferromagnetic body having approximately the same thickness as the projection widths and recess depths/widths.

Figure 12:
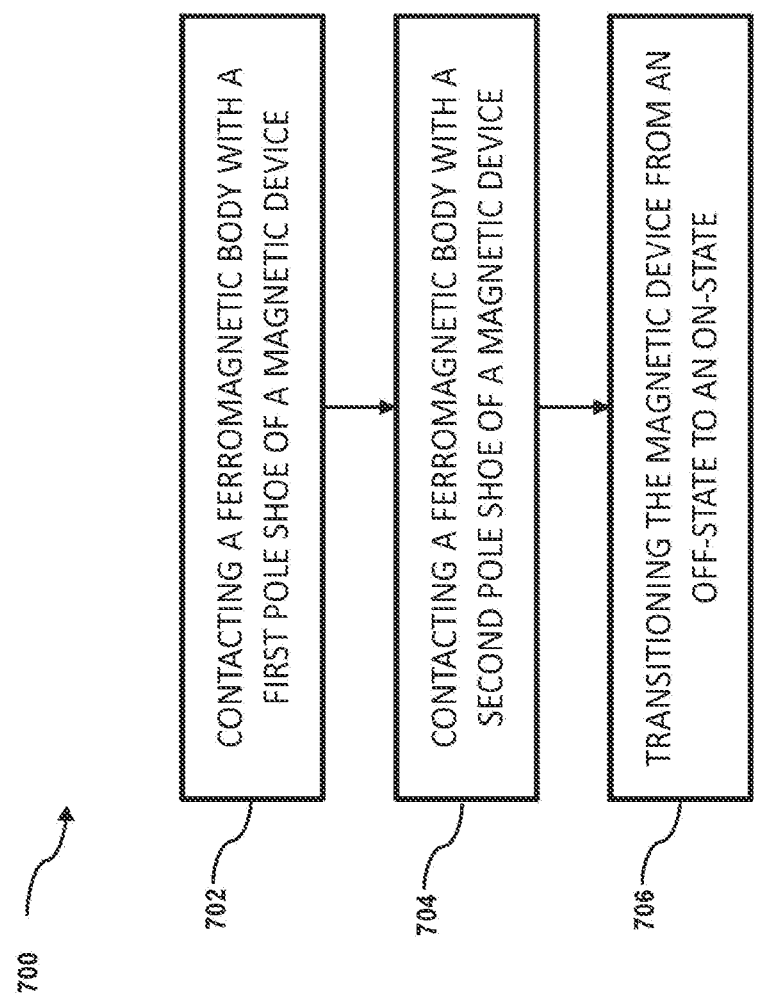
FIG. 12 illustrates a processing sequence of a method of use of an exemplary switchable magnetic device with pole shoes.

FIG. 12 is a flow diagram of a method 700 of using an exemplary switchable magnetic device with pole shoes. The method 700 comprises contacting a ferromagnetic body with a first pole shoe, as represented by block 702. In embodiments, the first pole shoe may be releasably attached to a housing of a magnetic device. Additionally, the magnetic device may be able to establish two different magnetic circuits. The first magnetic circuit may be referred to as the magnetic device being in an on-state and the second magnetic circuit may be referred to as the magnetic device being in an off-state.

In embodiments, the first pole shoe, the housing, and the magnetic device may have the same or similar features as the pole shoes 16, 102, 200, 300, 400, 500, or 602; the housings 28, 104, 604; and the magnetic devices 10, 100, and 600, respectively, depicted above. For example, the ferromagnetic body may be contacted by a workpiece contact interface of the first pole shoe, wherein the workpiece contact interface of the first pole shoe includes a plurality of projections. Additionally or alternatively, the magnetic device may comprise: a first permanent magnet mounted within the housing that has an active N-S pole pair and a second permanent magnet having an active N-S pole pair. In embodiments, the second permanent magnet may be rotatably mounted within the housing in a stacked relationship with the first permanent magnet, wherein the second permanent magnet is rotatable between a first position and a second position. Additionally or alternatively, the magnetic device may establish a plurality of magnetic circuits that produce different strengths of magnetic circuits between the magnetic device and a ferromagnetic body.

In embodiments, the method 700 comprises contacting a ferromagnetic body with a second pole shoe, as represented by block 704. In embodiments, the second pole shoe is attached to the same housing to which the first pole shoe is attached. In embodiments, the magnetic device may be in the first configuration when the ferromagnetic body is contacted by the second pole shoe.

In embodiments, the method 700 comprises transitioning the magnetic device from the off-state to an on-state, as represented by block 706. In embodiments, transitioning the magnetic device from the off-state to the on-state may comprise actuating (e.g., rotating) the second permanent magnet from a first position to a second position. Additionally, when the magnetic device is in an on-state, the magnetic circuit is formed through the workpiece.

Figure 13:
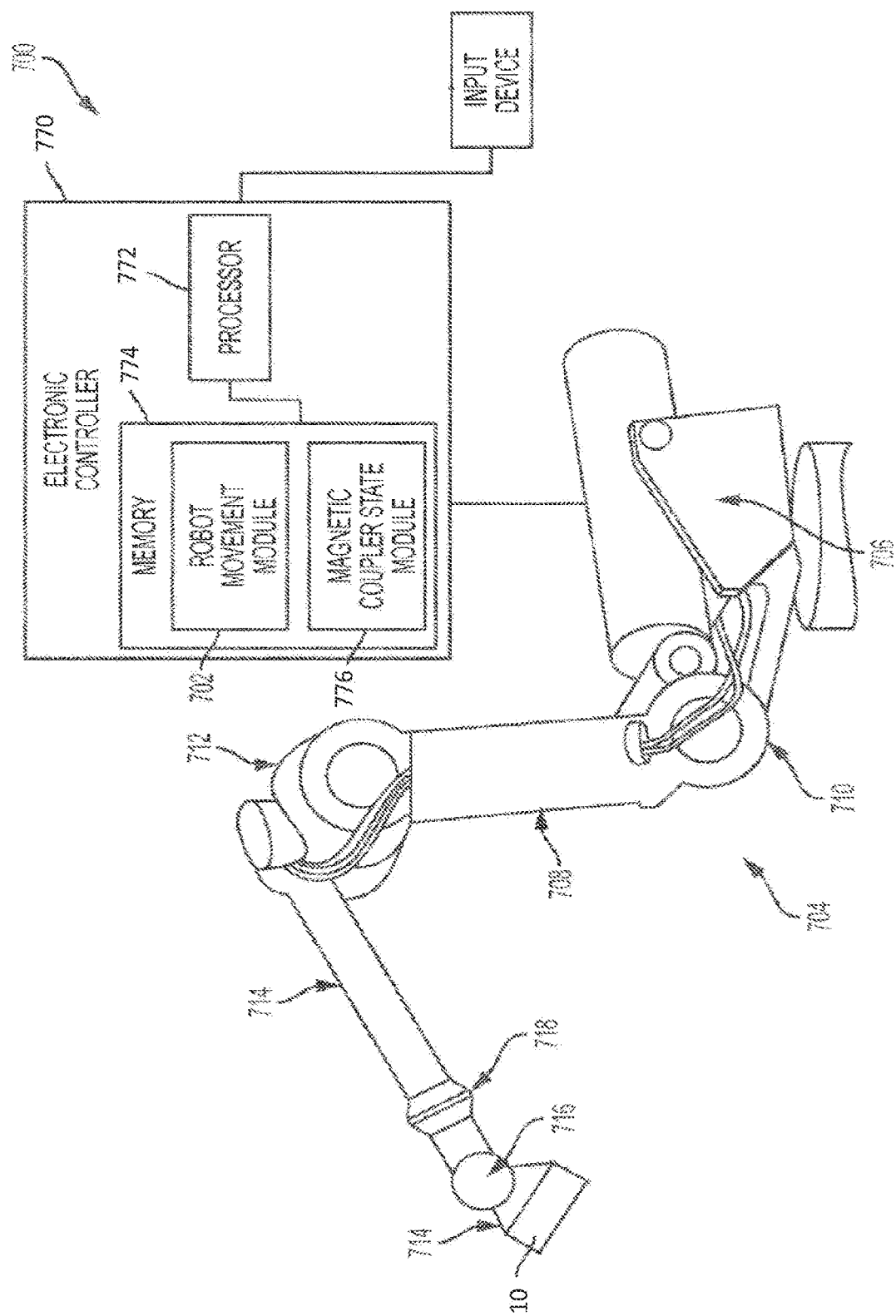
FIG. 13 illustrates a robotic system including a switchable magnetic device.

Referring to FIG. 13, an exemplary robotic system 700 is illustrated. While a robotic system 700 is depicted in FIG. 13, the embodiments described in relation thereto may be applied to other types of machines, (e.g., crane hoists, pick and place machines, etc.).

Robotic system 700 includes electronic controller 770. Electronic controller 770 includes additional logic stored in associated memory 774 for execution by processor 772. A robotic movement module 702 is included which controls the movements of a robotic arm 704. In the illustrated embodiment, robotic arm 704 includes a first arm segment 706 which is rotatable relative to a base about a vertical axis. First arm segment 706 is moveably coupled to a second arm segment 708 through a first joint 710 whereat second arm segment 708 may be rotated relative to first arm segment 706 in a first direction. Second arm segment 708 is moveably coupled to a third arm segment 711 through a second joint 712 whereat third arm segment 711 may be rotated relative to second arm segment 708 in a second direction. Third arm segment 711 is moveably coupled to a fourth arm segment 714 through a third joint 716 whereat fourth arm segment 714 may be rotated relative to third arm segment 711 in a third direction and a rotary joint 718 whereby an orientation of fourth arm segment 714 relative to third arm segment 711 may be altered. Magnetic coupling device 10 is illustratively shown secured to the end of robotic arm 704. Magnetic coupling device 10 is used to couple a workpiece 27 (not shown) to robotic arm 704. Although magnetic coupling device 10 is illustrated, any of the magnetic coupling devices described herein and any number of the magnetic coupling devices described herein may be used with robotic system 700.

In one embodiment, electronic controller 770 by processor 772 executing robotic movement module 702 moves robotic arm 704 to a first pose whereat magnetic coupling device 100 contacts the workpiece at a first location. Electronic controller 770 by processor 772 executing a magnetic coupler state module 776 instructs magnetic device 10 to move upper magnet 12 relative to lower magnet 14 to place magnetic coupling device 10 the on-state to couple the workpiece to robotic system 700. Electronic controller 770 by processor 772 executing robotic movement module 702 moves the workpiece from the first location to a second, desired, spaced apart location. Once the workpiece is at the desired second position, electronic controller 770 by processor 772 executing magnetic coupler state module 776 instructs magnetic device 10 to move upper magnet 12 relative to lower magnet 14 to place magnetic coupling device 10 in an off-state to decouple the workpiece from robotic system 700. Electronic controller 770 then repeats the process to couple, move, and decouple another workpiece.

In one embodiment, the disclosed magnetic devices include one or more sensors to determine a characteristic of the magnetic circuit present between the magnetic device and the workpiece to be coupled to the magnetic device. Further details of exemplary sensor systems are provided in U.S. Provisional Application No. 62/490,705, titled SMART SENSE EOAMT, filed Apr. 27, 2017, the entire disclosure of which is expressly incorporated by reference herein.

Figure 14:
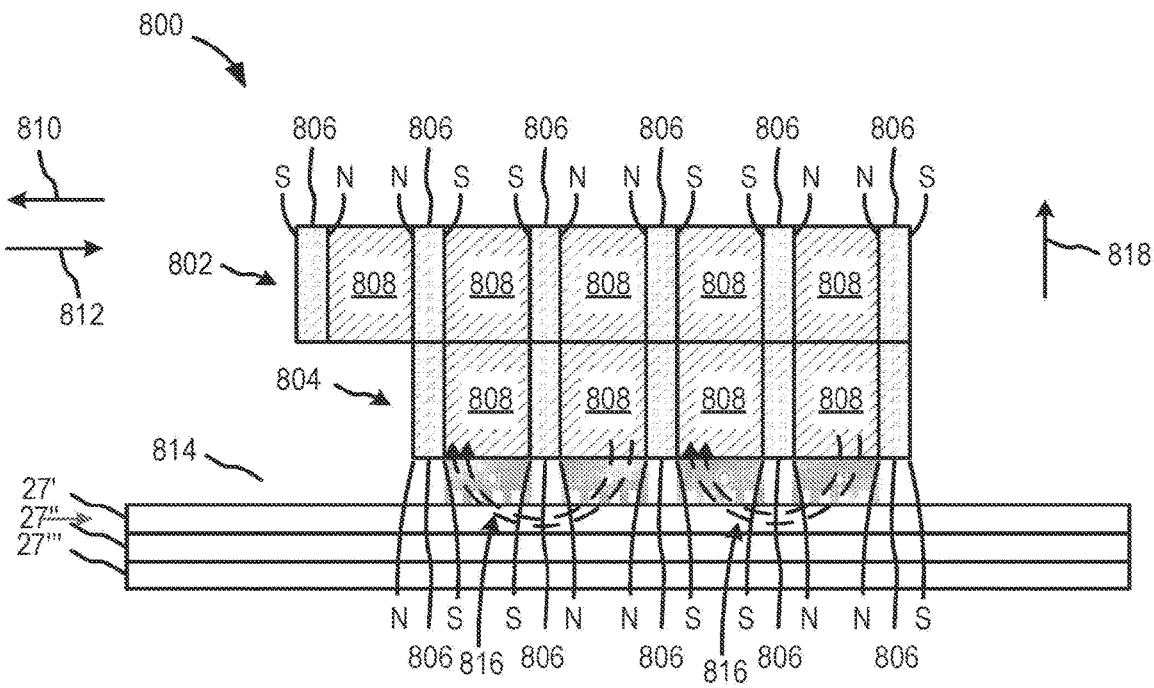
FIG. 14 illustrates a diagrammatical view of an exemplary magnetic coupling device having an upper assembly and a lower assembly, each including a plurality of permanent magnets and pole portions arranged in a linear array, the magnetic coupling device being in an on state.
Figure 15:
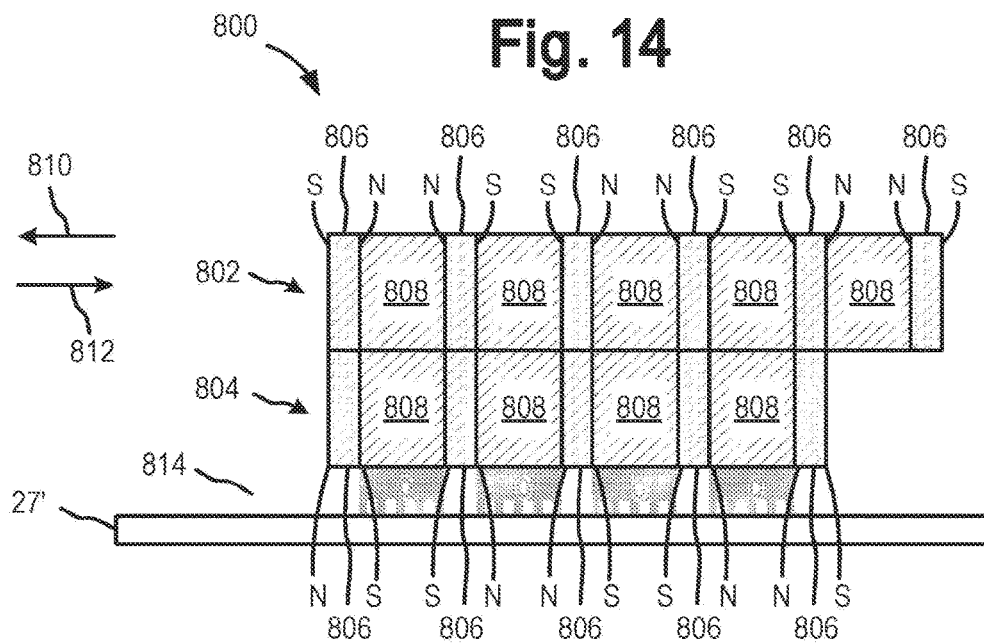
FIG. 15 illustrates the magnetic coupling device of FIG. 14 in an off state.

As stated above, other configurations of magnets may be used in place of permanent magnets 12, 14 or permanent magnets 130, 132. Referring to FIGS. 14 and 15, a side sectional view of an exemplary magnetic coupling device 800 of the present disclosure is represented. Magnetic coupling device 800 includes an upper assembly 802 and a lower assembly 804. Each of assemblies 802 and 804 include a plurality of spaced-apart permanent magnets 806 and a plurality of pole portions 808. Each of the plurality of spaced-apart permanent magnets 806 are illustratively shown as a single permanent magnet but may comprise multiple permanent magnets and/or at least one permanent magnet positioned within a housing.

Each permanent magnet 806 has a north-pole side (N) and a south-pole side (S). The permanent magnets 806 and pole portions 808 of upper assembly 802 and lower assembly 804 are each arranged in a linear array wherein one of pole portions 808 is positioned between two of permanent magnets 806. Further, the permanent magnets 806 are arranged so that each of the two permanent magnets 806 contacting the pole portion 808 therebetween have either their north pole sides (N) or their south pole sides (S) contacting the pole portion 808. When the north-pole sides (N) of the adjacent permanent magnets 806 are contacting a pole portion 808, the pole portion 808 is referred to as a north-pole portion. When the south-pole sides (S) of the adjacent permanent magnets 806 are contacting a pole portion 808, the pole portion 808 is referred to as a south-pole portion.

In embodiments, lower assembly 804 replaces permanent magnet 14 of magnetic coupling device 10 or permanent magnet 130 of magnetic coupling device 100 and is held stationary relative to housing 28 and upper assembly 802 replaces permanent magnet 12 of magnetic coupling device 10 or permanent magnet 132 of magnetic coupling device 100. Upper assembly 802 is translatable relative to lower assembly 804 in directions 810 and 812 to alter an alignment of the permanent magnets 806 and pole portions 808 of upper assembly 802 relative to the permanent magnets 806 and pole portions 808 of lower assembly 804. Permanent magnets 806 of lower assembly 804 are spaced apart from a workpiece 27' due to pole portions 814 of the magnet coupling device 800. Additionally, a spacer (not shown) is provided between the permanent magnets of upper assembly 802 and lower assembly 804.

Magnetic coupling device 800 is in an on state when the south-pole portions 808 of lower assembly 804 are aligned with the south-pole portions 808 of upper assembly 802 and the north-pole portions 808 of lower assembly 804 are aligned with the north-pole portions 808 of upper assembly 802 (see FIG. 14). In the on-state, the workpiece 27' is held by the magnetic coupling device 800 due to a completion of a magnetic circuit from the aligned north-pole portions 808 of upper assembly 802 and lower assembly 804, through the workpiece 27', and to the aligned south-pole portions 808 of upper assembly and lower assembly 804, as illustrated by the magnetic flux lines 816. The size and shape of pole portions 814 result in the first magnetic circuit being substantially confined to workpiece sheet 27' of workpiece sheets 27 and of sufficient holding force to vertically lift workpiece sheet 27' in direction 818 relative to the remainder of workpiece sheets 27. Thus, magnetic coupling device 800 may function to de-stack workpiece sheets 27. In some embodiments, a portion of the magnetic flux provided to workpiece sheets 27 by magnetic coupling device 800 may enter lower sheet 27" of workpiece sheets 27, but not to a level that results in lower sheet 27" being lifted by magnetic coupling device 800 along with workpiece sheet 27'. Thus, as used herein, the first magnetic circuit being substantially confined to workpiece sheet 27' of workpiece sheets 27 means that the amount, if any, of the magnetic flux from switchable magnetic lifting device 800 entering lower sheet 27" is below a level that would result in the lower sheet 27" being vertically lifted in direction 818 by magnetic coupling device 800 along with workpiece sheet 27'.

Magnetic coupling device 800 is in an off state when the south-pole portions 808 of lower assembly 804 are aligned with the north-pole portions 808 of upper assembly 802 and the north-pole portions 808 of lower assembly 804 are aligned with the south-pole portions 808 of upper assembly 802 (see FIG. 15). In the off state, a workpiece 27' is not held by magnetic coupling device 800 due to a completion of a magnetic circuit within upper assembly 802 and lower assembly 804 from the aligned north-pole portions 808 of upper assembly 802 to the south-pole portions 808 of lower assembly 804 and from the aligned north-pole portions of upper assembly 802 to the south-pole portions 808 of lower assembly 804.

In embodiments, the pole portions 808 may also have the same or similar characteristics as pole shoes 102, 200, 300, 400, 500, 602 (e.g., the same or similar: widths, widths and/or depths of the recesses, rounded shoulder portions, a curved workpiece interface, a compressible member between each of the pole portions 808, etc.).

Figure 16:
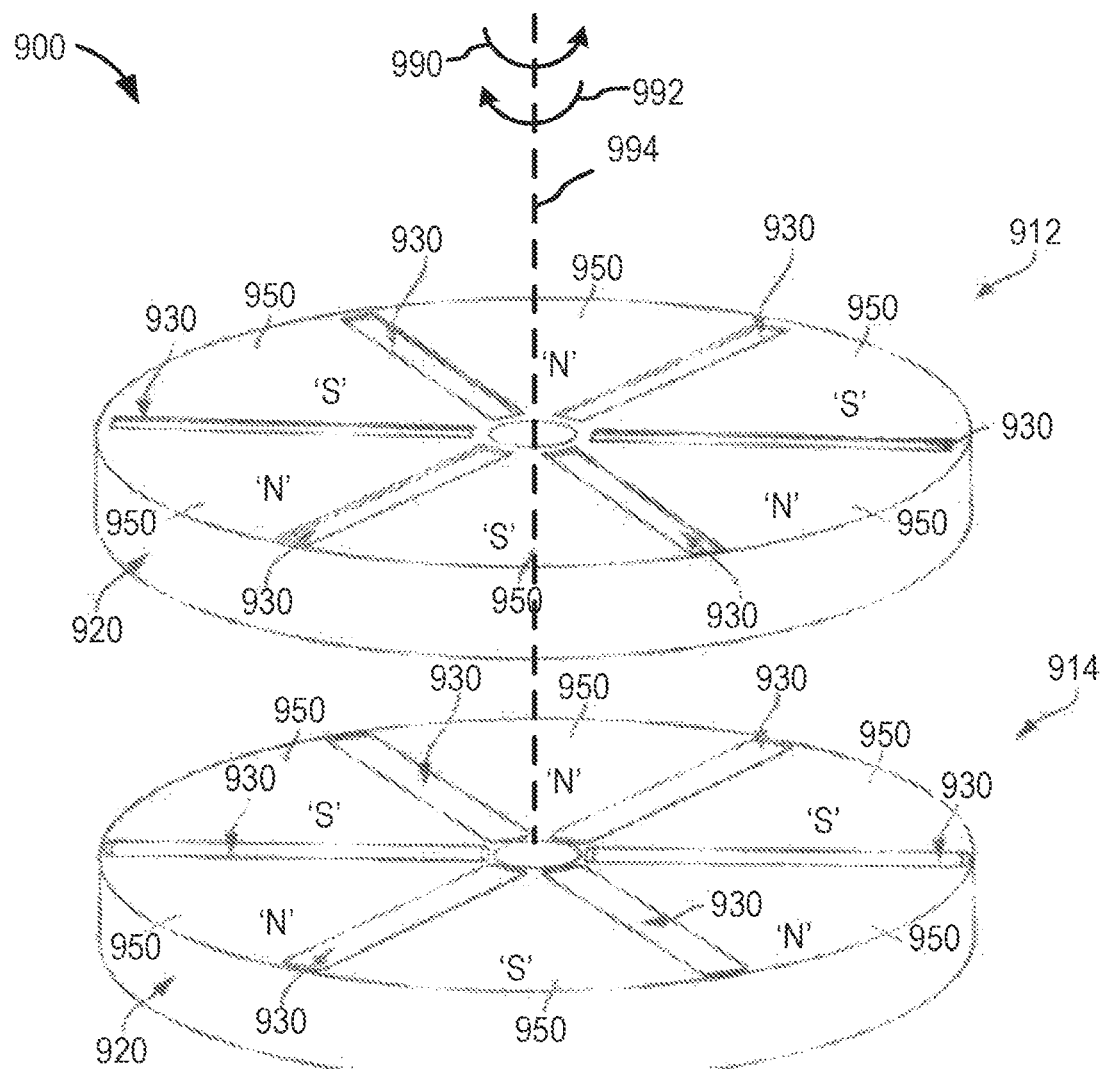
FIG. 16 illustrates a perspective view of the two instances of an exemplary platter having a plurality of permanent magnets and pole portions.
Figure 17:
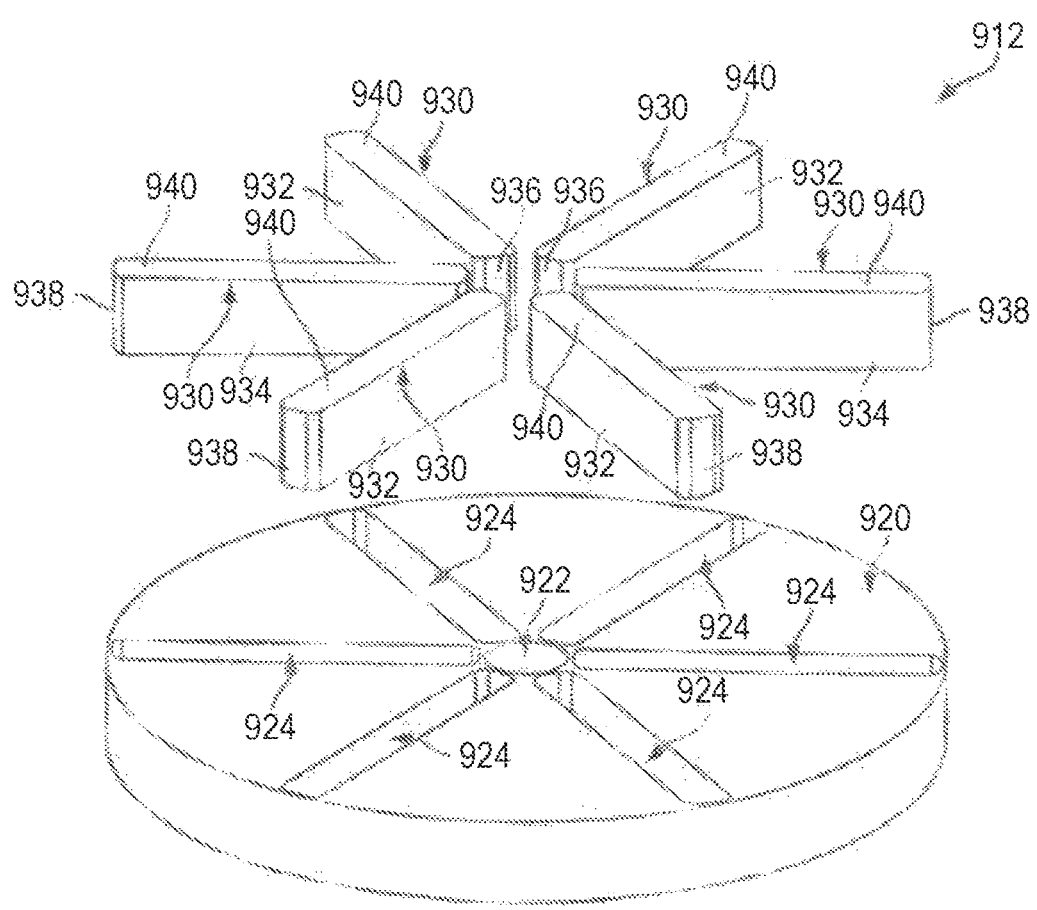
FIG. 17 illustrates an exploded, perspective view of the platter of FIG. 16.
Figure 18:
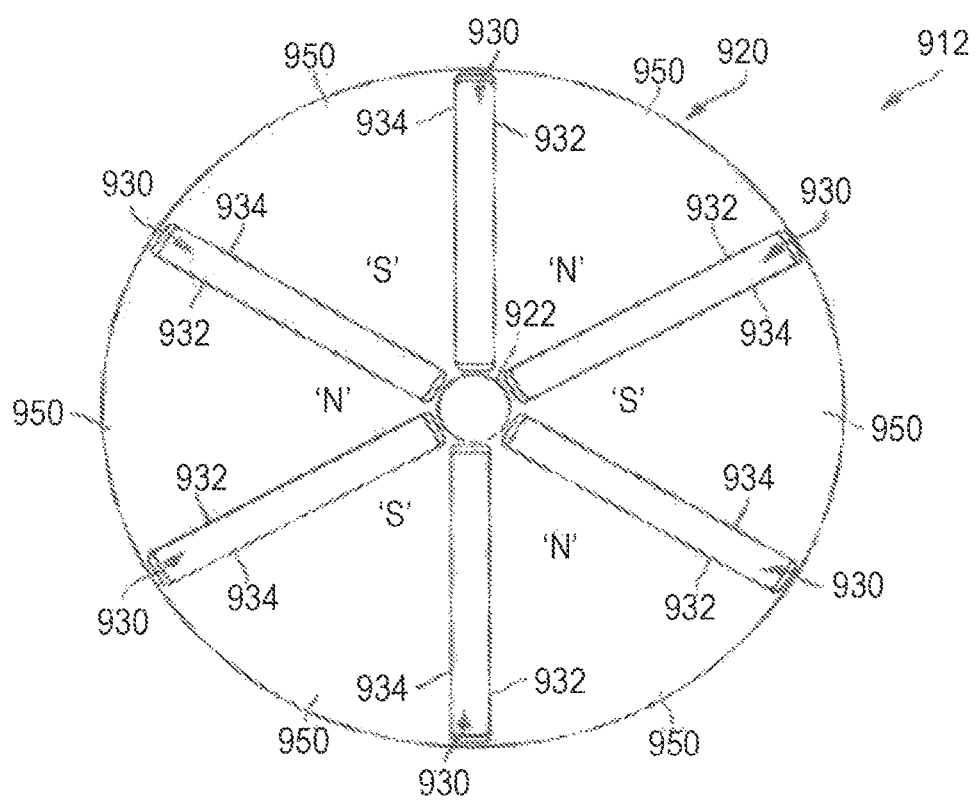
FIG. 18 illustrates a top, assembled view of the platter of FIG. 16.

Referring to FIGS. 16-18, another exemplary magnetic assembly 900 of the present disclosure is represented. Magnetic assembly 900 includes an upper platter 912 and a lower platter 914. Each of platters 912 and 914 include a plurality of spaced-apart permanent magnets 930 and a plurality of pole portions 950. Each of the plurality of spaced-apart permanent magnets 930 are illustratively shown as a single permanent magnet but may comprise multiple permanent magnets and/or at least one permanent magnet positioned within a housing. Exemplary platters are provided in U.S. Pat. No. 7,161,451 and U.S. Provisional Patent Application No. 62/248,804, filed Oct. 30, 2015, titled MAGNETIC COUPLING DEVICE WITH A ROTARY ACTUATION SYSTEM.

Returning to the example of FIGS. 16-18, each permanent magnet 930 has a north-pole side 932 and a south-pole side 934. The permanent magnets 930 and pole portions 950 of platter 912 and of platter 914 are each arranged to form a closed shape wherein one of pole portions 950 is positioned between two of permanent magnets 930. Further, the permanent magnets 930 are arranged so that each of the two permanent magnets 930 contacting the pole portion 950 therebetween have either their north-pole sides or their south-pole sides contacting the pole portion 950. When the north-pole sides of the adjacent permanent magnets 930 are contacting a pole portion 950, the pole portion 950 is referred to as a north-pole portion. When the south-pole sides of the adjacent permanent magnets 930 are contacting a pole portion 950, the pole portion 950 is referred to as a south-pole portion.

Each of upper platter 912 and lower platter 914 includes an equal and even number of permanent magnet sections and an equal number of pole portions 950. In one embodiment, in each of upper platter 912 and lower platter 914, permanent magnets 930 and pole portions 950 are arranged in a circular configuration.

In embodiments, lower platter 914 replaces permanent magnet 14 of magnetic coupling device 10 or permanent magnet 130 of magnetic coupling device 100 and is held stationary relative to housing 28 and upper platter 912 replaces permanent magnet 12 of magnetic coupling device 10 or permanent magnet 132 of magnetic coupling device 100 and rotates relative to lower platter 914. Additionally or alternatively, lower platter may be incorporated into the magnetic coupling device 1000 described below in relation to FIGS. 19-22.

Upper platter 912 is rotatable in directions 990, 992 about a central axis 994 relative to lower platter 914 to alter an alignment of the permanent magnets 930 and pole portions 950 of upper platter 912 relative to the permanent magnets 930 and pole portions 950 of lower platter 914.

Magnetic coupling device 900 is in an on state when the south-pole portions 950 of lower platter 914 are aligned with the south-pole portions 950 of upper platter 912 and the north-pole portions 950 of lower platter 914 are aligned with the north-pole portions 950 of upper platter 912. In the on-state, workpiece 27 is held by magnetic coupling device 10 due to a completion of a magnetic circuit from the aligned north-pole portions 950 of upper platter 912 and lower platter 914, through the workpiece 27, and to the aligned south-pole portions 950 of upper platter 912 and 914.

Magnetic coupling device 10 is in an off state when the south-pole portions 950 of lower platter 914 are aligned with the north-pole portions 950 of upper platter 912 and the north-pole portions 950 of lower platter 914 are aligned with the south-pole portions 950 of upper platter 912. In the off state, a workpiece 27 is not held by magnetic coupling device 10 due to a completion of a magnetic circuit within upper platter 912 and lower platter 914 from the aligned north-pole portions 950 of upper platter 912 to the south-pole portions 950 of lower platter 914 and from the aligned north-pole portions of upper platter 912 to the south-pole portions 950 of lower platter 914.

Referring to FIG. 16, upper platter 912 is shown exploded relative to lower platter lower platter 914. Lower platter 914 is generally identical to upper platter 912. Upper platter 912 may be rotated relative to lower platter 914 to place magnetic coupling device 10 in an on state or an off state.

Referring to FIG. 17, upper platter 912 is illustrated. Upper platter 912 includes a cylindrical base component 920 having a central aperture 922 and a plurality of radially extending apertures 924. Each of the radially extending apertures 924 is sized and shaped to receive a permanent magnet 930. Each permanent magnet 930 has a north side 932, a south side 934, a radially inward facing side 936, a radially outward facing side 938, a top 940, and a bottom.

Referring to FIG. 18, a top view of upper platter 912 is shown. Cylindrical base component 920 surrounds each of north sides 932, south sides 934, radially inward facing side 936, and radially outward facing side 938 of permanent magnet 930. In one embodiment, apertures 924 are not through apertures, but rather blind depth apertures from the bottom side of cylindrical base component 920 and hence cylindrical base component 920 would also surround top 940 of pole portions 950. In the illustrated embodiment, cylindrical base component 920 is a single integral component. In one embodiment, cylindrical base component 920 is comprised of two or more components joined together.

As shown in FIG. 18, permanent magnets 930 are arranged so that the north sides 932 of adjacent magnets are facing each other and the south sides 934 of adjacent magnets 930 are facing each other. This arrangement results in the portions 950 of cylindrical base component 920 between permanent magnet 930 to act as pole extensions for permanent magnet 930. In embodiments, base component 920 and hence pole portions 950 are made of steel. Other suitable ferromagnetic materials may be used for base component 920.

Figure 19:
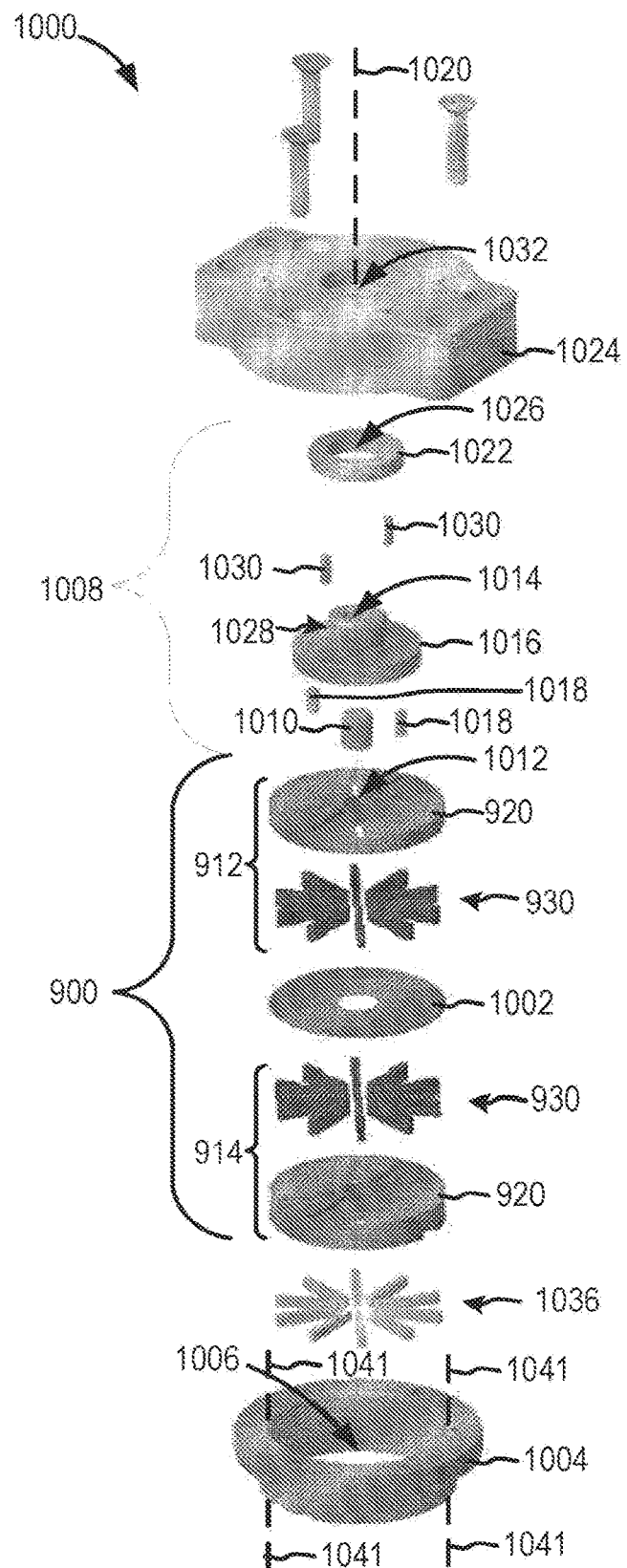
FIG. 19 illustrates an exploded, perspective view of another exemplary magnetic coupling device with pole shoes.

Referring to FIGS. 19-22, another exemplary magnetic coupling device 1000 of the present disclosure is represented. In FIG. 19, an exploded view of the magnetic coupling device 1000 is shown. Magnetic coupling device 1000 includes the magnetic assembly 900 depicted in FIGS. 16-18 with the addition of a spacer 1002 arranged between the permanent magnets of upper platter 912 and lower platter 914. Magnetic coupling device 1000 comprises a non-ferromagnetic housing 1004 illustratively having a circular foot print. A circular bore 1006 extends axially from the bottom to the top of housing 1004. The upper platter 912 and lower platter 914 are received in bore 1006.

The exemplary magnetic coupling device 1000 includes an actuator assembly 1008 to facilitate rotation of the upper platter 912 relative to the lower platter 914. In the illustrated example, the actuator assembly 1008 includes a shaft 1010 that protrudes from a central bore 1012 of the cylindrical base component 920 of the upper platter 912 into a central bore 1014 of a rotary actuator 1016 of the actuator assembly 1008. The rotary actuator 1016 is coupled to the cylindrical base component 920 by pins 1018. As such, when the rotary actuator 1016 is rotated, the rotation of the rotary actuator 1016 is translated to the cylindrical base component 920 by the pins 1018 and results in rotation of the upper platter 912 relative to the lower platter 914. The shaft 1010 facilitates concentric rotation of the rotary actuator 1016 and the second platter 912 about a central axis 1020.

The actuator assembly 1008 may include an annulus 1022 that facilitates concentric rotation of the rotary actuator 1016 about the central axis 1020. The annulus 1022 fits within a cap component 1024. The annulus 1022 may form a clearance fit with an internal surface of the cap component 1024 to facilitate rotation of the annulus 1022 within the cap component 1024. The annulus 1022 also includes a central bore 1026 that fits over a portion 1028 of the rotary actuator 1016. The annulus 1022 may be coupled to the rotary actuator 1016 via pins 1030. Alternatively, the annulus 1022 may rotate freely relative to the rotary actuator 1016.

Rotation of the rotary actuator 1016 may be accomplished by a torque output shaft (not shown) being inserted into and through a central bore 1031 of the cap component 1024 and received by the central bore 1014 of the rotary actuator 1016. The end of the torque output shaft engages internal ridges (not shown) of the central bore 1014 so that concentric rotation of the torque output shaft translates into concentric rotation of the rotary actuator 1016. As stated above, the rotary actuator 1016 is coupled to the base component 920 by pins 1018. As such, when the rotary actuator 1016 is rotated by the torque output shaft, the rotation of the rotary actuator 1016 translates to rotation of the upper platter 920.

Figure 20:
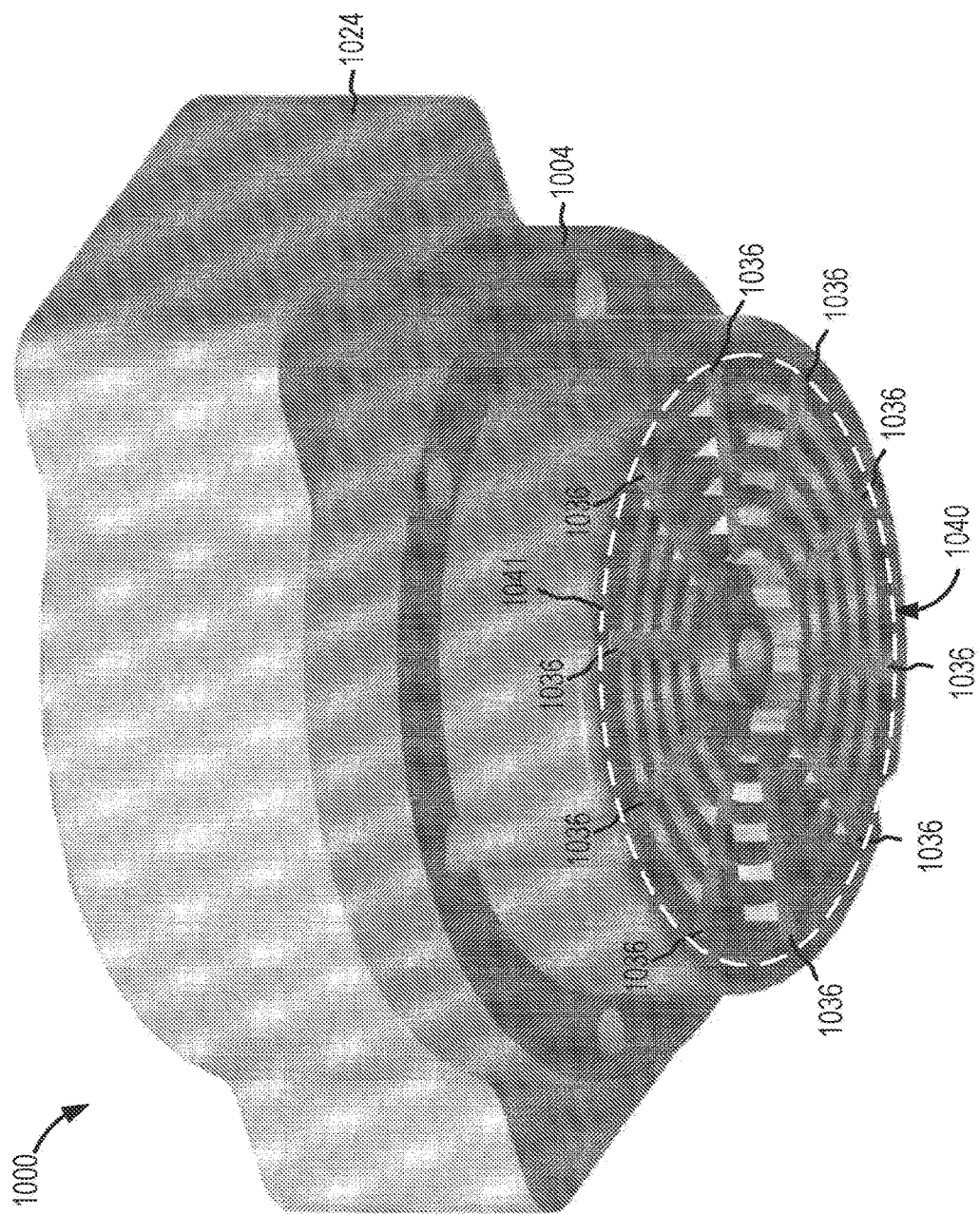
FIG. 20 illustrates a perspective, assembled view of the magnetic coupling device of FIG. 19.
Figure 21:
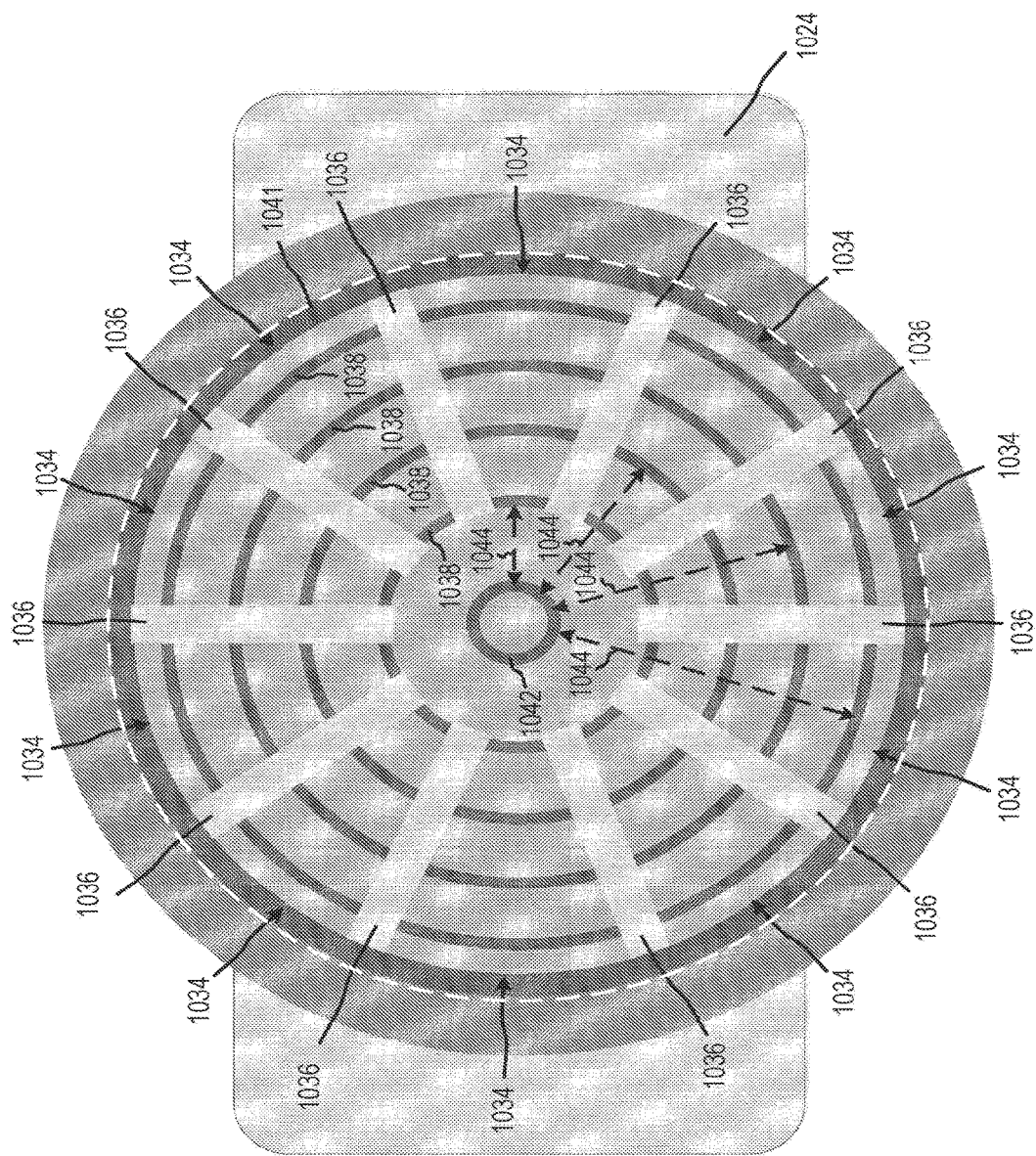
FIG. 21 illustrates a bottom, assembled view of the magnetic coupling device of FIG. 19.
Figure 22:
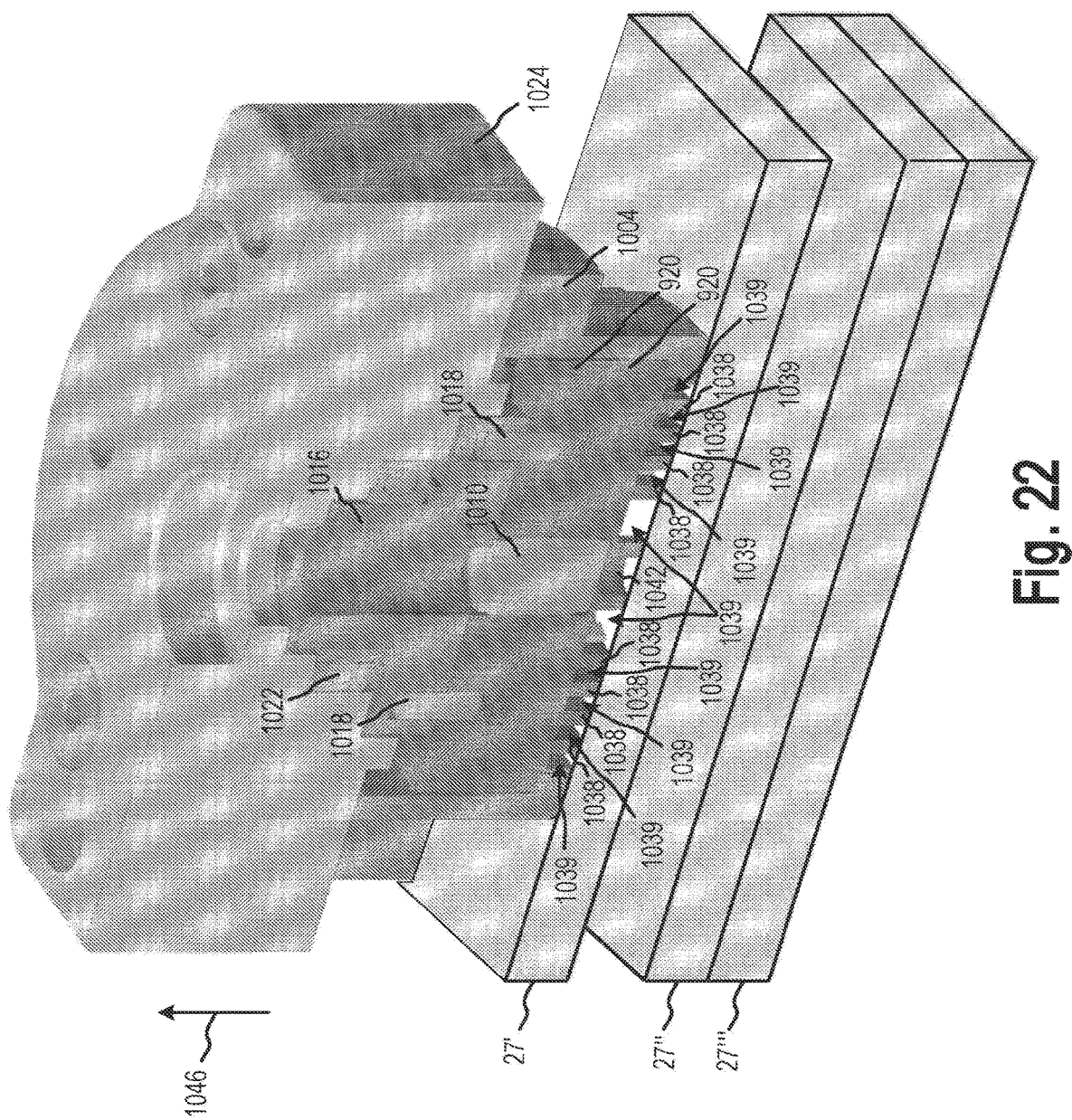
FIG. 22 illustrates a cross-sectional view of the magnetic coupling device of FIG. 19.
Figure 24:
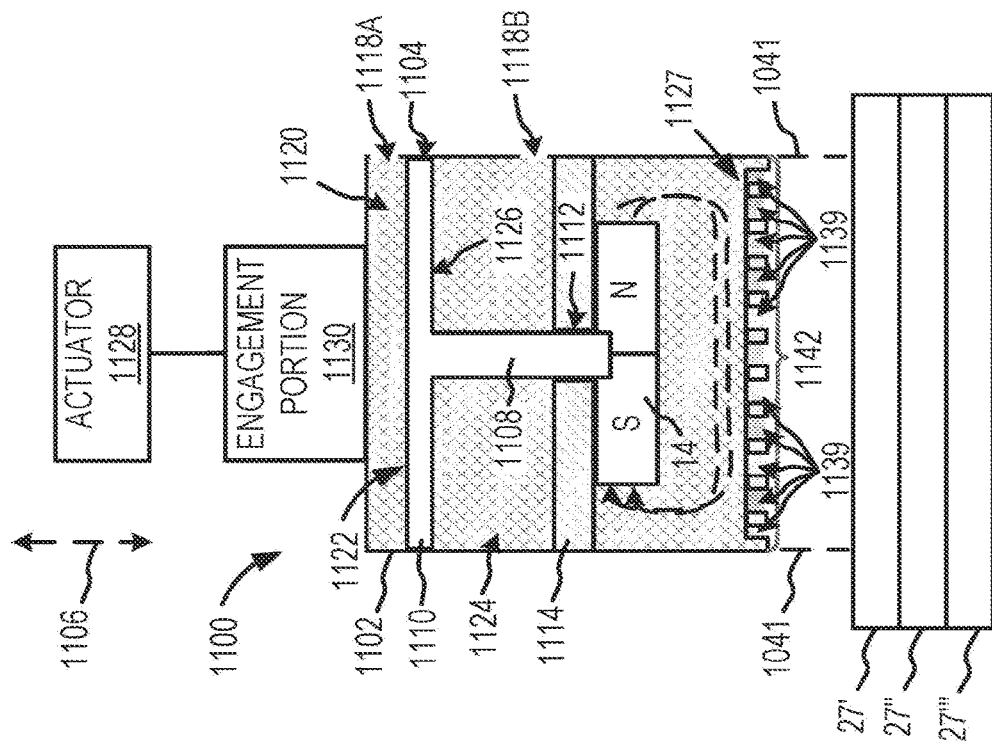
FIG. 24 illustrates a cross-sectional view of the magnetic coupling device depicted in FIG. 23 in an exemplary off state positioned above a stack of a plurality of ferromagnetic workpieces.
Figure 23:
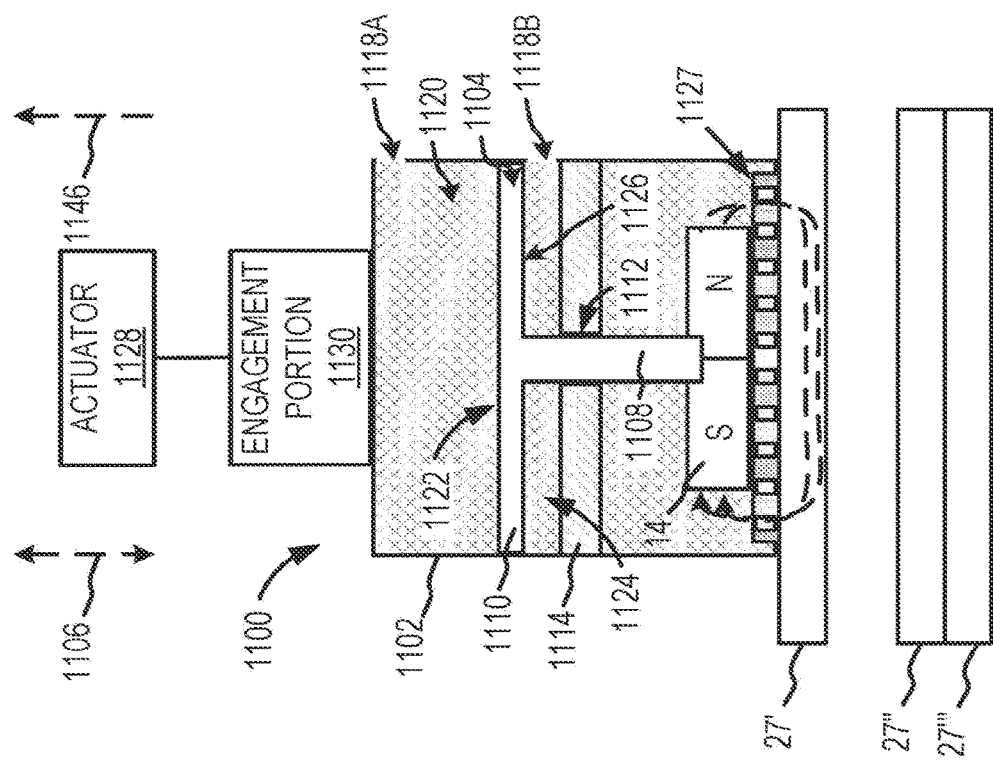
FIG. 23 illustrates a cross-sectional view of another magnetic coupling device with pole portions in an exemplary on state coupled to a ferromagnetic workpiece.

As shown in FIGS. 20-22, the base component 920 is separated into a plurality of sectors 1034 by non-ferromagnetic pieces 1036. Each sector 1034 of the workpiece contact interface 1040 includes spaced-apart projections 1038 separated by recesses 1039 (see FIG. 22). As illustrated, the spaced-apart projections 1038 are located within a vertical envelope 1041 defined by the central bore 1006. The spaced-apart projections 1038 may be integrally formed as a bottom surface of the pole portions 950 of the base component 920. Alternatively, the spaced-apart projections 1038 may be coupled to a bottom surface of the pole portions 950. While the example depicted illustrates four spaced-apart projections 1038, other embodiments may have two or more spaced-apart projections 1038.

The spaced-apart projections 1038 collectively form a workpiece contact interface 1040. That is, in embodiments, the spaced-apart projections 1038 form the workpiece contact interface 1040 of the pole portions 950 of the base component 920. As such, the spaced-apart projections 1038 may also be referred to herein as pole portion workpiece interfaces 1038. In embodiments, a central projection 1042 and/or the non-ferromagnetic pieces 1036 may be included in the workpiece contact interface 1040.

The pole portion workpiece interfaces 1038 are located at a different radial distances 1044 from the central projection 1042 of the base component 920. In embodiments, the radial distances 1044 may be a multiple of the thickness of the workpiece sheets 27. As an example, if the thickness of the workpiece sheets 27 is X mm, then the radial distances 1044 may be n*X (+/−25%), where n is an integer. The pole portion workpiece interfaces 1038 may also have the same or similar characteristics as pole shoes 102, 200, 300, 400, 500, 602 (e.g., the same or similar: widths, widths and/or depths of the recesses, rounded shoulder portions, a curved workpiece interface, a compressible member between each of the pole portion workpiece interfaces 1038, etc.).

Due to the pole portion workpiece interfaces 1038 being spaced apart, they may have many of the same advantages as the pole shoes 16', 16" described above. That is, they may produce a shallow magnetic field useful for de-stacking the workpiece sheets 27. For example, when the magnetic coupling device 1000 is in an on state, the magnetic circuit produced by the magnetic coupling device 1000 is substantially confined to workpiece sheet 27' of workpiece sheets 27 and of sufficient holding force to vertically lift workpiece sheet 27' in direction 1046 (of FIG. 22) relative to the remainder of workpiece sheets 27. Thus, magnetic coupling device 1000 may function to de-stack workpiece sheets 27. Of course, in some embodiments, a portion of the magnetic flux provided to workpiece sheets 27 by switchable magnet device 10 may enter lower sheet 27" of workpiece sheets 27, but not to a level that results in lower sheet 27" being lifted by switchable magnetic device 1000 along with workpiece sheet 27'. Thus, as used herein, the first magnetic circuit being substantially confined to workpiece sheet 27' of workpiece sheets 27 means that the amount, if any, of the magnetic flux from switchable magnetic lifting device 1000 entering lower sheet 27" is below a level that would result in the lower sheet 27" being vertically lifted in direction 1046 by switchable magnetic lifting device 1000 along with workpiece sheet 27'.

Referring to FIGS. 23-27, another exemplary magnetic coupling device 1100 of the present disclosure is represented. Magnetic coupling device 1100 includes the lower platter 14. Alternatively, the lower permanent magnet 14 could be replaced with the upper permanent magnet 12, the upper magnet 118, the lower magnet 120, the upper platter 912, the lower platter 914, or bar magnets. Additionally or alternatively, the magnetic coupling 1100 may be a parallelepiped and/or have a rectangular footprint instead of being cylindrical and/or having a circular footprint.

A housing 1102 of the magnetic coupling device 1100 houses the lower permanent magnet 14 and an actuator assembly 1104. The actuator assembly 1104 facilitates movement of the lower permanent magnet 14 along the axis 1106. In particular, in the illustrated embodiment, the actuator assembly 1104 includes a connecting rod 1108 coupling the lower permanent magnet 14 to a crown 1110. That is, the connecting rod 1108 extends from the lower permanent magnet 14 through a central bore 1112 of an intermediate element 1114 to the crown 1110. In one example, the connecting rod 1108 and the central bore 1112 form a clearance fit. The crown 1110 and interior walls of the housing 1102 may also form a clearance fit. In at least some embodiments, the intermediate element 1114 acts as a shorting plate, so the magnetic circuit created by the magnet 14 is primarily contained within the housing 1102.

In the exemplary embodiment depicted, the housing 1102 includes two ports 1118. Gas and/or fluid may be provided through the ports 1118 to move the actuator assembly 1104 from a first position shown in FIG. 23 to a second position shown in FIG. 24 and vice versa. In particular, by providing gas and/or fluid through port 1118A into a housing portion 1120 above the crown 1110, the gas and/or fluid exerts pressure on a top surface 1122 of the crown 1110, thereby exerting a downward force on the actuator assembly 1104. In response, the actuator assembly 1104 moves downward along the axis 1106 so the lower permanent magnet 14 is positioned near the base 1127 of the housing 1102. When the permanent magnet 14 is positioned near the base 1127 of the housing 1102, a magnetic circuit is substantially formed through the workpiece 27' (see FIG. 23), thereby allowing the workpiece sheet 27' to be de-stacked from the workpiece sheets 27", 27"', as discussed in more detail below.

Alternatively, by providing gas and/or fluid through port 1118B and into a housing portion 1124 below the crown 1110, the gas and/or fluid exerts pressure on a bottom surface 1126 of the crown 1110, thereby providing an upward force on the actuator assembly 1104. In response, the actuator assembly moves upward along the axis 1106 so the lower permanent magnet 14 is positioned away and/or separated from the base 1127 of the housing 1102. When the lower permanent magnet 14 is positioned away and/or separated from the base 1127 of the housing 1102, a magnetic circuit is substantially internal to the housing 1102 (see FIG. 24), thereby allowing the magnetic coupling device 1110 to be separated from the workpiece sheets 27.

While the illustrated example depicts an intermediate element 1112, in alternative embodiments the magnetic coupling device 1100 may not include an intermediate element 1114. In these embodiments, however, more gas and/or liquid may need to be provided into the housing portion 1124 to result in movement of the actuator assembly 1104 upward away from the base 1127 of the housing 1102.

In alternative embodiments, the actuator assembly 1104 may be moved along the axis 1106 using a linear actuator 1128 coupled to an engagement portion 1130 that is coupled to the actuator assembly 1104. The actuator 1128 and/or a device providing the gas and/or liquid through the ports 1118 may be coupled to a controller (e.g., the controller 34) that controls the operation and hence the position of the actuator assembly 1104. Alternatively, the linear actuator 1128 may be actuated electrically and/or manually.

Figure 25:
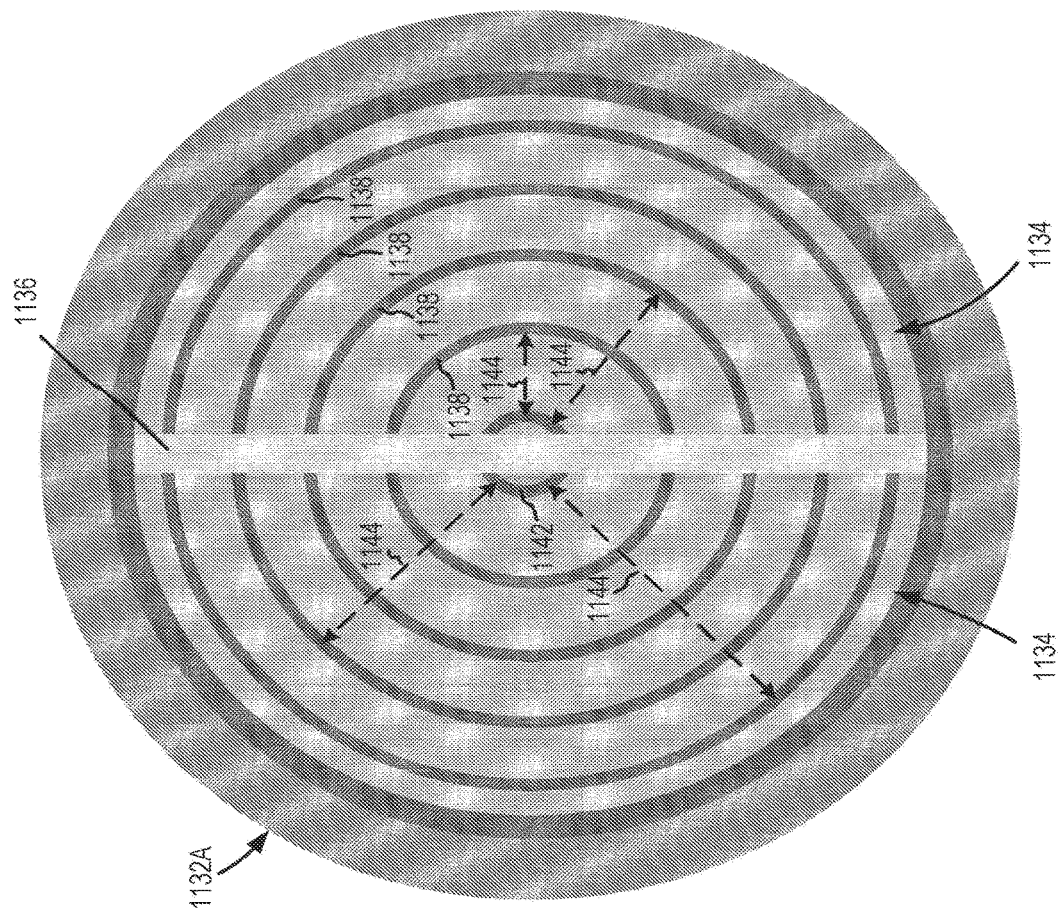
FIG. 25 illustrates a bottom view of the magnetic coupling device of FIG. 23.

As illustrated in FIG. 25, the housing 1102 may have a circular base 1132. Referring to the illustrated embodiment shown in FIG. 25, the base 1132A may be separated into two sectors 1134 by a non-ferromagnetic piece 1136, so there is a sufficient gap between the N-pole and the S-pole to prevent shorting of the magnetic circuit. Each sector 1134 of the base 1132A includes spaced-apart projections 1138 separated by recesses 1139 (see FIG. 24). As illustrated, the spaced-apart projections 1138 are located within a vertical envelope 1141 of the housing 1102. The spaced-apart projections 1138 may be coupled to the base 1127 of the housing 1102. The base 1132A may include two or more spaced-part projections 1138.

The spaced-apart projections 1138 collectively form a workpiece contact interface 1140 (see FIG. 24) of the base 1132A. As such, the spaced-apart projections 1138 may also be referred to herein as pole portion workpiece interfaces 1138. A central projection 1142 and/or the non-ferromagnetic piece 1136 may be included in the workpiece contact interface 1140 of the base 1132A.

The pole portion workpiece interfaces 1138 are located at a different radial distances 1144 from the central projection 1140. In embodiments, the radial distances 1144 may be a multiple of the thickness of the workpiece sheets 27. As an example, if the thickness of the workpiece sheets 27 is X mm, then the radial distances 1144 may be n*X (+/−25%), where n is an integer. The pole portion workpiece interfaces 1138 may also have the same or similar characteristics as pole shoes 102, 200, 300, 400, 500, 602 (e.g., the same or similar: widths, widths and/or depths of the recesses, rounded shoulder portions, a curved workpiece interface, a compressible member between each of the pole portion workpiece interfaces 1138, etc.). While the pole portion workpiece interfaces 1138 are depicted as being circularly, alternatively, they may be linear.

Due to the pole portion workpiece interfaces 1138 being spaced apart, they may have many of the same advantages as the pole shoes 16', 16" and/or the pole portion workpiece interfaces 1038 described above. That is, they may produce a shallow magnetic field useful for de-stacking the workpiece sheets 27. For example, when the magnetic coupling device 1100 is in an on state (see FIG. 23), the magnetic circuit produced by the magnetic coupling device 1100 is substantially confined to workpiece sheet 27' of workpiece sheets 27 and of sufficient holding force to vertically lift workpiece sheet 27' in direction 1146 (of FIG. 23) relative to the remainder of workpiece sheets 27. Thus, magnetic coupling device 1100 may function to de-stack workpiece sheets 27. In some embodiments, a portion of the magnetic flux provided to workpiece sheets 27 by switchable magnet device 10 may enter lower sheet 27" of workpiece sheets 27, but not to a level that results in lower sheet 27" being lifted by switchable magnetic device 10 along with workpiece sheet 27'. Thus, as used herein, the first magnetic circuit being substantially confined to workpiece sheet 27' of workpiece sheets 27 means that the amount, if any, of the magnetic flux from switchable magnetic lifting device 1100 entering lower sheet 27" is below a level that would result in the lower sheet 27" being vertically lifted in direction 1146 by switchable magnetic lifting device 1100 along with workpiece sheet 27'.

As stated above, the lower permanent magnet 14 may be replaced with the upper permanent magnet 12, the upper magnet 118, the lower magnet 120, the upper platter 912, or the lower platter 914. In embodiments where the lower permanent magnet 14 is replaced by the upper platter 912 or the lower platter 914, the base 1132A may be replaced by the base depicted in FIG. 21.

Figure 27:
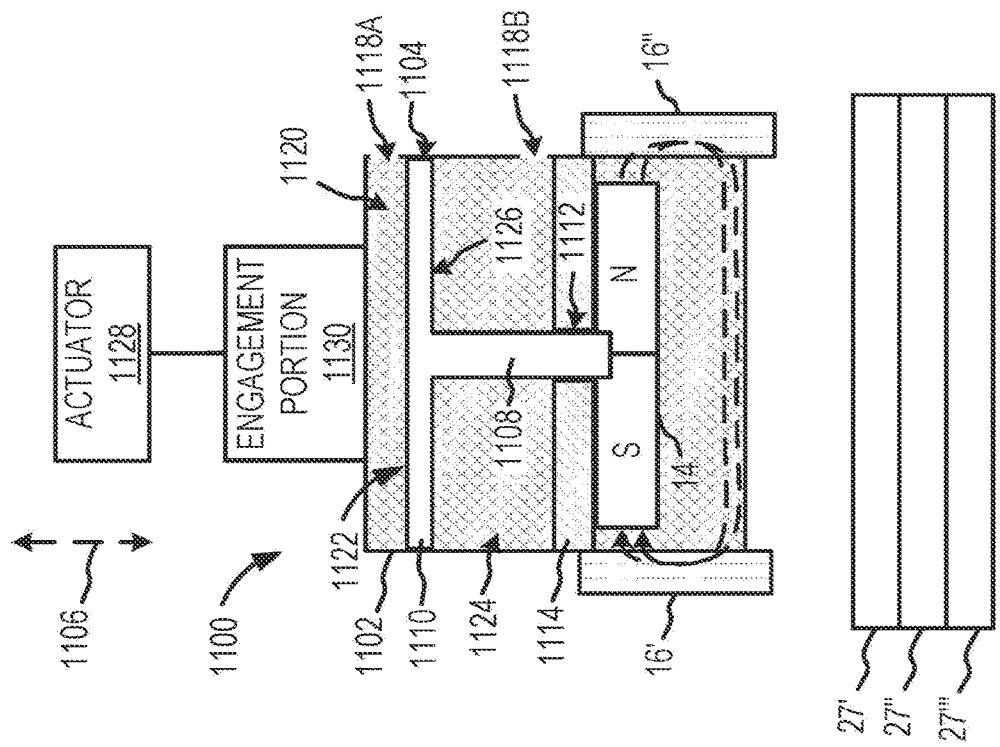
FIG. 27 illustrates a cross-sectional view of the magnetic coupling device depicted in FIG. 26 in an exemplary off state positioned above a stack of a plurality of ferromagnetic workpieces.
Figure 26:
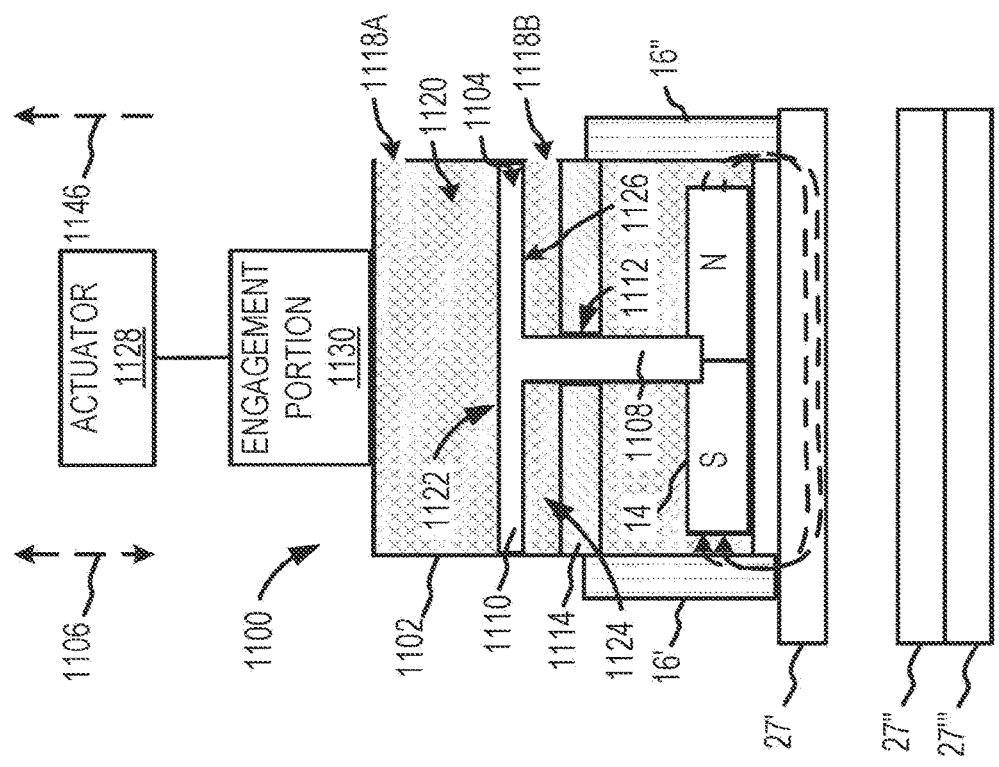
FIG. 26 illustrates a cross-sectional view of the magnetic coupling device of FIG. 23 with pole shoes in an exemplary on state coupled to a ferromagnetic workpiece.

In even other embodiments, the pole portion workpiece interfaces 1138 of the magnetic coupled device 1100 may be replaced by the pole shoes 16', 16", as shown in FIGS. 26 and 27. In embodiments, the pole shoes 16', 16" may also have the same or similar characteristics as pole shoes 102, 200, 300, 400, 500, 602 (e.g., the same or similar: widths, widths and/or depths of the recesses, rounded shoulder portions, a curved workpiece interface, compressible member between each of the spaced-part projections, etc.).

Figure 28A:
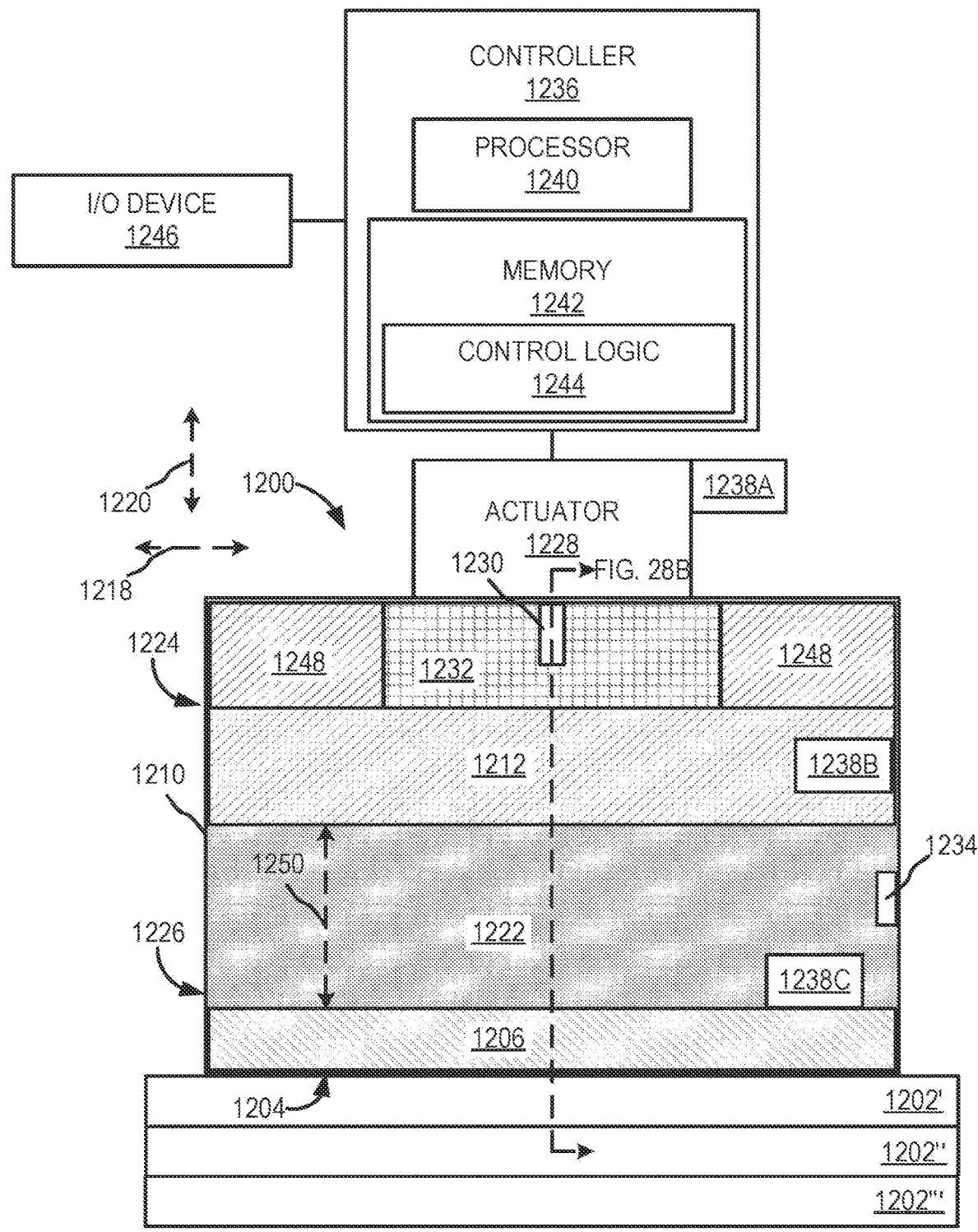
FIG. 28A illustrates a side-sectional view of another exemplary magnetic coupling device in an exemplary first, off state positioned on a stack of ferromagnetic workpieces.
Figure 28B:
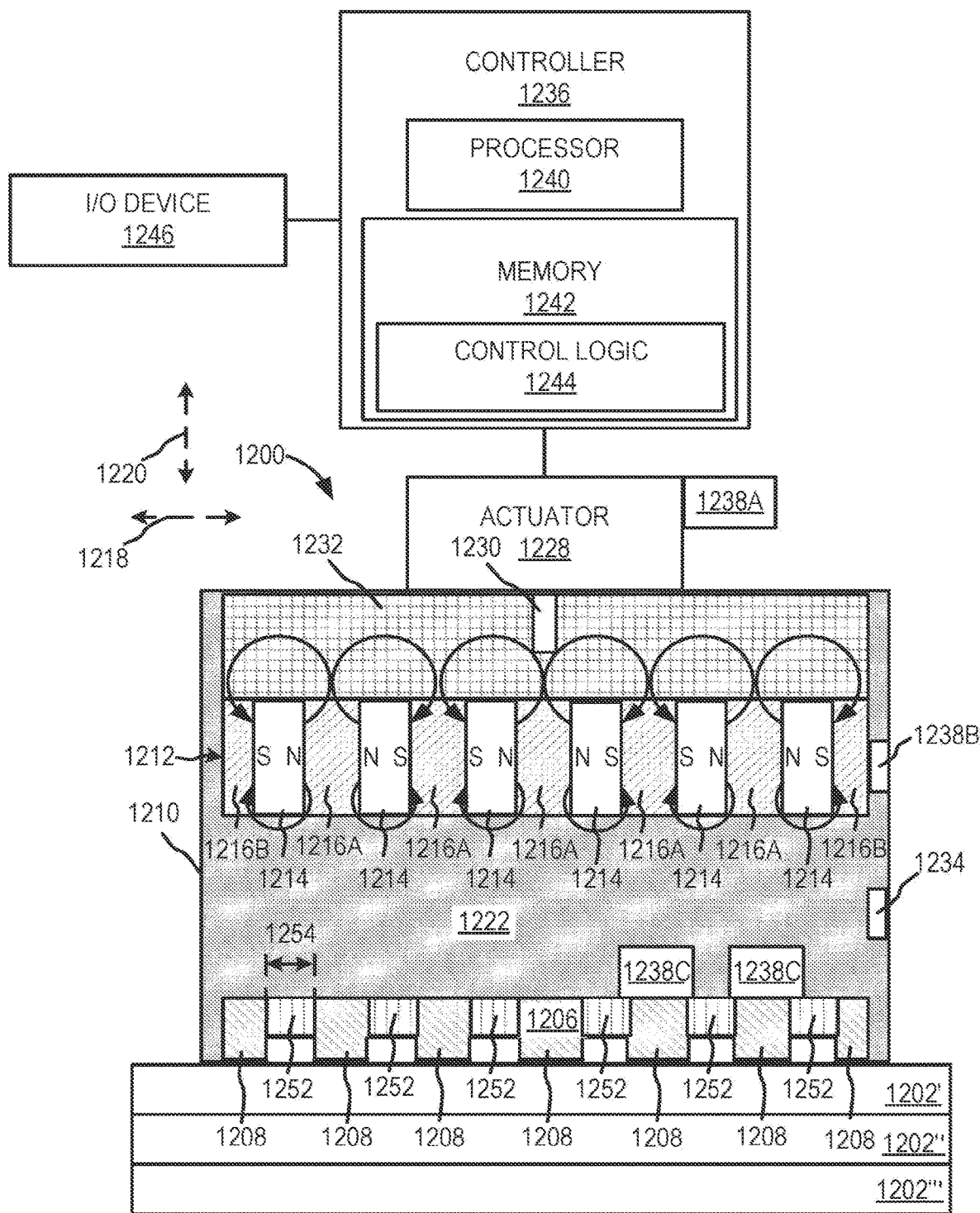
FIG. 28B illustrates a front sectional view of the magnetic coupling device of FIG. 28A.
Figure 29:
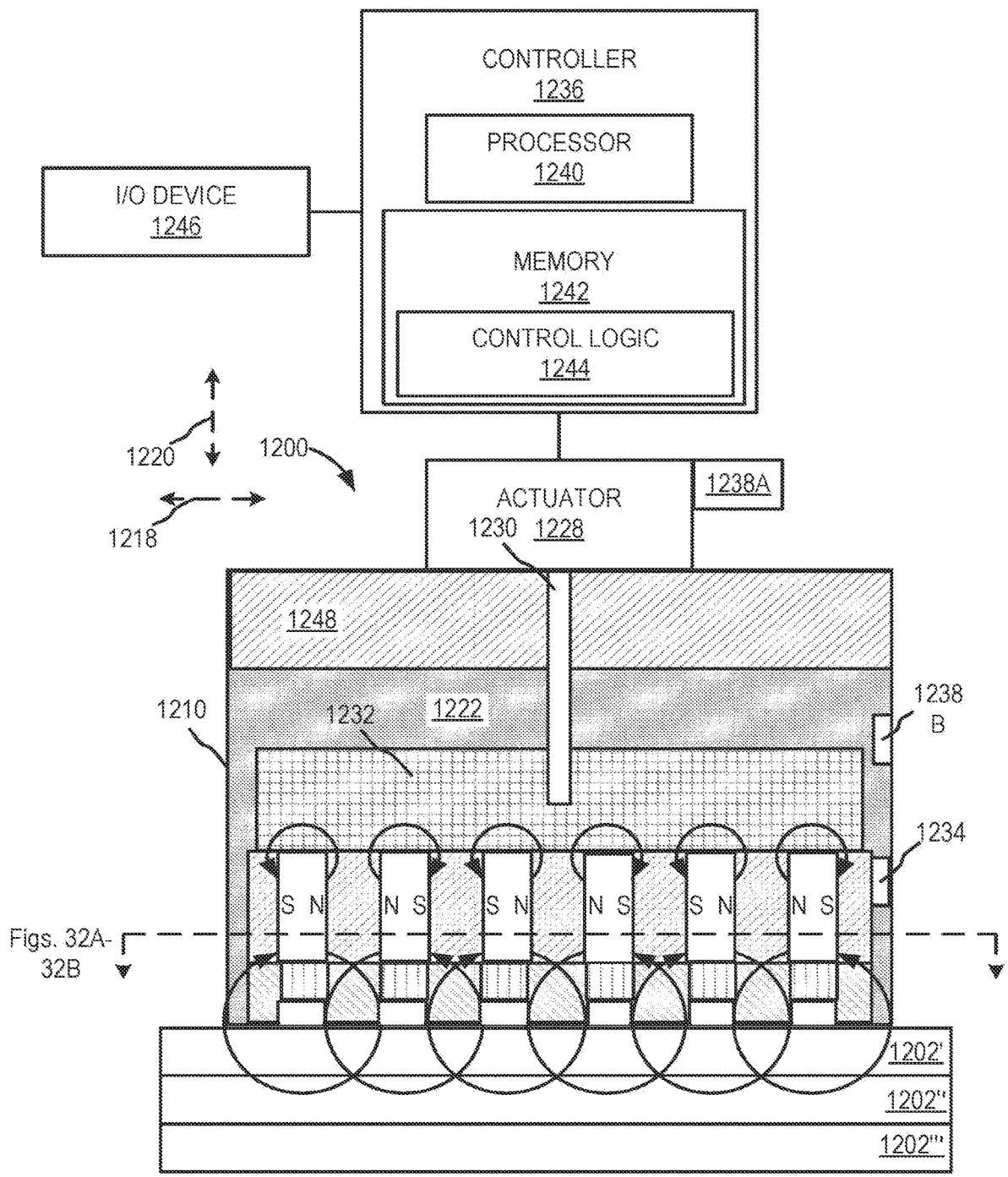
FIG. 29 illustrates a front sectional view of the magnetic coupling device of FIGS. 28A-28B in a second, on state.
Figure 30:
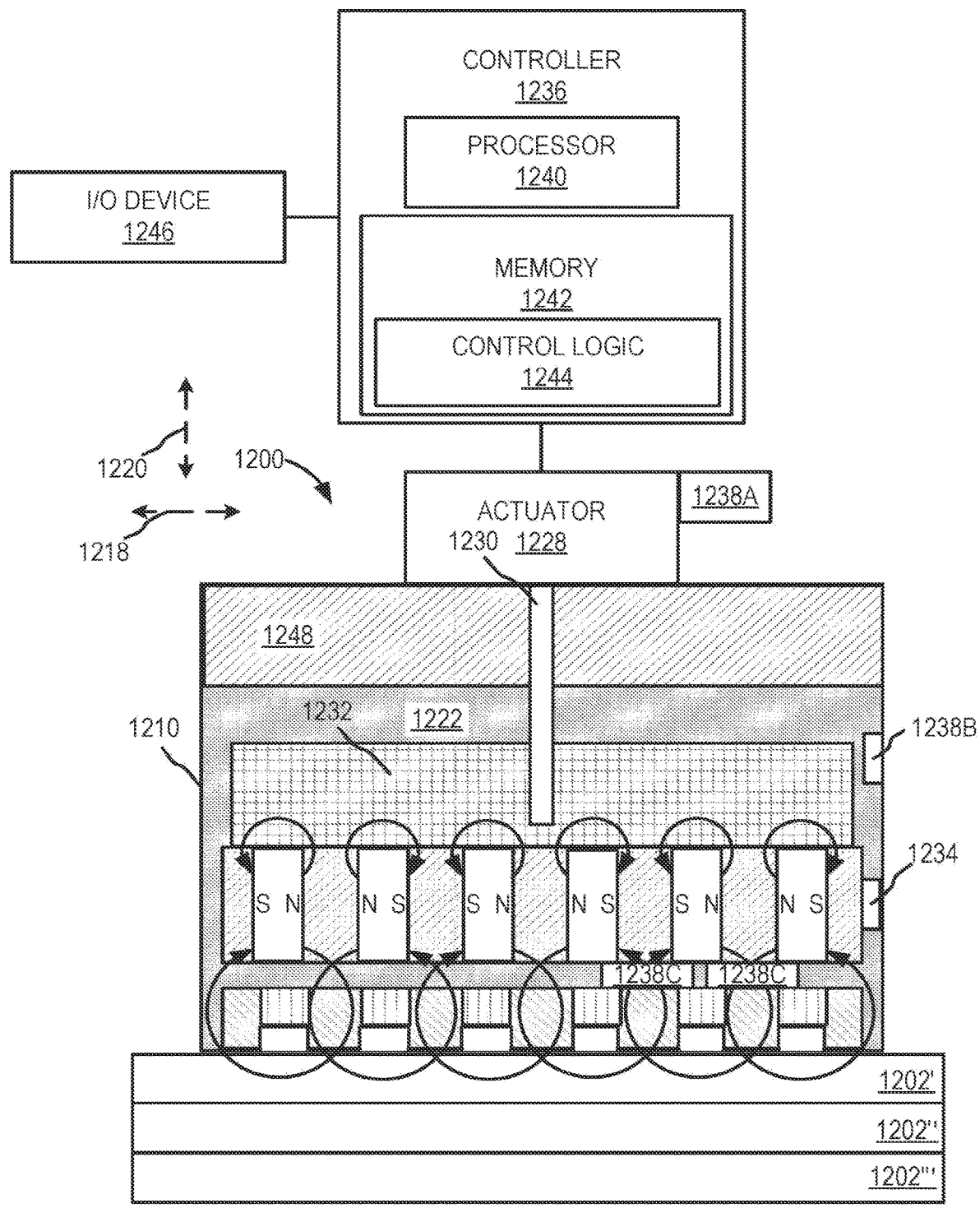
FIG. 30 illustrates a front sectional view of the magnetic coupling device of FIGS. 28A-28B in a third, on state.

Another exemplary magnetic coupling device 1200 of the present disclosure is represented in FIGS. 28A-30. FIG. 28A illustrates a side sectional view of an exemplary switchable magnetic coupling device 1200 in a first, off state and FIG. 28B illustrates a front sectional view of magnetic coupling device 1200. FIG. 29 illustrates a front sectional view of the magnetic coupling device of FIGS. 28A-28B in a second, on state. FIG. 30 illustrates a front sectional view of the magnetic coupling device of FIGS. 28A-28B in a third, on state.

Magnetic coupling device 1200 may be switched between a first, off state (depicted in FIGS. 28A-28B), a second, on state (depicted in FIG. 29), and/or a third, on state. When magnetic coupling device 1200 is switched to an on state, a magnetic field produced by magnetic coupling device 1200 passes through one or more ferromagnetic workpieces 1202 and couples magnetic coupling device 1200 to one or more of the ferromagnetic workpieces 1202. When magnetic coupling device 1200 is switched to an off state, magnetic field produced by magnetic coupling device 1200 is primarily confined within magnetic coupling device 1200 and, therefore, magnetic coupling device 1200 no longer couples to one or more of the ferromagnetic workpieces 1202. The off state and the on states are discussed in more detail below.

Magnetic coupling device 1200 may be used as an end of arm ("EOAMT") unit for a robotic system, such as robotic system 700 (see FIG. 13), but may also be used with other lifting, transporting, and/or separating systems for ferromagnetic workpieces 1202. Exemplary lifting and transporting systems include robotic systems, mechanical gantries, crane hoists and additional systems which lift and/or transport ferromagnetic workpieces 1202. Additionally, magnetic coupling device 1200 may also be used as part of a stationary fixture for holding at least one part for an operation, such as welding, inspection, and other operations.

Referring to FIG. 28A, magnetic coupling device 1200 is positioned on top of ferromagnetic workpieces 1202 and includes a workpiece contact interface 1204 configured to contact and engage the ferromagnetic workpieces 1202. Workpiece contact interface 1204 may be a pole plate 1206. In at least one embodiment, the pole plate 1206 includes a plurality of spaced-apart projections 1208 as illustrated in FIG. 28B. In other embodiments, the pole plate 1206 does not include spaced-apart projections 1208. The spaced-apart projections 1208 may facilitate concentrating more magnetic flux near the workpiece contact interface 1204 so that when magnetic coupling device 1200 is in an on state, the magnetic flux of the magnetic coupling device 1200 primarily passes through the first ferromagnetic workpiece 1202'. Exemplary aspects of the pole plate 1206 and the projections 1208 are discussed below.

Magnetic coupling device 1200 also includes a housing 1210 that supports a magnetic platter 1212. Magnetic platter 1212 produces the magnetic field that allows magnetic coupling device 1200 to couple to ferromagnetic workpieces 1202 when the magnetic coupling device 1200 is in an on state. In at least one embodiment, magnetic platter 1212 is a laminated magnetic platter that includes a plurality of spaced-apart permanent magnet portions 1214 and a plurality of pole portions 1216, as shown in FIG. 28B. Each of the plurality of spaced-apart permanent magnet portions 1214 includes one or more permanent magnets. In one embodiment, each permanent magnet portion 1214 includes a single permanent magnet. In another embodiment, each permanent magnet portion 1214 includes a plurality of permanent magnets. Each permanent magnet portion 1214 is diametrically magnetized and has a north-pole side and a south-pole side.

Each pole portion 1216A is positioned between two of permanent magnet portions 1214 and pole portions 1216B are arranged adjacent to one permanent magnet portion 1214. Further, the permanent magnet portions 1214 are arranged so that each of the two permanent magnet portions 1214 contacting the pole portion 1216A therebetween have either their north pole sides or their south pole sides contacting the pole portion 1216A. When the north-pole sides of the adjacent permanent magnet portions 1214 are contacting a pole portion 1216A, the pole portion 1216A is referred to as a north-pole portion. When the south-pole sides of the adjacent permanent magnet portions 1214 are contacting a pole portion 1216A, the pole portion 1216A is referred to as a south-pole portion. Similarly, for pole portions 1216B, when the south-pole side of a permanent magnet portion 1214 contacts the pole portion 1216B, the pole portion 1216B is referred to as a south-pole portion. Conversely, when the north-pole side of a permanent magnet portion 1214 contacts the pole portion 1216B, the pole portion 1216B is referred to as a north-pole portion.

In the embodiments shown, the permanent magnet portions 1214 are arranged along a horizontal axis 1218. However, in other embodiments, the permanent magnet portions 1214 may be arranged in a circular configuration. Furthermore, while the embodiment illustrates magnetic platter 1212 including six permanent magnet portions 1214 and seven pole portions 1216, other embodiments may include more or fewer permanent magnet portions 1214 and pole portions 1216. For example, in one embodiment, magnetic platter 1212 may include one permanent magnet portion 1214 and two pole portions 1216, where one pole portion 1216 is arranged on each side of permanent magnet portion 1214.

Due to the configuration of magnetic platter 1212 and magnetic coupling device 1200, magnetic coupling device 1200 may be have a greater magnetic flux transfer to one or more of the ferromagnetic pieces 1202 than conventional embodiments. This results in magnetic coupling device 1200 being able to lift more and/or heavier ferromagnetic workpieces 1202 per magnetic volume included in magnetic coupling device 1200. For example, the magnetic coupling device 1200 may have a holding force of greater than or equal to 0.35 grams of ferromagnetic workpieces 1202 per cubic mm of volume of the magnetic coupling device 1200. As another example, the magnetic coupling device 1200 may have a holding force of greater than or equal to 0.8 grams of ferromagnetic workpieces 1202 per cubic mm of volume of the housing 1210 of the magnetic coupling device 1200.

To switch magnetic coupling device 1200 between a first, off state and a second, on state, magnetic platter 1212 is linearly translatable along an axis 1220 within an interior cavity 1222 of the housing 1204. In embodiments, the axis 1220 is a vertical axis 1220. Alternatively, the axis 1220 is an axis other than a vertical axis. The axis 1220 extends between a first end portion 1224 of the housing 1204 and a second end portion 1226 of the housing 1210. In at least some embodiments, the first end portion 1224 is an upper portion of the housing 1210 and the second end portion 1226 is a lower portion of the housing 1210 and may be referred to herein as such. However, in at least some other embodiments, the first end portion 1224 is a portion of the housing 1210 other than the upper portion of the housing 1210 and the second end portion 1226 is a portion of the housing 1210 other than the lower portion of the housing 1210. When magnetic platter 1212 is arranged near the upper portion 1224 of the housing 1210, magnetic coupling device 1200 is in a first, off state. When magnetic platter 1212 is arranged near the lower portion 1226 of the housing 1210, magnetic coupling device 1200 is in a second, on state. In addition to a first, off state and a second, on state, magnetic platter 1212 may be arranged at one or more intermediate positions between the upper portion 1224 and the lower portion 1226, as shown in FIG. 30. An intermediate position may be referred to herein as a third, on state. The third, on state may produce less magnetic flux at the workpiece contact interface 1204 than the second, on state, as discussed below.

To translate the magnetic platter 1212 along the vertical axis 1220 to transition to magnetic coupling device 1200 between an on state and off state and vice-versa, magnetic coupling device 1200 includes an actuator 1228. In at least one embodiment, actuator 1228 is coupled to magnetic platter 1212 via an engagement portion 1230 and a non-ferromagnetic mounting plate 1232. That is, actuator 1228 is coupled to engagement portion 1230 which is coupled to the non-ferromagnetic mounting plate 1232; and, non-ferromagnetic mounting plate 1232 is coupled to and in contact with magnetic platter 1212. Actuator 1228 is configured to impart a force on engagement portion 1230 and, in response, engagement portion 1230 translates along vertical axis 1220 to transition magnetic coupling device 1200 from an off state to an on state and vice versa. That is, to transition magnetic coupling device 1200 from an off state to an on state, actuator 1228 imparts a downward force on engagement portion 1230, which translates to non-ferromagnetic mounting plate 1232 and magnetic platter 1212. In response, magnetic platter 1212 translates from the upper portion 1224 to the lower portion 1226. Conversely, to transition magnetic coupling device 1200 from an on state to an off state, actuator 1228 imparts an upward force on engagement portion 1230, which translates to non-ferromagnetic mounting plate 1232 and magnetic platter 1212. In response, magnetic platter 1212 and non-ferromagnetic mounting plate 1232 translate from the lower portion 1226 to the upper portion 1224.

To arrange magnetic platter 1212 at a third, on state, actuator 1228 may produce a force on engagement portion 1230 to translate magnetic platter 1212 from the upper portion 1224 to the lower portion 1226 or vice versa. Then, when the magnetic platter 1212 is transitioning from the upper portion 1224 to the lower portion 1226 or vice versa, a brake 1234 arranged within housing 1210 and/or within actuator 1228 may engage magnetic platter 1212, non-ferromagnetic mounting plate 1232 and/or engagement portion 1230 and stop magnetic platter 1212 at a third, on state, as depicted in FIG. 30.

Figure 31:
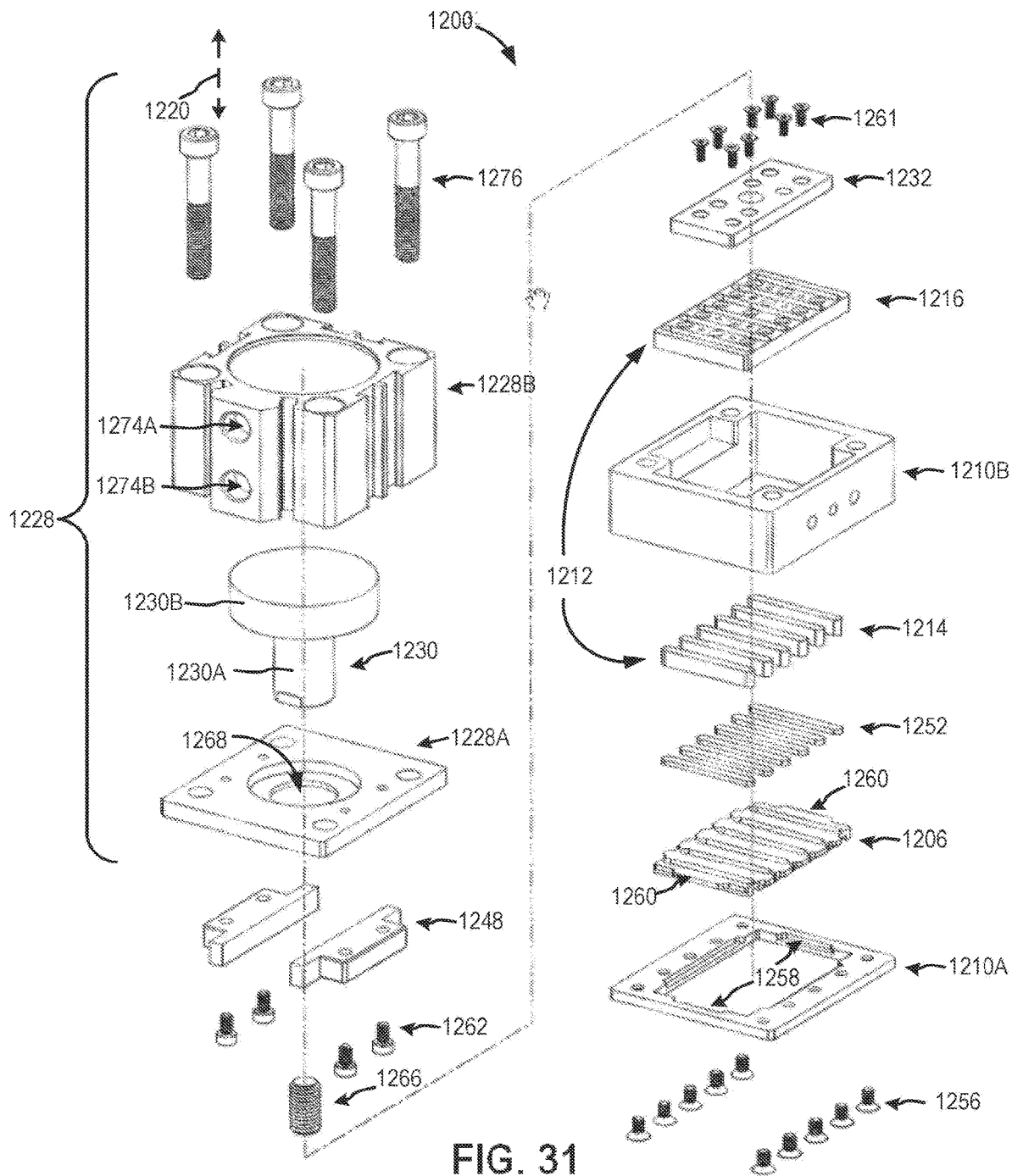
FIG. 31 illustrates an exploded view of the magnetic coupling device of FIGS. 28A-28B.

Exemplary actuators 1228 include electrical actuators, pneumatic actuators, hydraulic actuators, and other suitable devices which impart a force on engagement portion 1230. An exemplary pneumatic linear actuator is depicted in FIG. 31 and discussed in more detail in relation thereto. An exemplary electrical actuator is an electric motor with an "unrolled" stator and rotor coupled to the engagement portion 1230. Other exemplary engagement portions and actuators are disclosed in U.S. Pat. No. 7,012,495, titled SWITCHABLE PERMANENT MAGNETIC DEVICE; U.S. Pat. No. 7,161,451, titled MODULAR PERMANENT MAGNET CHUCK; U.S. Pat. No. 8,878,639, titled MAGNET ARRAYS, U.S. Provisional Patent Application No. 62/248,804, filed Oct. 30, 2015, titled MAGNETIC COUPLING DEVICE WITH A ROTARY ACTUATION SYSTEM, and U.S. Provisional Patent Application No. 62/252,435, filed Nov. 7, 2015, titled MAGNETIC COUPLING DEVICE WITH A LINEAR ACTUATION SYSTEM, the entire disclosures of which are herein expressly incorporated by reference.

Additionally or alternatively, actuator 1228 may include a controller 1236 and/or sensor 1238A. Controller 1236 includes a processor 1240 with an associated computer readable medium, illustratively memory 1242. Memory 1242 includes control logic 1244 which when executed by processor 1240 causes electronic controller 1236 to instruct actuator 1228 to move magnetic platter 1212 so that magnetic coupling device 1200 is in an off state, second on state and/or third on state. For example, sensor 1238A may sense a position of actuator 1228 and, in response to a predetermined position sensed by sensor 1238A, which translates to a position of magnetic platter 1212, control logic 1244 instructs actuator 1228 to stop exerting a force on magnetic platter 1212 when magnetic platter 1212 reaches a desired position.

In at least one embodiment, actuator 1228 is a stepper motor and rotary motion of actuator 1228 is translated to linear motion of engagement portion 1230 via a coupling (e.g., gear) between a shaft of actuator 1228 and engagement portion 1230. In these embodiments, sensor 1238A counts the pulses used to drive the stepper motor and determines a position of the shaft of the stepper motor, which is translated to a position of magnetic platter 1212, based on the number of pulses. The position of the shaft, i.e., angle, is then translated into the height of the gap 1250. That is, magnetic platter 1212 is moved relative along the vertical axis 1220 to a defined position by the steps the motor moves by counting the number of pulses. In another example, a stepper motor is provided that integrates an encoder with the stepper to check that the proper actuation angle is maintained.

As another example, magnetic coupling device 1200 may include sensor 1238B. Sensor 1238B may measure the position of magnetic platter 1212 within the housing 1210. Exemplary sensors 1238B include optical sensors which monitor reflective strips affixed to magnetic platter 1212. Other sensor systems may be used to determine a position of magnetic platter 1212.

As even another example, magnetic coupling device 1200 may include one or more sensors 1238C (illustrated in FIG. 28B). Sensors 1238C may be magnetic flux sensors and positioned generally at one or more positions over pole plate 1206. Exemplary magnetic flux sensors include Hall-effect sensors. Sensors 1238C measure the leakage flux proximate to one or more north and south poles of pole plate 1206. The amount of leakage flux at each sensor 1238C varies based on the position of magnetic platter 1212 relative to pole plate 1206 and based on the amount of flux passing through the north and south poles of pole plate 1206, workpiece contact interface 1204 to ferromagnetic workpiece 1202. By monitoring the magnetic flux at locations opposite workpiece interface 1204 of north and south poles of pole plate 1206, the relative position of magnetic platter 1212 may be determined. In embodiments, magnetic coupling device 1200 is positioned on top of ferromagnetic workpieces 1202 and the magnetic fluxes measured by sensors 1238C as magnetic platter 1212 moves from an off state to a second, on state are recorded as a function of position of magnetic platter 1212. Each of the magnetic fluxes are assigned to a desired position of magnetic platter 1212. An exemplary sensing system having sensors 1238C is disclosed in US patent application Ser. No. 15/964,884, titled Magnetic Coupling Device with at Least One of a Sensor Arrangement and a Degauss Capability, filed Apr. 27, 2018, the entire disclosure of which is expressly incorporated by reference herein.

In embodiments, the controller 1236 changes the state of magnetic coupling device 1200 in response to an input signal received from an I/O device 1246. Exemplary input devices include buttons, switches, levers, dials, touch displays, pneumatic valves, soft keys, and communication module. Exemplary output devices include visual indicators, audio indicators, and communication module. Exemplary visual indicators include displays, lights, and other visual systems. Exemplary audio indicators include speakers and other suitable audio systems. In embodiments, device 1200 includes simple visual status indicators, in the form of one or more LEDs, which are driven by the processor 1240 of control logic 1244, to indicate when a predefined magnetic coupling device 1200 status is present or absent (e.g. Red LED on when magnetic coupling device 1200 is in a first, off state, Green LED blinking fast when magnetic coupling device 1200 is in a second, on state and proximity of ferromagnetic workpiece 1202 is detected, Green LED slower blinking with Yellow LED on when contacting ferromagnetic workpiece 1202 outside intended specific area on ferromagnetic workpiece 1202 (e.g. partially complete magnetic working circuit) and Yellow LED off with steady Green LED on, showing magnetic coupling device 1200 engagement within threshold limits, showing safe magnetic coupling state.

For example, in one embodiment, magnetic coupling device 1200 is coupled to an end of arm of a robotic arm and I/O device 1246 is a network interface over which controller 1236 receives instructions from a robot controller on when to place magnetic coupling device 1200 in one of a first off-state, second on-state, or third on-state. Exemplary network interfaces include a wired network connection and an antenna for a wireless network connection. While the embodiments discussed above relate to electronic, pneumatic, or hydraulic actuation, in alternative embodiments, the magnetic coupling device 1200 may be actuated manually by a human operator.

Magnetic coupling device 1200 may also include one or more ferromagnetic pieces 1248 arranged at or near an upper portion 1224 of the housing 1200, as illustrated in FIG. 28A. In at least one embodiment, non-ferromagnetic mounting plate 1232 and ferromagnetic pieces 1248 are arranged within housing 1210 so that non-ferromagnetic mounting plate 1232 is located between and in contact with ferromagnetic pieces 1248 when magnetic coupling device 1200 is in the first, off position. Furthermore, top portions of magnetic platter 1212 may be in contact with bottom portions of ferromagnetic pieces 1248. In another exemplary embodiment, the ferromagnetic pieces 1248 may extend down the sides of the magnetic platter 1212. In these embodiments, the ferromagnetic pieces 1248 may reduce leakage of the magnetic platter 1212 by providing additional absorption of the magnetic field generated by the magnetic platter 1212.

Non-ferromagnetic mounting plate 1232 is made of a non-ferromagnetic material (e.g., aluminum, austenitic stainless steels, etc.). When magnetic coupling device 1200 is in a first, off state and magnetic platter 1212 and non-ferromagnetic mounting plate 1232 are positioned at or near the upper portion 1218 of the housing 1204, one or more circuits between the non-ferromagnetic mounting platter 1212, ferromagnetic pieces 1248 and non-ferromagnetic mounting plate 1232 is created, as illustrated in FIG. 28B. Furthermore, when magnetic coupling device 1200 is in a first, off state, a gap 1250 (of FIG. 28A) that comprises air and/or another substance having a low magnetic susceptibility in the interior cavity 1216 is between and separates pole plate 1206 and magnetic platter 1212. As a result, little or no magnetic flux from the magnetic platter 1212 extends to the workpiece contact interface 1204 and through the ferromagnetic workpieces 1202 when the magnetic coupling device 1200 is in the first, off state. Therefore, magnetic coupling device 1200 can be separated from ferromagnetic workpieces 1202. Furthermore, most if not all the magnetic flux from the magnetic platter 1212 is contained within the housing 1210 due to the circuits between the non-ferromagnetic mounting platter 1212, ferromagnetic pieces 1248 and non-ferromagnetic mounting plate 1232.

An additional advantage of including ferromagnetic pieces 1248 is that the distance of the gap 1250 between the bottom of magnetic platter 1212 and pole plate 1206 can be less than if magnetic coupling device 1200 didn't include a non-ferromagnetic mounting plate 1232 and ferromagnetic pieces 1248. That is, one or more circuits created between magnetic platter 1212, ferromagnetic pieces 1248 and non-ferromagnetic mounting plate 1232, facilitates confining most if not all the magnetic flux from magnetic platter 1212 within the housing 1210, near the magnetic platter 1212 and away from the pole plate 1206. As such, the magnetic flux transferred to the ferromagnetic workpieces 1202 by the magnetic coupling device 1200 is insufficient to lift one or more of the ferromagnetic workpieces 1202. Stated another way, the magnetic flux may be effectively zero at the bottom of the pole plate 1206 and, therefore, effectively no magnetic flux is transferred to the ferromagnetic workpieces 1202 by the magnetic coupling device 1202, which reduces the overall required height the magnetic platter 1212 needs to travel (see height 1282 below) when the magnetic coupling device 1202 transitions between an off state and one or more on states.

Conversely, if non-ferromagnetic mounting plate 1232 and ferromagnetic pieces 1248 weren't included in the magnetic coupling device 1202, less of the magnetic flux from the magnetic platter 1212 would be confined within housing 1210 and/or near magnetic platter 1212. And, because less magnetic flux would be confined near magnetic platter 1212, the gap 1250 between the bottom of magnetic platter 1212 and pole plate 1206 would have to be greater in order for the magnetic flux not to extend down through the pole plate 1206 and couple magnetic coupling device 1200 to one or more of the ferromagnetic workpieces 1202. Due to the gap 1250 being smaller in the illustrated embodiment, magnetic coupling device 1200 can be smaller than other magnetic coupling devices not having these features.

As an example, the gap 1250 the magnetic platter 1212 may travel to transition between the first, off state to the second, on state may be less than or equal to 8 mm. Conversely, to transition from the second, on state to the first, off state, the magnetic platter 1212 may travel less than or equal to 8 mm.

Another advantage of the illustrated embodiment is that less energy can be used by actuator 1228 to translate magnetic platter 1212 along the vertical axis 1220 within the housing 1210 due to the gap 1250 being smaller. Even another advantage of the illustrated embodiment, is that it will be less likely magnetic platter 1212 will break when actuator 1228 translates magnetic platter 1212 from the first, off position to the second, on position and magnetic platter 1212 comes into contact with pole piece 1206. This is a result of magnetic platter 1212 building less momentum during the transition due to the reduced gap 1250. As even another advantage of the illustrated embodiment, in the event magnetic coupling device 1200 fails while magnetic coupling device 1200 is in an off state, magnetic coupling device 1200 will not transition to an on state due to the non-ferromagnetic mounting plate 1232 and the ferromagnetic pieces 1248. As such, the magnetic coupling device 1200 is safer than a magnetic coupling device that transitions from an off state to an on state when the magnetic coupling device fails. Conversely, in the event magnetic coupling device 1200 didn't include a non-ferromagnetic mounting plate 1232 and/or ferromagnetic pieces 1248, magnetic platter 1212 may be more likely to transition to an on state due to the lack of magnetic circuit created in the off position.

As stated above, when the magnetic platter 1206 is positioned at or near the lower portion 1226 of the housing 1204, magnetic coupling device 1200 is in a second, on state. As illustrated in FIG. 29, magnetic flux from the magnetic platter 1206 extends through one or more of the ferromagnetic workpieces 1202 when the magnetic coupling device 1200 is in the second, on state. As such, the magnetic coupling device 1200 is configured to couple to one or more ferromagnetic workpieces 1202 when the magnetic coupling device 1200 is in the first, on state. While the magnetic flux lines are illustrated as passing through both ferromagnetic workpieces 1202', 1202", in some embodiments the magnetic flux lines primarily pass only through the ferromagnetic workpiece 1202'. When the magnetic flux lines primarily pass through the first ferromagnetic workpiece 1202', the magnetic coupling device 1200 can be used to de-stack and separate the ferromagnetic workpieces 1202 from one another.

To facilitate the magnetic flux lines primarily passing through only the first ferromagnetic workpiece 1202' when magnetic coupling device 1200 is in a second, on state, the magnetic platter 1212 may be removable and replaceable, which allows different strength, height, and/or width magnetic platters 1212 to be used with the magnetic coupling device 1200. The strength, height, and/or width of the magnetic platter 1212 may be selected based on the thickness of the ferromagnetic workpiece 1202 so that the ferromagnetic workpieces 1202 can be adequately de-stacked and separated from one another when magnetic coupling device 1200 is in the second, on position.

Additionally or alternatively, the pole plate 1206 may be removable and replaceable, which allows different types of pole plates 1206 to be used with the magnetic coupling device 1200. For example, the pole plate 1206 may be selected based on the type of ferromagnetic workpiece 1202 to which the magnetic coupling device 1200 is being coupled. For example, the magnetic coupling device 1200 may be handling class-a surfaces that cannot be scratched or marred. As a result, a pole plate 1206 having rubber (or another material that reduces the likelihood the ferromagnetic workpiece 1202 is scratched or marred) arranged on the workpiece contact interface may be selected and incorporated into the magnetic coupling device 1200. As another example, a pole plate 1206 having different projections and/or gaps may be selected based on the thickness of the ferromagnetic workpiece 1202 to which the magnetic coupling device 1200 is being coupled. Additional examples of the relevance of the projections and/or gaps is explained in more detail above in relation to FIGS. 6-11B.

As discussed in more detail below in relation to FIG. 31, the housing 1204 is configured in a manner that allows the magnetic platter 1212 and/or the pole plate 1206 to be easily removable and replaceable.

Additionally or alternatively, magnetic coupling device 1200 may be transition to one or more intermediate states as stated above. For example, magnetic coupling device 1200 may transition to a third, on state, as illustrated in FIG. 30. The third, on state is when magnetic platter 1212 is located along the vertical axis 1220 between the location of the magnetic platter 1212 when the magnetic coupling device 1200 is in the first, off state and the location of the magnetic platter 1212 when the magnetic coupling device 1200 is in the second, on state. In embodiments where the same magnetic platter 1212 is being used, less magnetic flux passes through the workpiece contact interface 1204 and into the ferromagnetic workpieces 1202 when magnetic coupling device 1200 is in the third, on state than when the magnetic coupling device 1200 is in the second, on state, as illustrated in FIG. 30. That is, assuming the same strength magnetic platter 1212 is being used in the embodiments depicted in FIG. 29 and FIG. 30, magnetic flux lines pass through both ferromagnetic workpieces 1202', 1202" in FIG. 29, whereas magnetic flux lines pass through only ferromagnetic workpiece 1202' in FIG. 30. By being able to be in a third, on state, magnetic coupling device 1200 may be able to de-stack different thickness of ferromagnetic workpieces 1202 without having to replace magnetic platter 1212 with a different strength magnetic platter 1212.

As stated above, the pole plate 1206 includes a plurality of projections 1208. Each of the projections 1208 acts as a pole extension for a respective pole portion of the pole portions 1216. That is, when the magnetic coupling device 1200 is in a second or third, on state, the respective north or south pole of the pole portions 1216 extends down through a respective projection 1208. A magnetic circuit is then created that goes from a N pole portion 1216 through a respective N-pole projection 1208, through one or more ferromagnetic workpieces 1202, through a S-pole projection 1208, and through a S pole portion 1216. Each permanent magnetic portion creates one of these magnetic circuits when the magnetic coupling device 1200 is in an on state. As explained in more detail above in relation to FIGS. 6-11A, the size of the projections 1208 and the distance therebetween affect the flux transfer to the ferromagnetic workpieces 1202 and allow more effective de-stacking of ferromagnetic materials 1202 and an increased holding force. For example, in at least some embodiments, to achieve the highest concentration of magnetic flux being transferred through a ferromagnetic piece 1202' of the ferromagnetic workpieces 1202 and therefore have the greatest likelihood of being able to de-stack the ferromagnetic workpiece 1202' from the ferromagnetic workpieces 1202", 1202''', the size of the projections (e.g., width and height) and the gap therebetween should approximately match the thickness of the ferromagnetic workpieces 1202.

To separate the N and S projections 1208, the pole plate 1206 may include slots configured to receive one or more non-ferromagnetic pieces 1252 (depicted in FIG. 28B). The non-ferromagnetic pieces 1252 may be arranged within respective envelopes 1254 (depicted in FIG. 28B) between each of the projections 1208. Due to the non-ferromagnetic pieces 1252, the magnetic circuit created by the permanent magnet portions 1214 does not extend substantially through the non-ferromagnetic pieces 1252 and, therefore, the N and S projections are separated from one another. Furthermore, as stated above, the projections 1208 result in magnetic flux from magnetic platter 1212 being nearer the workpiece contact interface 1204 than if the pole plate 1206 did not include a plurality of projections 1208. Different aspects of the projections 1208 facilitating magnetic flux from magnetic platter 1212 to be concentrated nearer the workpiece contact interface 104 are discussed above in relation to FIGS. 6-11A. In alternative embodiments, the projections 1208 and recesses therebetween may be integrated directly into the housing 1210.

Referring to FIG. 31, an exploded view of the magnetic coupling device 1200 is illustrated. As illustrated, the housing 1210 includes a lower portion 1210A releasable securable to an upper portion 1210B. The lower portion 1210A may be secured to the upper portion 1210B using one or more screws 1256. The screws 1256 may provide easy access to components of magnetic coupling device 1210 arranged within the housing 1210, as explained below.

Prior to joining the lower portion 1210A and the upper portion 1210B, the lower portion 1210A receives a pole plate 1206. In at least one embodiment, the lower portion 1210A includes recesses/cutouts 1258 configured to receive tabs 1260 of the pole plate 1206. The tabs 1260 facilitate proper positioning of the pole plate 1206 within the lower portion 1210A. Proper positioning of the pole plate 1206 may facilitate easy replacement of the pole plate 1206 in the event a pole plate 1206 with different projections 1208 than a currently installed pole plate 1206 is desired. For example, the lower portion 1210A of the housing 1210 can be separated from the upper portion 1210B by removing the screws 1256. Then, the pole plate 1206 can be removed from the lower portion 1210A. After which, another pole plate 1206 having different projections 1208 can be inserted into the lower portion 1210A so that the tabs 1260 are received by the recesses/cutouts 1258. Finally, the screws can 1256 be used to secure the lower portion 1210A to the upper portion 1210A. The tabs 1260 may be comprised of a ferromagnetic material.

In addition to or in alternative to replacing the pole plate 1206, the design of magnetic coupling device 1200 also facilitates easy removal and replacement of magnetic platter 1212. For example, as illustrated, the non-ferromagnetic mounting plate 1232 is coupled to the magnetic platter 1212 via one or more screws 1261. After removing the lower portion 1210A from the upper portion 1210B, the magnetic platter 1212 can be lowered along the vertical axis 1220 so the screws 1261 can be accessed. Once the screws 1261 are unscrewed, the magnetic platter 1212 can be separated from the non-ferromagnetic mounting plate 1232 and exchanged for another magnetic platter 1212. The new magnetic platter 1212 can be secured to the non-ferromagnetic mounting plate 1232 using the screws 1261. After which, the lower portion 1210A and the upper portion 1210B can be coupled together using the screws 1256.

In some instances, the magnetic platter 1212 may need to be replaced in the event the magnetic platter 1212 is broken or damaged. In other instances, the magnetic platter 1212 may need to be replaced with a magnetic platter 1212 that produces a stronger or weaker magnetic field. As discussed above, replacing the magnetic platter 1212 with a magnetic platter 1212 having a stronger or weaker magnetic may facilitate de-stacking the ferromagnetic workpieces 1202. For example, a first magnetic platter 1212 may produce enough magnetic flux through the first and second ferromagnetic workpieces 1202', 1202" to lift both ferromagnetic workpieces 1202', 1202". However, separating the first ferromagnetic workpiece 1202' from the second ferromagnetic workpiece 1202" may be desirable. In these instances, a second magnetic platter 1212 that is weaker than the first magnetic platter 1212 and only produce enough magnetic flux through the ferromagnetic workpieces 1202 to lift the first ferromagnetic workpiece 1202' may replace the first magnetic platter 1212.

In the illustrated embodiment, a lower portion 1228A of the actuator 1228 is coupled to the housing 1210 using one or more screws 1262. As such, the lower portion 1228A acts as a cover to the housing 1210. Further, ferromagnetic pieces 1248 are coupled to a bottom portion 1228A of the actuator 1228 using the one or more screws 1262. As such, when the magnetic platter 1212 and non-ferromagnetic mounting plate 1232 are moved to an upper portion of the housing 1210 and magnetic coupling device 1200 is in the first, off position, magnetic platter 1212 is arranged in contact with the ferromagnetic pieces 1248. That is, there contact between the outside portions of the magnetic platter 1212 and the ferromagnetic pieces 1248, as illustrated.

Magnetic circuits are then formed from N pole portions 1216 of the magnetic platter 1212 through one of the ferromagnetic workpieces 1248, through the non-ferromagnetic mounting plate 1232, through the other ferromagnetic workpiece 1248 and to S pole portions 1216 of the magnetic platter 1212. The circuit results in a number of advantages for the magnetic coupling device 1200, which are discussed above.

As illustrated, non-ferromagnetic mounting plate 1232 is coupled to the engagement portion 1230 with a screw 1266. The engagement portion 1230 includes a first portion 1230A and a second portion 1230B, wherein in at least some embodiments, the first portion 1230A has a smaller cross-sectional area than the second portion 1230B. In at least one embodiment, the first portion 1230A extends through a conduit 1268 in the bottom portion 1228A and coupled to the non-ferromagnetic mounting plate 1232 via the screw 1266. Due to the coupling of the engagement portion 1230 to the non-ferromagnetic mounting plate 1232, translation of the engagement portion 1230 along the vertical axis 1220 will translate the non-ferromagnetic mounting plate 1232 and magnetic platter 1212 along the vertical axis 1220.

To translate the engagement portion 1230 along the vertical axis 1220, the actuator 1228 may be pneumatically actuated. For example, the actuator's housing 1228B may include ports 1274 including a first port 1274A and a second port 1274B. When air is provided into port 1274A, via an air compressor or otherwise, the pressure within the actuator's housing 1228B and above the second portion 1230B increases, which results in the engagement portion 1230 moving downward along the vertical axis 1220. The translation of the engagement portion 1230 results in the magnetic platter 1212 moving downward along the vertical axis 1220 so the magnetic coupling device 1200 is transitioned from a first, off state to a second, on state or a third, on state or from a third, on state to a second, on state. To confine air provided into port 1274A within the actuator's housing 1228B and above engagement portion 1230, actuator 1228 may include a cover (not shown) secured to the actuator's housing 1228B via one or more screws 1276. Additionally or alternatively, air may be withdrawn from port 1274B to reduce the pressure below the second portion 1230B relative to the pressure above the second portion 1230B, which results in the engagement portion 1230 moving downward along the vertical axis 1220.

Conversely, when air is provided into the port 1274B, the pressure within the actuator's housing 1228B and below the second portion 1230B increases, which results in the plate moving upward along the vertical axis 1220. The translation of the engagement portion 1230 results in the magnetic platter 1212 moving upward along the vertical axis 1220 so the magnetic coupling device 1200 is transitioned from a second, on state to a third, on state or a first, off state or from a third, on state to a first, off state. Additionally or alternatively, air may be withdrawn from port 1274A to reduce the pressure above the second portion 1230B relative to the pressure below the second portion 1230B, which results in the engagement portion 1230 moving upward along the vertical axis 1220.

In at least some other embodiments, the ports 1274A, 1274B may be formed through the housing 1210B and pressure or a reduction in pressure may be applied to the top of the magnetic platter 1212 or the bottom of the magnetic 1212 to translate the magnetic platter 1212 along the vertical axis 1220.

Figure 32A:
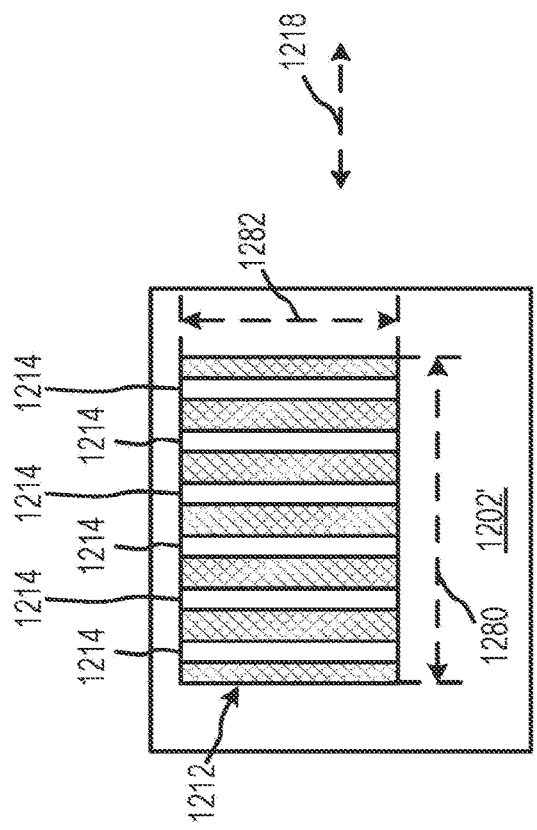
FIGS. 32A-32B illustrate a top sectional view of the magnetic coupling device of FIGS. 28A-28B in different positions on a ferromagnetic workpiece.
Figure 32B:
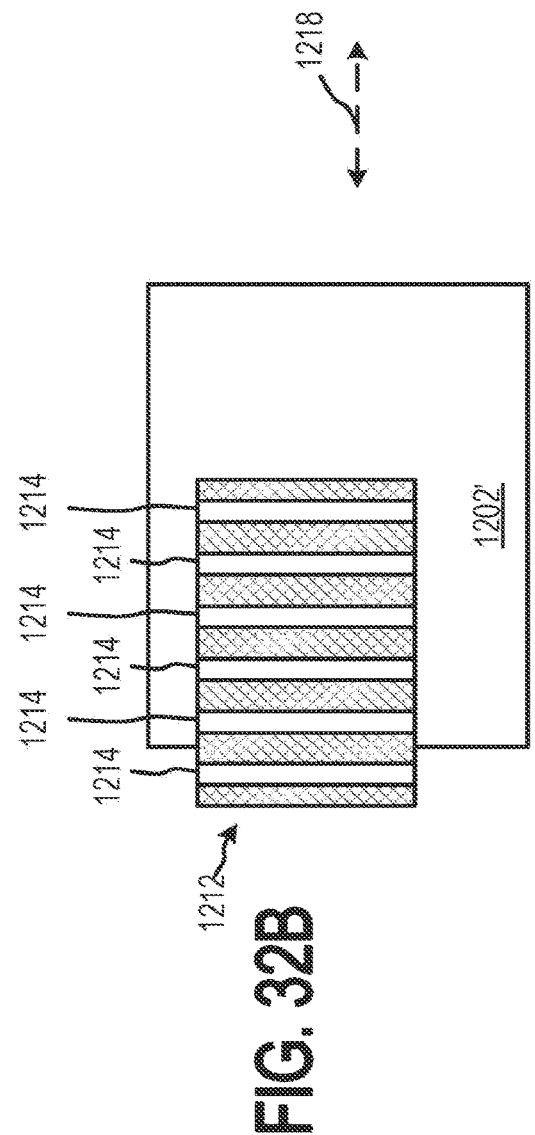

FIGS. 32A-32B illustrate a top sectional view of the magnetic coupling device of FIGS. 28A-28B in different positions on a ferromagnetic workpiece 1202. Referring to FIG. 32A, the non-ferromagnetic magnetic platter 1212 is shown on ferromagnetic workpiece 1202'. As illustrated, the entirety of the footprint of the magnetic platter 1212 has been placed on ferromagnetic workpiece 1202'. As used herein, the term footprint may be defined as the surface area of the magnetic platter 1212, i.e., the width 1280 times the height 1282. It is preferable to have the entire footprint of the magnetic platter 1212 to be placed on the ferromagnetic workpiece 1202' because the most amount of flux will be transferred from magnetic platter 1212 to ferromagnetic workpiece 1202'. When the entire footprint of the magnetic platter 1212 is placed on ferromagnetic workpiece 1202', magnetic coupling device 1200 may be configured to lift greater than or equal to 22.0 grams of ferromagnetic workpieces 1202 per square mm of area of footprint of the magnetic platter 1212.

While it is preferable to have the entire footprint of the magnetic platter 1212 places on the ferromagnetic workpiece 1202', oftentimes magnetic platter 1212 will be placed on ferromagnetic workpiece 1202' as shown in FIG. 32B. This can occur when magnetic coupling device 1200 is attached to an end of arm unit for a robotic system, such as robotic system 700 (of FIG. 13), where placement of magnetic platter 1212 on ferromagnetic workpiece 1202' is being performed using computer vision or some other automated process.

In the event magnetic platter 1212 is placed on ferromagnetic workpiece 1202' as shown in FIG. 32B, the configuration of magnetic platter 1212 may offer some advantages. Specifically, there may be a lower likelihood magnetic platter 1212 will peel away from ferromagnetic workpiece 1202' when magnetic platter 1212 lifts ferromagnetic workpiece 1202' compared to other magnetic coupling devices. That is, due to multiple permanent magnetic portions 1214 being included in the magnetic platter 1212, when the magnetic platter 1212 is placed on ferromagnetic workpiece 1202' as shown in FIG. 32B, only the left most permanent magnetic portion 1214 is off of ferromagnetic workpiece 1202'. Therefore, five other magnetic circuits are still formed between the magnetic platter 1212 and the ferromagnetic workpiece 1202'. As such, the magnetic platter 1212 may still be operating at approximately an 83% capacity (⅚=0.83). Comparatively, if the magnetic platter 1212 only included one permanent magnetic portion 1214, one-third of the magnetic circuit wouldn't be formed with the ferromagnetic workpiece 1202' due to 1⅔ of the pole portion being off the ferromagnetic workpiece 1202'. As such, magnetic platter 1212 may be operating at approximately 66% capacity.

Figure 33:
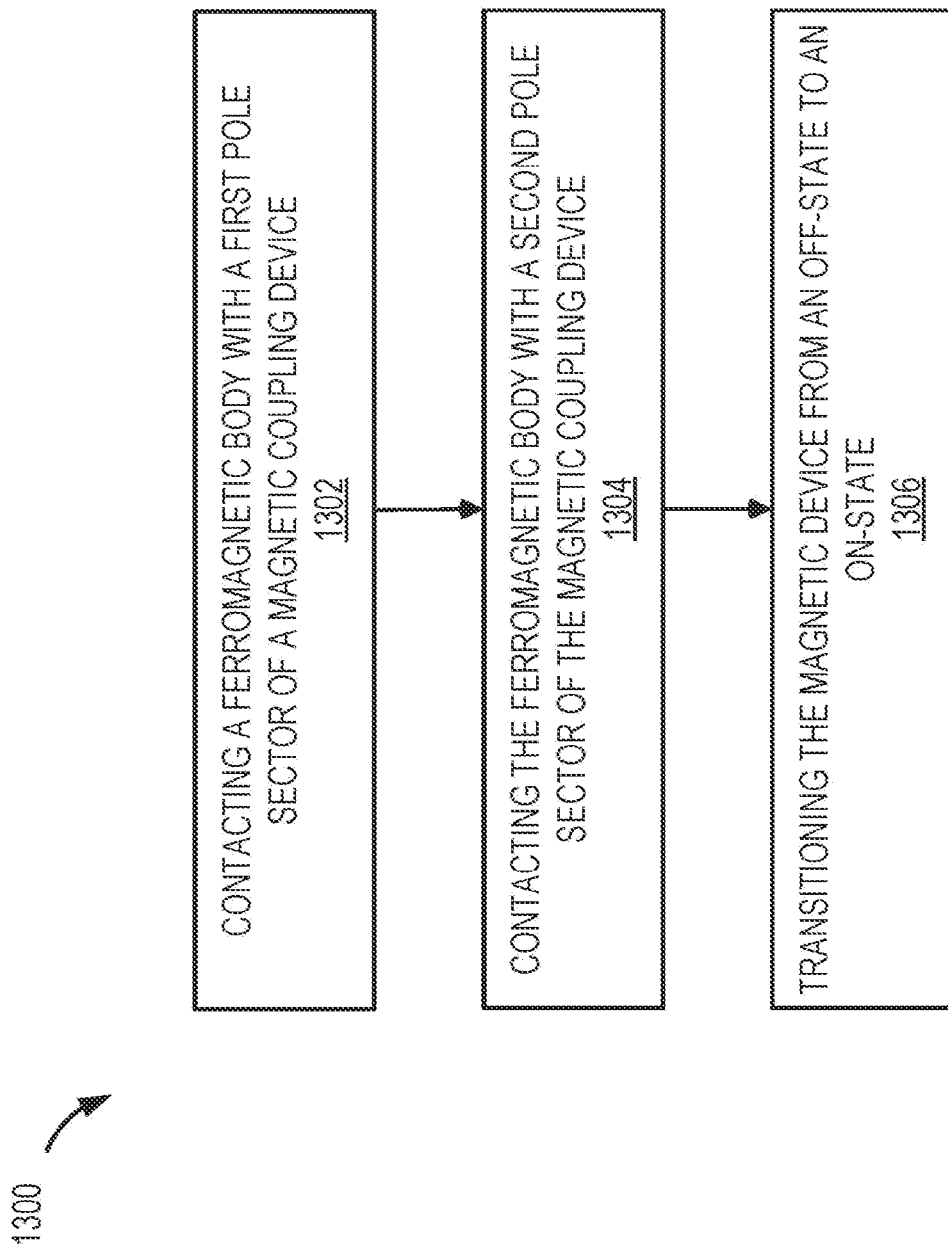
FIG. 33 illustrates a processing sequence of a method of use of an exemplary switchable magnetic device with pole portions.

FIG. 33 is a flow diagram of a method 1300 of using an exemplary switchable magnetic device with pole sectors. The method 1300 comprises contacting a ferromagnetic body with a first pole sector, as represented by block 1302. In embodiments, the first pole sector may be attached to a base of a housing of a magnetic device. Additionally, the magnetic device may be able to establish two different magnetic circuits. The first magnetic circuit may be referred to as the magnetic device being in an on-state and the second magnetic circuit may be referred to as the magnetic device being in an off-state.

In embodiments, the first pole sector, the housing, and the magnetic device may have the same or similar features as the pole sectors 1034, 1134; the housings 1002, 1102; and the magnetic devices 1000, 1100, respectively, depicted above. For example, the ferromagnetic body may be contacted by a workpiece contact interface of the first pole sector, wherein the workpiece contact interface of the first pole sector includes a plurality of projections.

The magnetic device may comprise: at least one first permanent magnet mounted within the housing that has an active N-S pole pair and at least one second permanent magnet having an active N-S pole pair. In embodiments, the at least one second permanent magnet may be rotatably mounted within the housing in a stacked relationship with the at least one first permanent magnet, wherein the at least one second permanent magnet is rotatable between a first position and a second position. Additionally or alternatively, the magnetic device may establish a plurality of magnetic circuits that produce different strengths of magnetic circuits between the magnetic device and a ferromagnetic body.

Alternatively, the magnetic device may comprise at least one first permanent magnet that is moveable relative to a base of the housing. Additionally or alternatively, the magnetic device may establish a plurality of magnetic circuits that produce different strengths of magnetic circuits between the magnetic device and a ferromagnetic body. In embodiments, the magnetic device may produce one magnetic circuit that is substantially confined within its housing when the at least one first permanent magnet is positioned away and/or separated from the base of the housing.

In embodiments, the method 1300 comprises contacting a ferromagnetic body with a second sector, as represented by block 1304. In embodiments, the second pole sector is attached to the same housing to which the first pole sector is attached. In embodiments, the magnetic device may be in the first configuration when the ferromagnetic body is contacted by the second pole sector.

In embodiments, the method 1300 comprises transitioning the magnetic device from the off-state to an on-state, as represented by block 1306. In embodiments, transitioning the magnetic device from the off-state to the on-state may comprise actuating (e.g., rotating or linearly translating) the at least one second permanent magnet from a first position to a second position. Additionally, when the magnetic device is in an on-state, the magnetic circuit is formed through the workpiece.

Each of the disclosed magnetic coupling devices described above may be used in combination with a mechanical lifting apparatus that lift and transport a ferromagnetic workpiece from a first location to a second location. Exemplary mechanical lifting apparatuses include mechanical gantries, crane hoists, stationary fixtures, robotic fixtures, etc.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A magnetic device for magnetically coupling to a ferromagnetic workpiece, comprising:
a housing;

a plurality of pole shoes coupled to the housing, wherein a first portion of the plurality of pole shoes cooperate with the housing to form a first pole of the magnetic device and a second portion of the plurality of pole shoes cooperate with the housing to form a second pole of the magnetic device and wherein each of the first pole of the magnetic device and the second pole of the magnetic device includes a ferromagnetic body having a first portion positioned proximate the housing and a second portion including a plurality of spaced apart projections which collectively form a workpiece contact interface of the pole;

a plurality of permanent magnets including a first permanent magnet supported by the housing and having an active N-S pole pair and a second permanent magnet supported by the housing and configurable relative to the first permanent magnet to provide a first configuration wherein a north pole of the second magnet is aligned with a north pole of the first permanent magnet and a south pole of the second magnet is aligned with a south pole of the first permanent magnet and a second configuration wherein the north pole of the second magnet is misaligned with the north pole of the first permanent magnet and the south pole of the second magnet is misaligned with the south pole of the first permanent magnet; and wherein the magnetic device establishes a first magnetic circuit with the first permanent magnet and the second permanent magnet through the plurality of pole shoes when the second permanent magnet is in the first configuration and a second magnetic circuit with the first permanent magnet and the second permanent magnet when the second permanent magnet is in the second configuration.

2. The magnetic device of claim 1, wherein the first magnetic circuit substantially passes through the first pole and the second pole to couple the ferromagnetic workpiece to the magnetic device and the second magnetic circuit is substantially confined within at least a portion of the housing and the plurality of pole shoes.

3. The magnetic device of claim 1, wherein the workpiece contact interface of the first pole extends along a lower end of the first pole, the lower end of the first pole having a first number of projections of the plurality of spaced apart projections and a second number of recesses interposed between the first number of projections, the second number being at least two.

4. The magnetic device of claim 3, wherein the second number is at least three.

5. The magnetic device of claim 3, wherein the second number is at least five.

6. The magnetic device of claim 3, wherein each of the recesses is sized to prevent the ferromagnetic workpiece from entering the respective recess.

7. The magnetic device of claim 3, wherein each of the recesses has a respective profile extending between the adjacent projections, the respective profile having a continuous slope.

8. The magnetic device of claim 3, wherein at least one of the recesses has a depth substantially equal to a thickness of the ferromagnetic workpiece to be coupled to the magnetic device.

9. The magnetic device of claim 3, wherein each of the recesses has a depth substantially equal to a thickness of the ferromagnetic workpiece to be coupled to the magnetic device.

10. The magnetic device of claim 3, wherein at least one of the recesses has a width substantially equal to a thickness of the ferromagnetic workpiece to be coupled to the magnetic device.

11. The magnetic device of claim 3, wherein each of the recesses has a width substantially equal to a thickness of the ferromagnetic workpiece to be coupled to the magnetic device.

12. The magnetic device of claim 3, wherein at least one of the recesses has a width substantially equal to a depth of the at least one recess.

13. The magnetic device of claim 1, wherein the plurality of pole shoes are removably coupled to the housing.

14. The magnetic device of claim 1, wherein the first portion of the plurality of pole shoes includes a first pole shoe which includes the plurality of spaced apart projections for the first pole and the second portion of the plurality of pole shoes includes a second pole shoe which includes the plurality of spaced apart projections for the second pole.

15. The magnetic device of claim 14, wherein the housing has an outer envelope having an overall envelope length of the housing, an overall envelope width of the housing, and an overall envelope height of the housing and wherein the first pole shoe forms a south pole of the magnetic device and the second pole shoe forms a north pole of the magnetic device, the first pole shoe being positioned on a first side of the housing and the second pole shoe being positioned on a second side of the housing.

16. The magnetic device of claim 15, wherein each the south pole shoe and the north pole shoe have at least a portion that extends outside each of the overall envelope length of the housing, the overall envelope width of the housing, and the overall envelope height of the housing.

17. The magnetic device of claim 15, wherein each the south pole shoe and the north pole shoe have at least a first portion extending outside the outer envelope of the housing in a first direction and a second portion extending beyond the outer envelope of the housing in a second direction, each of the first direction and the second direction being along one of the overall envelope length of the housing, the overall envelope width of the housing, and the overall envelope height of the housing.

18. The magnetic device of claim 15, wherein each of the south pole and the north pole includes a single unitary pole shoe.

19. The magnetic device of claim 15, wherein each of the first pole shoe and the second pole shoe extend below the housing such that the housing is spaced apart from the ferromagnetic workpiece when the workpiece contact interfaces of the first pole shoe and the second pole shoe contact the ferromagnetic workpiece.

20. The magnetic device of claim 14, further comprising a compressible member arranged between the plurality of projections of the first pole shoe and the second pole shoe.

21. The magnetic device of any of claim 1, wherein the respective plurality of projections of each of the first pole and the second pole forms a non-linear workpiece contact interface.

22. The magnetic device of claim 1, wherein the respective plurality of projections of each of the first pole and the second pole forms a linear workpiece contact interface.

23. The magnetic device of claim 1, wherein the second permanent magnet is movable relative to the first permanent magnet and the magnetic device further comprising an actuator operatively coupled to the second permanent magnet to move the second permanent magnet relative to the first permanent magnet to a first position corresponding to the first configuration and a second position corresponding to the second configuration.

24. The magnetic device of claim 23, wherein the actuator rotates the second permanent magnet relative to the first permanent magnet.

25. The magnetic device of claim 23, wherein the actuator is one of a rotary actuator and a linear actuator.

26. The magnetic device of claim 23, wherein the actuator is one of a hydraulic actuator, a pneumatic actuator, and an electrical actuator.

27. The magnetic device of claim 23, wherein the second permanent magnet is housed in a second housing received in the housing, the second housing being rotatable by the actuator to rotate the second permanent magnet.

28. The magnetic device of claim 1, wherein each of the first pole of the magnetic device and the second pole shoe of the magnetic device carries a compressible component positioned to be in contact with the ferromagnetic workpiece when the ferromagnetic workpiece is coupled to the magnetic device.

29. The magnetic device of claim 1, wherein the magnetic coupling device is carried by an end of a robotic arm.

30. The magnetic device of claim 1, further comprising a plurality of wires arranged about the second permanent magnet and the second permanent magnet is selectively placed in one of the first configuration and the second configuration by applying a current to the plurality of wires and the second permanent magnet remaining in the selected one of the first configuration and the second configuration when the current is removed.

31. A magnetic device for magnetically coupling to a ferromagnetic workpiece, comprising:

a plurality of permanent magnets including a first permanent magnet having an active N-S pole pair and a second permanent magnet configurable relative to the first permanent magnet to provide a first configuration wherein a north pole of the second magnet is aligned with a north pole of the first permanent magnet and a south pole of the second magnet is aligned with a south pole of the first permanent magnet and a second configuration wherein the north pole of the second magnet is misaligned with the north pole of the first permanent magnet and the south pole of the second magnet is misaligned with the south pole of the first permanent magnet;

an assembly supporting the plurality of permanent magnets and including a first plurality of spaced apart projections which collectively form a first workpiece contact interface and a second plurality of spaced apart projections which collectively form a second workpiece contact interface; and wherein the magnetic device establishes a first magnetic circuit with the first permanent magnet and the second permanent magnet through the first plurality of spaced apart projections and the second plurality of spaced apart projections when the second permanent magnet is in the first configuration and a second magnetic circuit within the assembly with the first permanent magnet and the second permanent magnet when the second permanent magnet is in the second configuration.

32. The magnetic device of claim 31, wherein the assembly includes a lower housing and an upper housing.

33. The magnetic device of claim 32, wherein the first permanent magnet is positioned in the lower housing and the second permanent magnet is positioned in the upper housing.

34. The magnetic device of claim 31, wherein the assembly includes a plurality of detachable pole shoes.

35. The magnetic device of claim 31, wherein the second permanent magnet is movable relative to the first permanent magnet and the magnetic device further comprising an actuator operatively coupled to the second permanent magnet to move the second permanent magnet relative to the first permanent magnet to a first position corresponding to the first configuration and a second position corresponding to the second configuration.

* * * * *